(12) United States Patent
Volin

(10) Patent No.: US 11,156,013 B2
(45) Date of Patent: Oct. 26, 2021

(54) FIVE-DEVICE-IN-ONE SCREEN AWNING

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 16/926,738

(22) Filed: Jul. 12, 2020

(65) Prior Publication Data

US 2021/0025191 A1 Jan. 28, 2021

Related U.S. Application Data

(60) Provisional application No. 62/878,594, filed on Jul. 25, 2019.

(51) Int. Cl.
| | |
|---|---|
| *E04H 15/30* | (2006.01) |
| *E04H 15/00* | (2006.01) |
| *E04H 15/46* | (2006.01) |
| *E04H 15/28* | (2006.01) |
| *E04H 15/08* | (2006.01) |

(52) U.S. Cl.
CPC ........... *E04H 15/30* (2013.01); *E04H 15/005* (2013.01); *E04H 15/08* (2013.01); *E04H 15/28* (2013.01); *E04H 15/46* (2013.01)

(58) Field of Classification Search
CPC ....... E04H 15/30; E04H 15/005; E04H 15/08; E04H 15/28; E04H 15/46
See application file for complete search history.

(56) References Cited

U.S. PATENT DOCUMENTS

| | | | | |
|---|---|---|---|---|
| 1,946,137 A | * | 2/1934 | Frost | A47C 7/66 |
| | | | | 297/184.17 |
| 2,006,655 A | * | 7/1935 | Roth | E04H 15/38 |
| | | | | 135/132 |
| 2,910,078 A | * | 10/1959 | Schunck | A45B 19/04 |
| | | | | 135/27 |
| 3,017,969 A | | 1/1962 | Nielsen | |
| 3,232,370 A | | 2/1966 | Jaffe | |
| 3,285,260 A | * | 11/1966 | Rowe | E04H 15/58 |
| | | | | 135/132 |
| 4,098,281 A | * | 7/1978 | Bonfilio | E04H 15/38 |
| | | | | 135/118 |
| 4,516,620 A | | 5/1985 | Mulhern | |
| 4,658,843 A | * | 4/1987 | Raymond | A45B 23/00 |
| | | | | 135/19.5 |
| 4,838,525 A | | 6/1989 | Snow | |
| 4,981,152 A | | 1/1991 | Laurent | |

(Continued)

*Primary Examiner* — Noah Chandler Hawk

(57) ABSTRACT

A five-device-in-one awning includes: a spline hub, arched splines screwed to the spline hub, arched spline-extension prongs inserted into arched splines, elevator booms, an automatic-sliding elevator lock slidably attached to the arched splines, an elevator-lock lever attached to the elevator lock, elevator-boom hand paddles attached to the elevator booms, an adjustable dome attached to the arched spline-extension prongs for functioning as a weather shield or as a privacy shield or as a domed truck-bed cover or as a domed truck-side tent or as a curved projection screen or as a truck-side awning or as a tailgate awning or as an awning, a foot-stabilizing-and-reversing plate, and an attachable insertable reversible arch foot and attachable insertable reversible dual-arch feet screwed to the foot-stabilizing-and-reversing plate and the spline hub for attaching to a utility port or to a trailer hitch or to a tailgate slot of a pickup truck bed.

20 Claims, 53 Drawing Sheets

(56) References Cited

U.S. PATENT DOCUMENTS

| | | | |
|---|---|---|---|
| 5,287,909 A | 2/1994 | King | |
| D359,161 S | 6/1995 | Byrne | |
| D363,597 S | 10/1995 | Byrne | |
| 5,553,648 A | 9/1996 | Goharjou | |
| 5,730,666 A | 3/1998 | Hudson | |
| D422,796 S | 4/2000 | Milligan | |
| 6,068,041 A | 5/2000 | Miles | |
| 6,161,320 A | 12/2000 | Peterson | |
| 6,206,079 B1 | 3/2001 | Selgrad | |
| 6,332,284 B1 | 12/2001 | Tafforeau | |
| 6,622,771 B2 | 9/2003 | Plockmeyer | |
| 6,631,751 B2 | 10/2003 | Coles | |
| 6,745,787 B1 * | 6/2004 | Curtis | E04H 15/003 135/117 |
| 6,896,028 B2 | 5/2005 | Brennan | |
| 7,316,257 B2 | 1/2008 | Cameron | |
| 8,006,420 B2 | 8/2011 | Merner | |
| 8,365,798 B2 | 2/2013 | Feldpausch | |
| 8,403,021 B1 | 3/2013 | Peterson | |
| 9,051,751 B2 | 6/2015 | Ogilvie | |
| 9,622,468 B2 * | 4/2017 | Downard | A45B 23/00 |
| 9,920,520 B2 | 3/2018 | Udagawa | |
| 2002/0043352 A1 | 4/2002 | Stannis | |
| 2003/0051832 A1 | 3/2003 | Plockmeyer | |
| 2004/0140066 A1 | 7/2004 | Brennan | |

\* cited by examiner

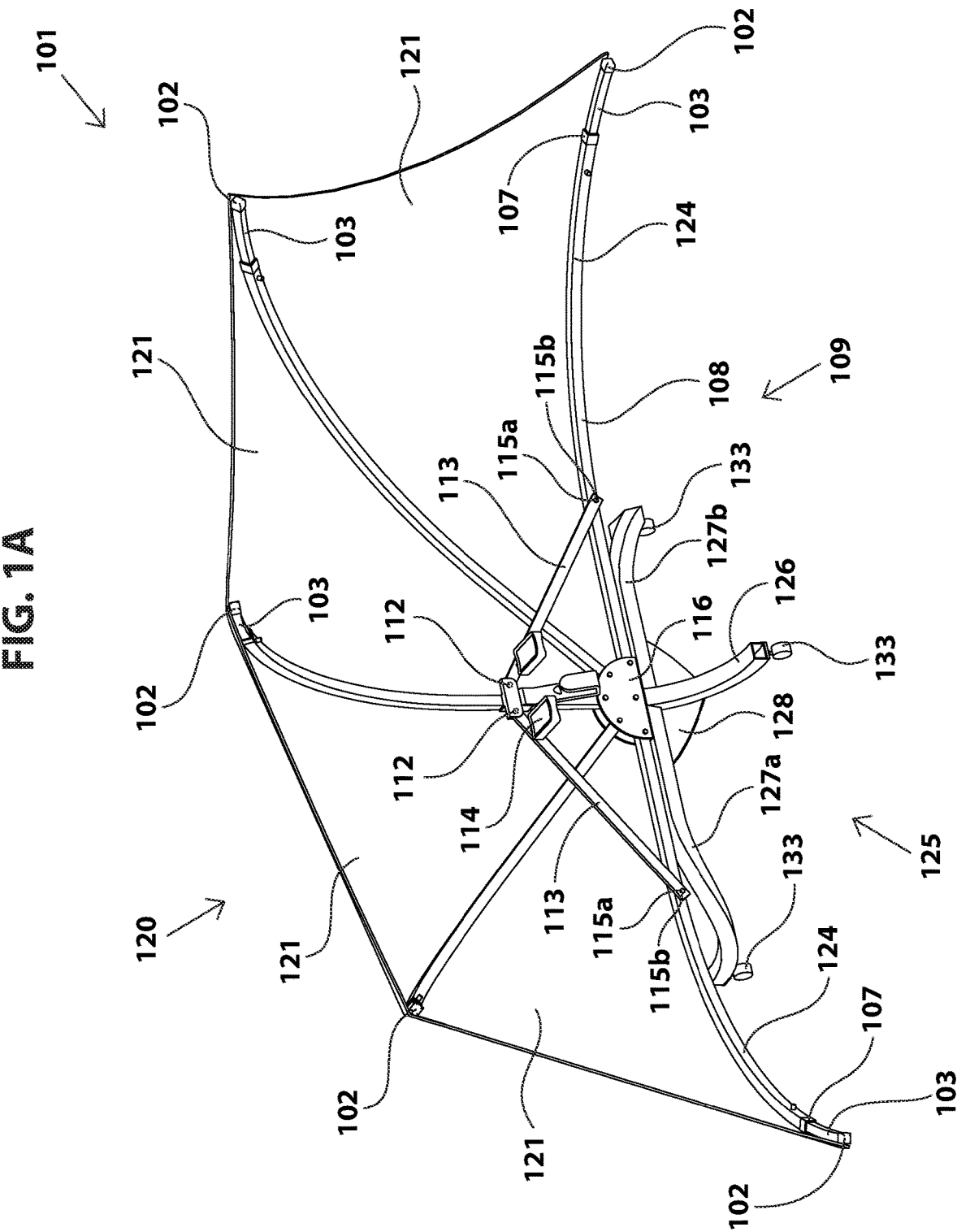

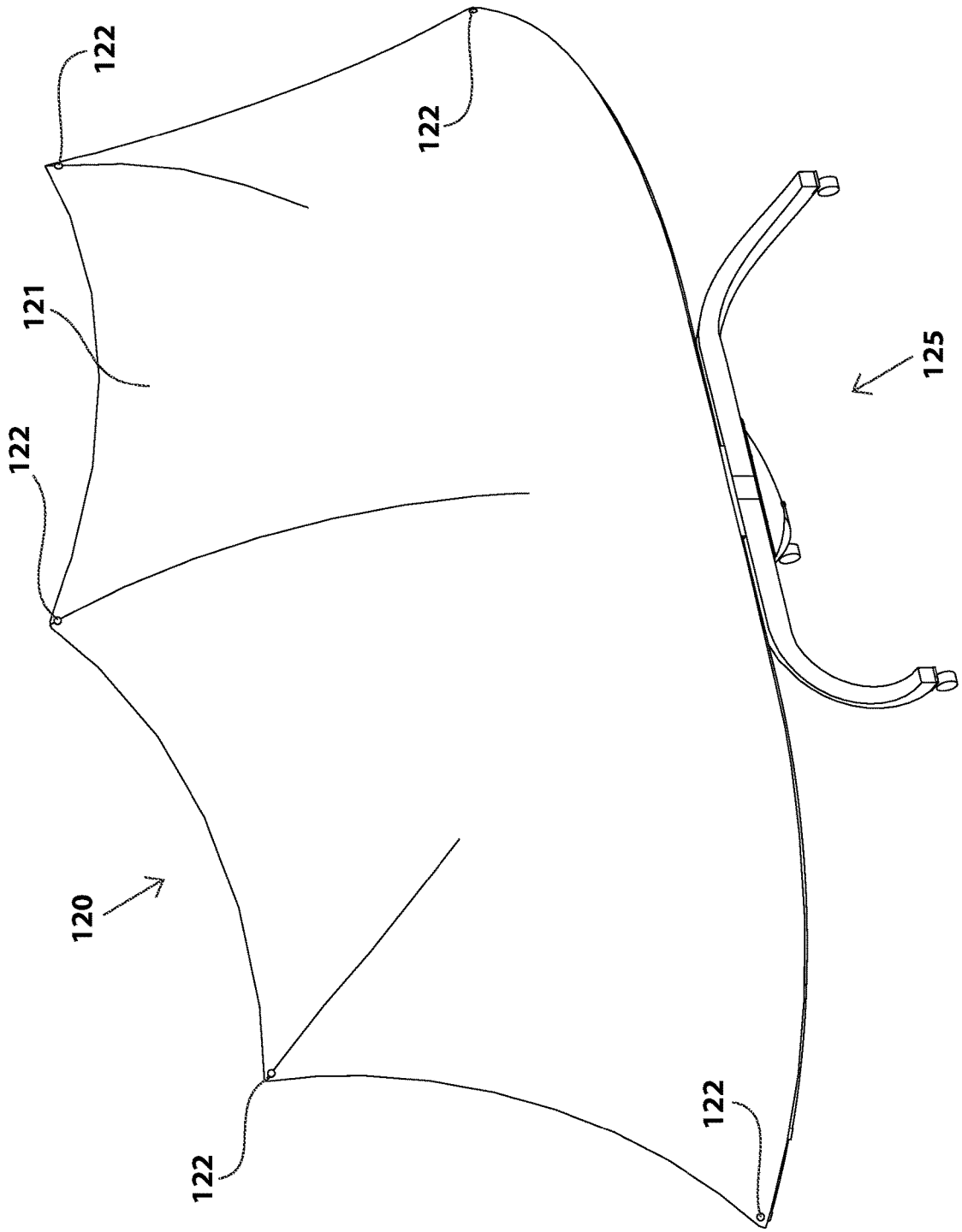

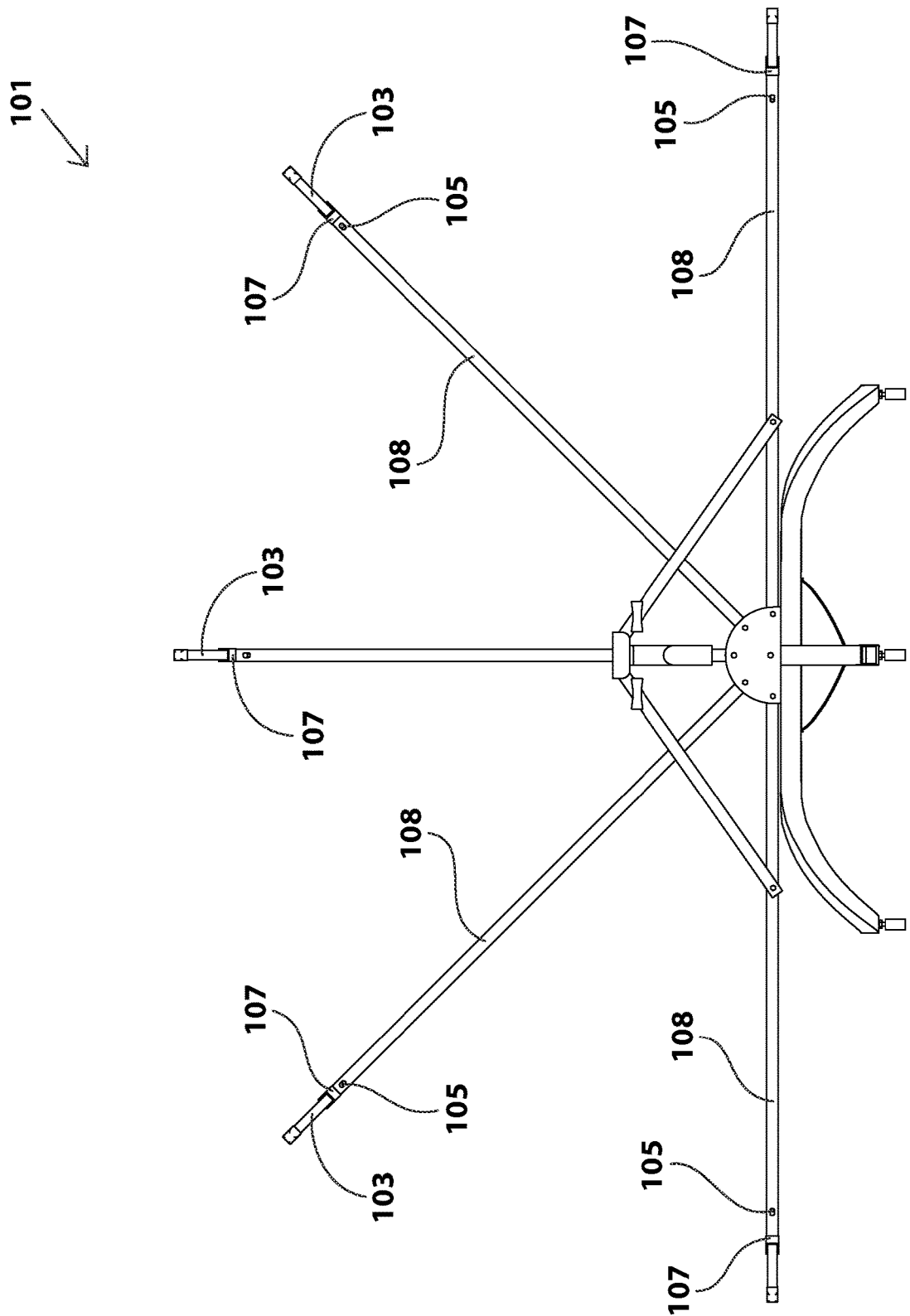

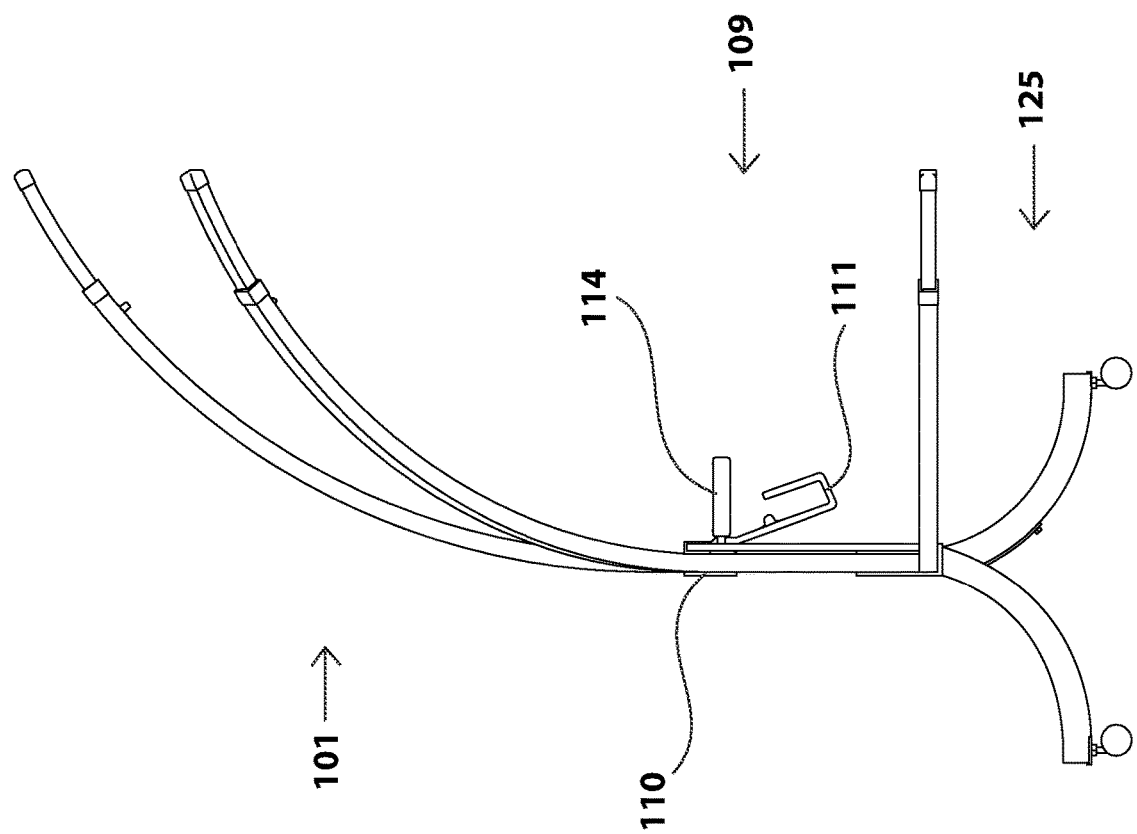

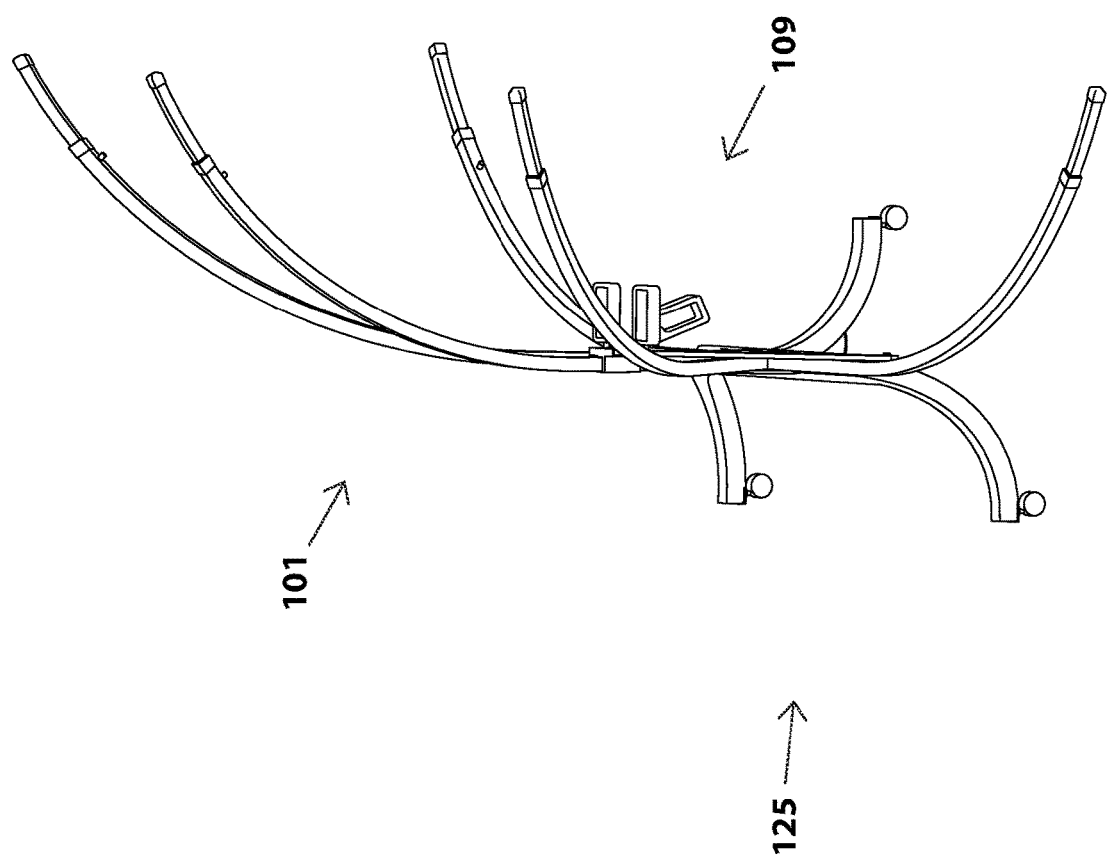

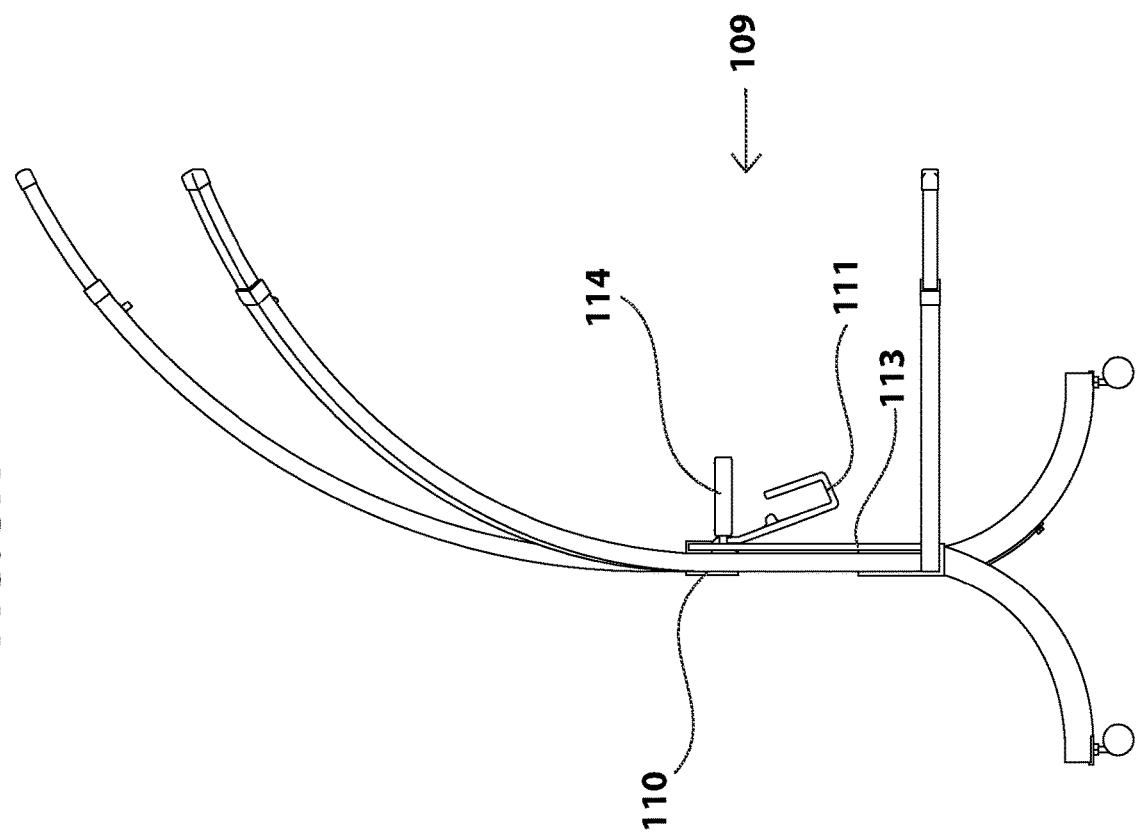

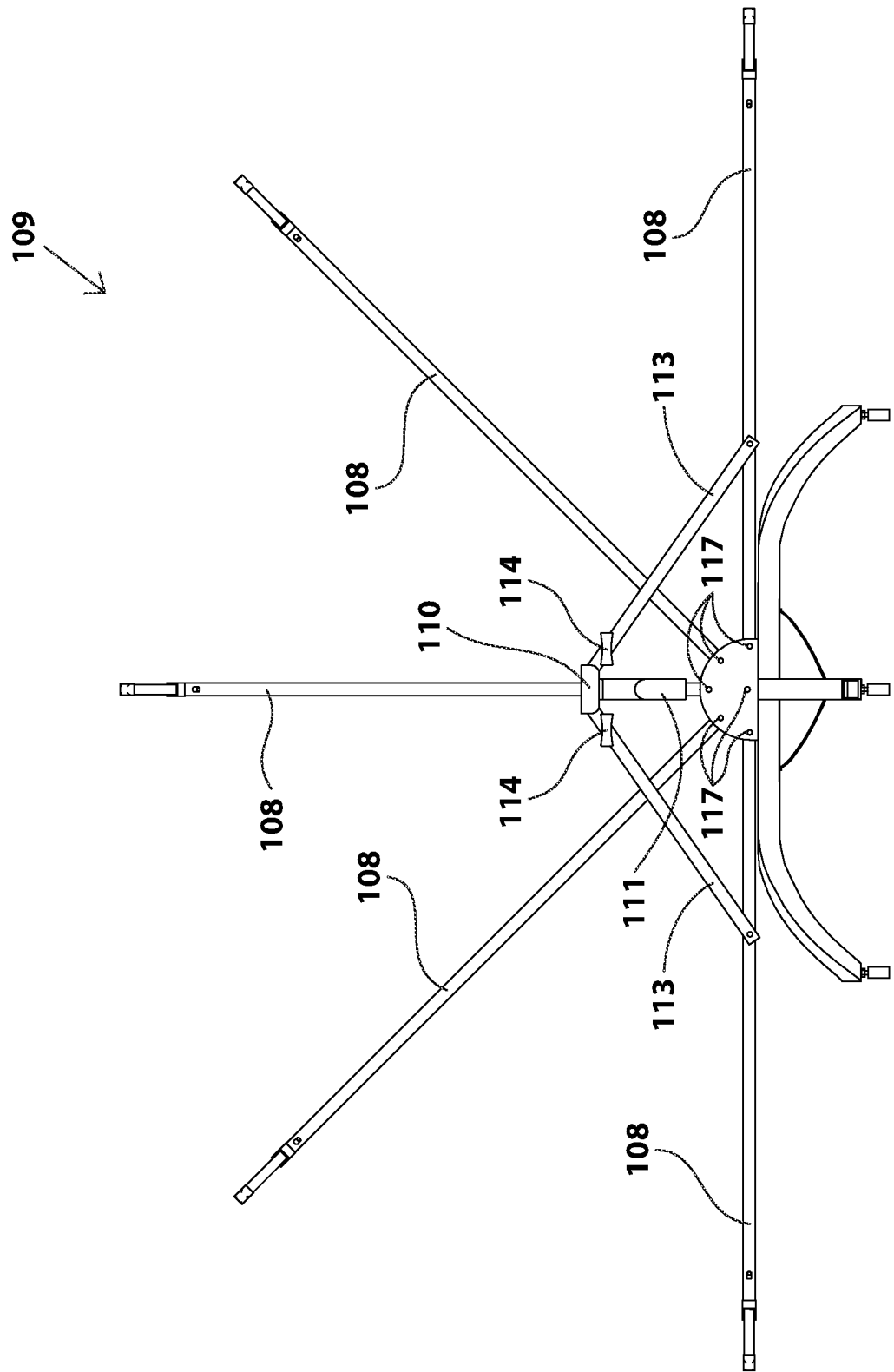

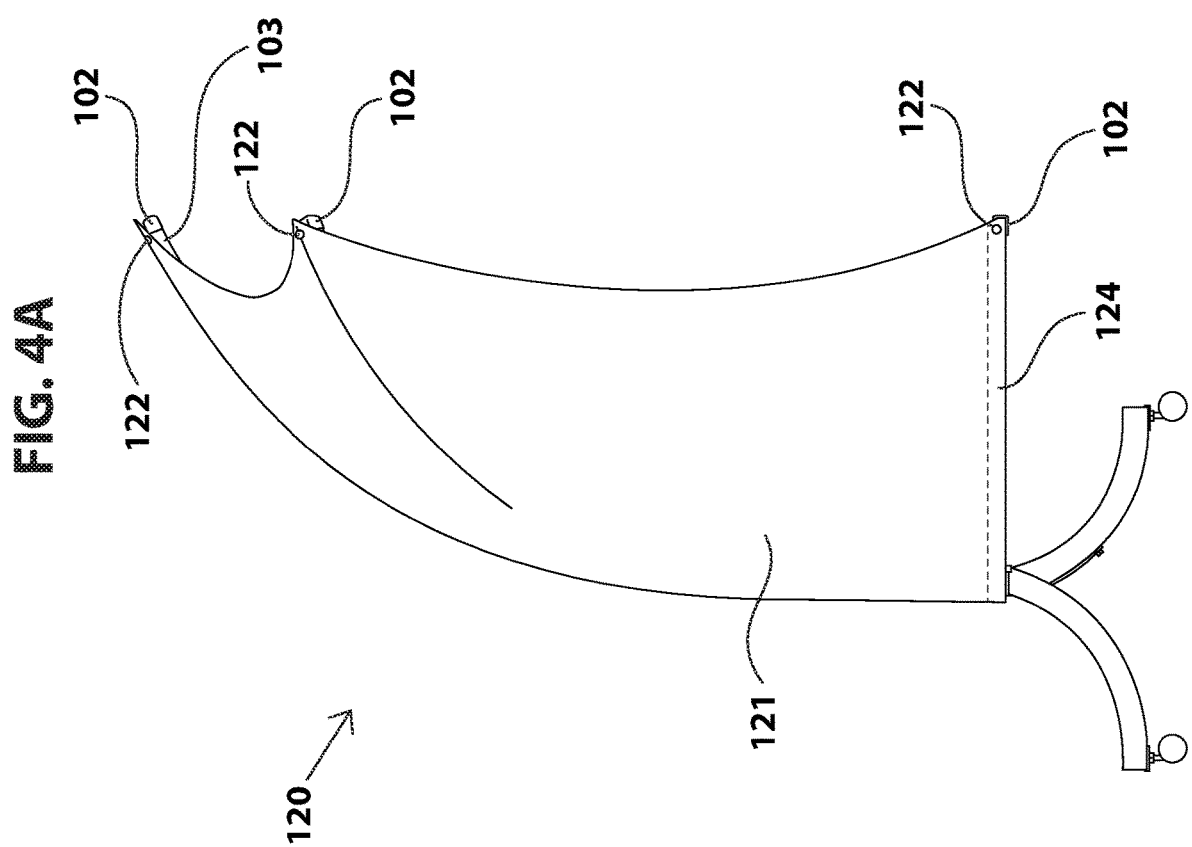

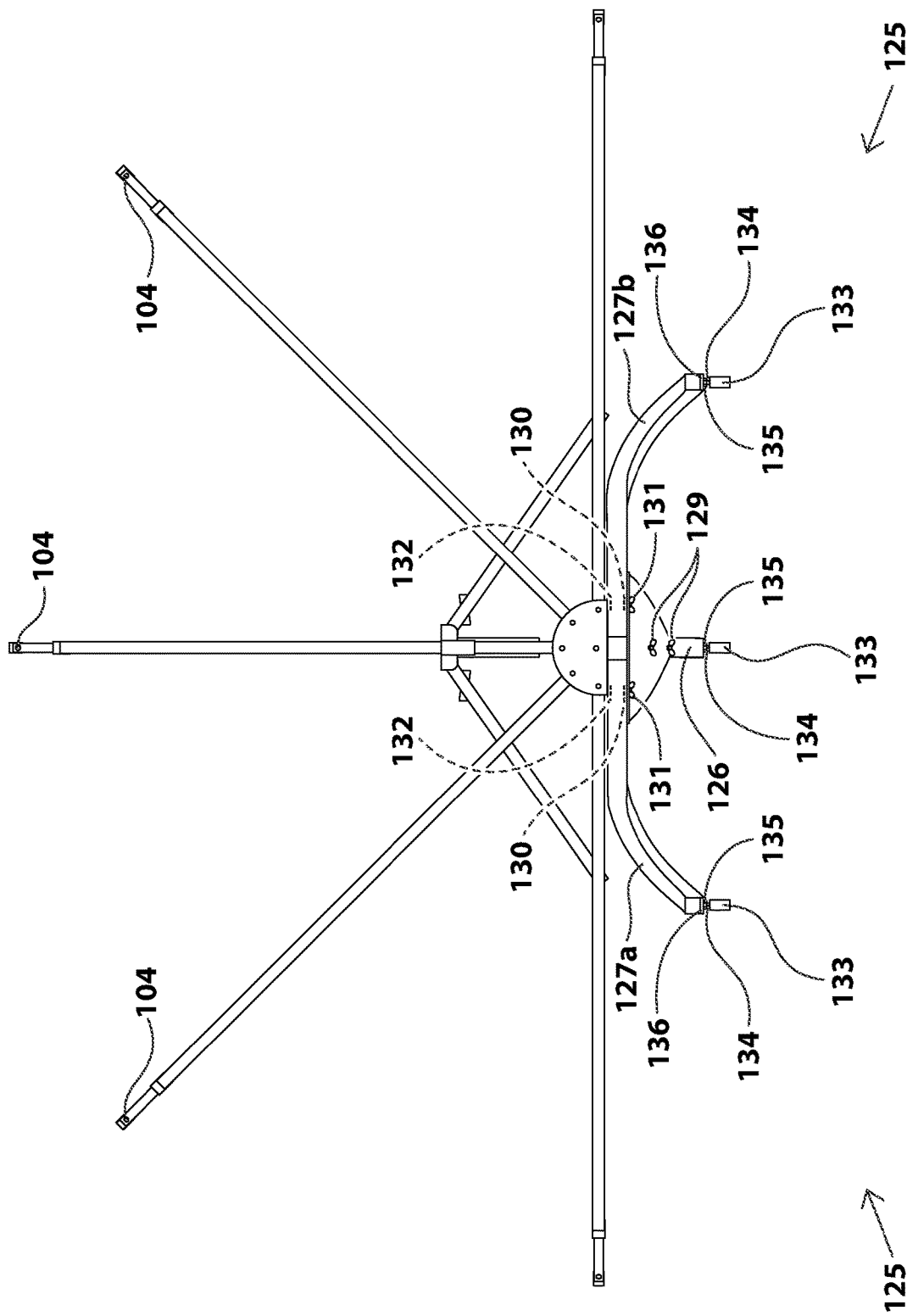

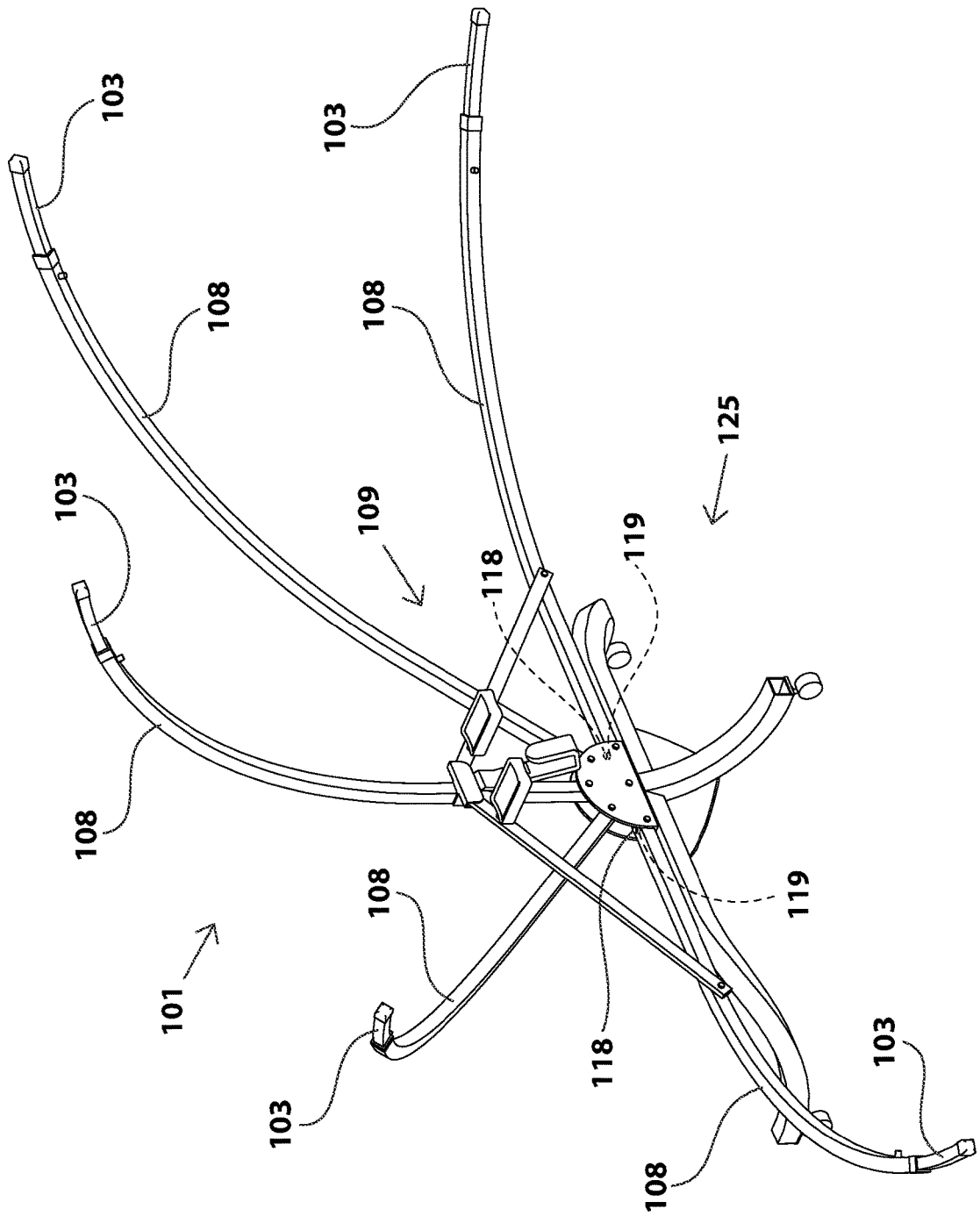

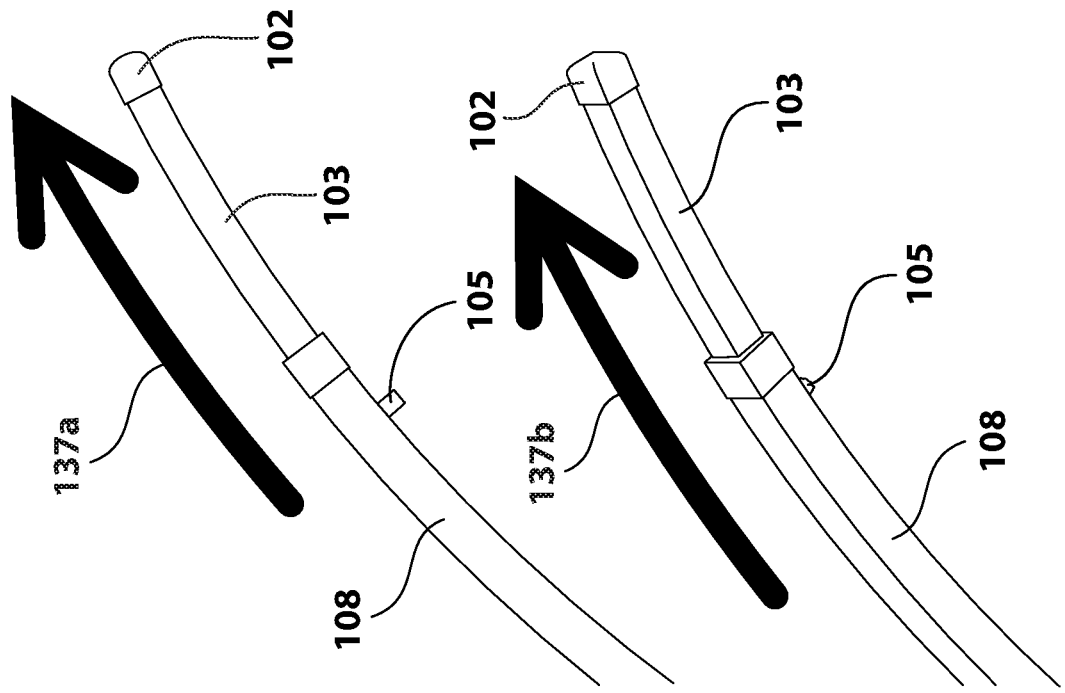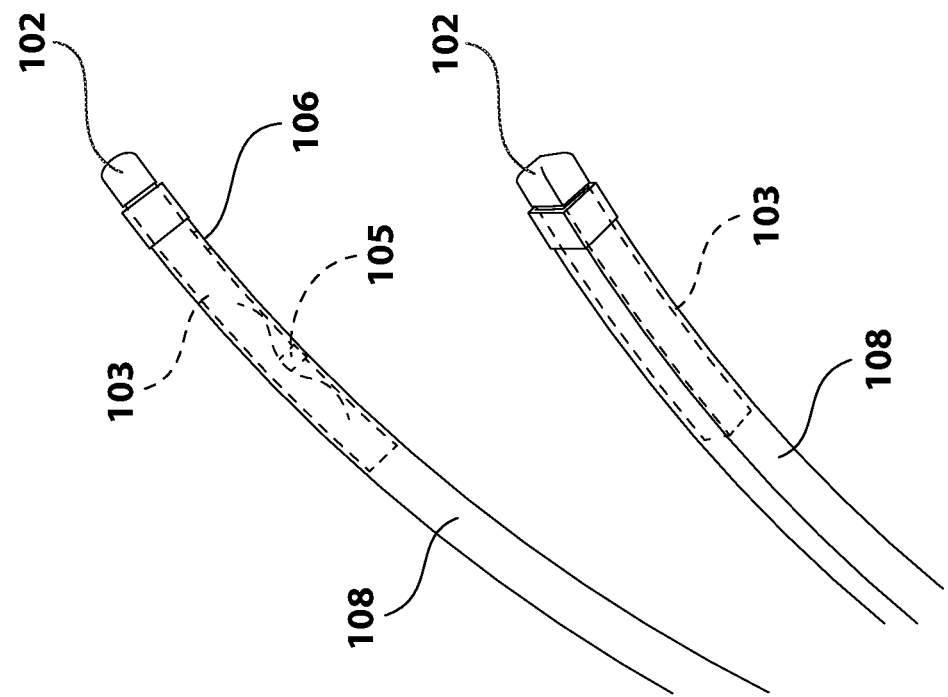

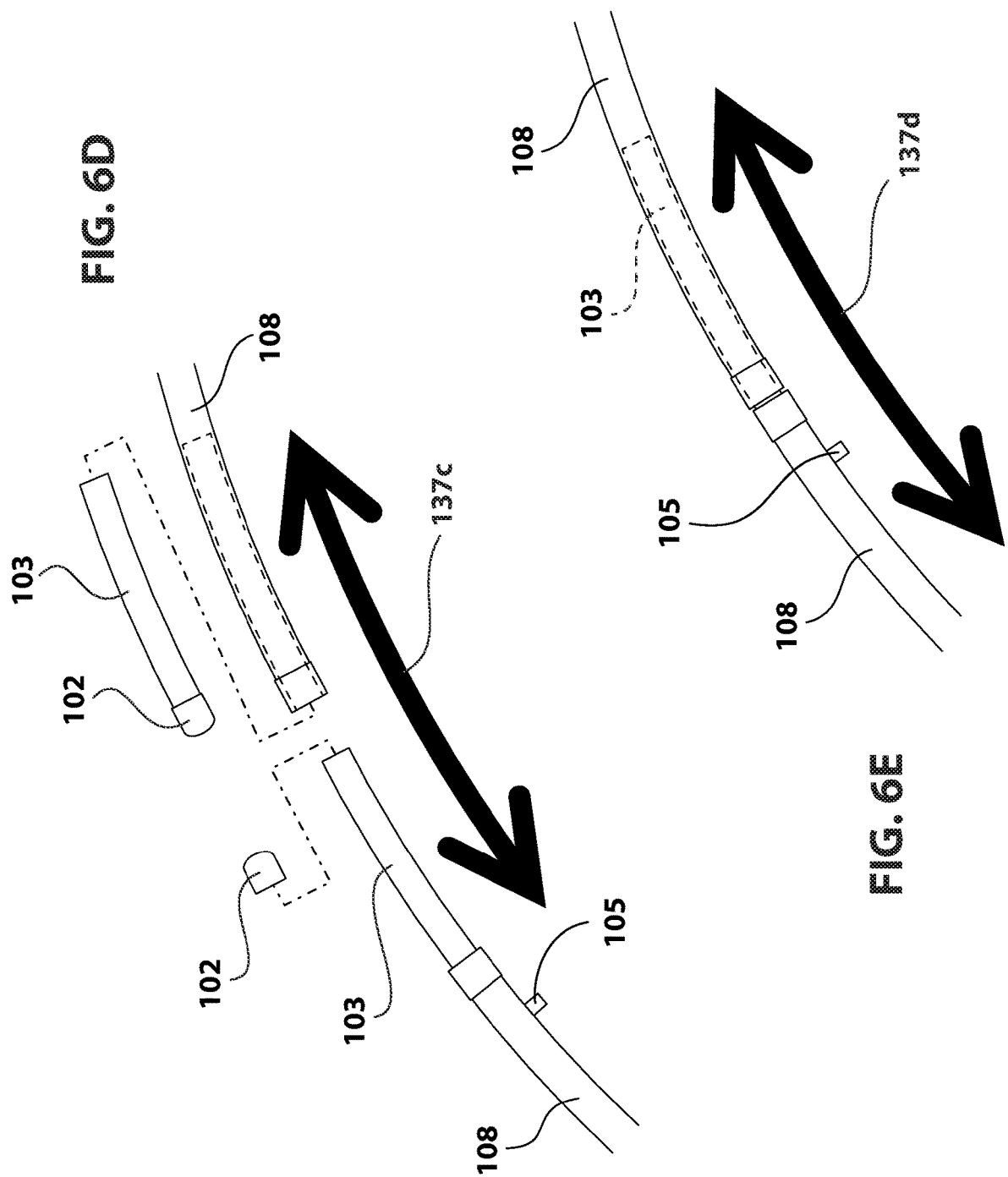

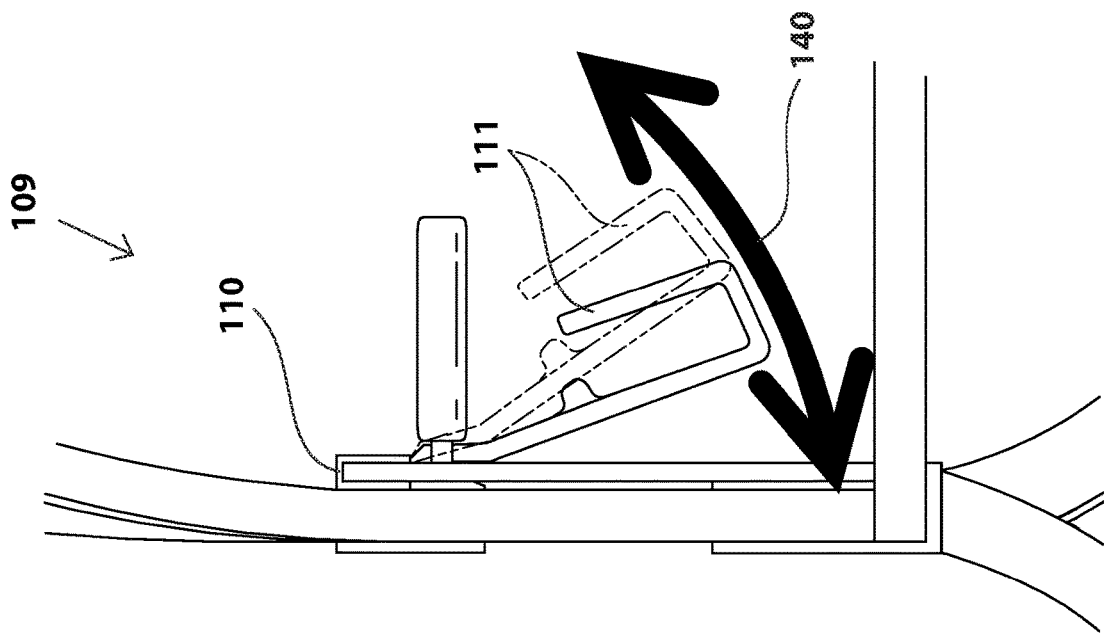
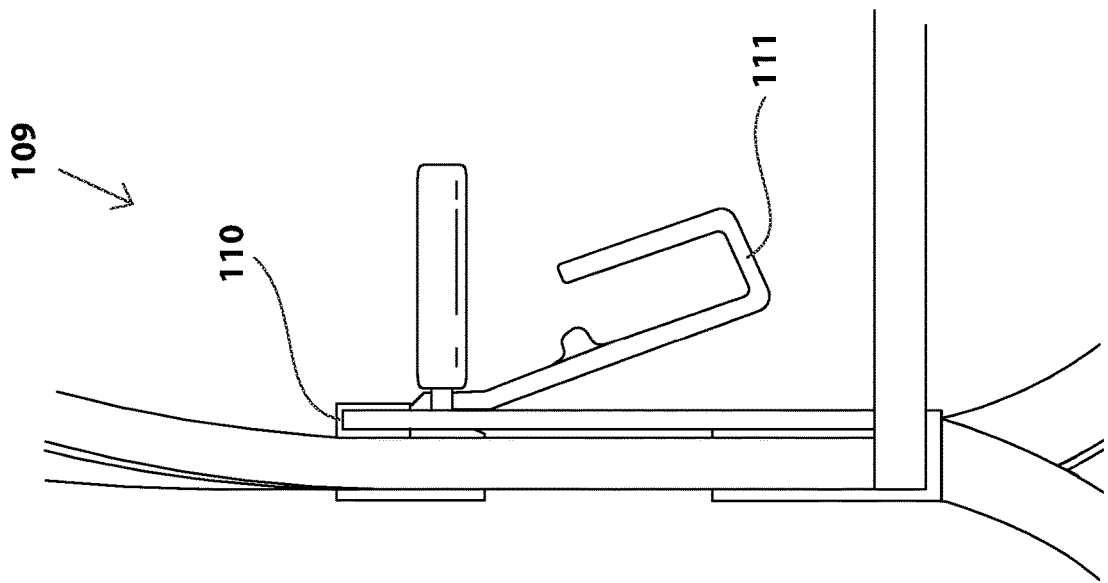

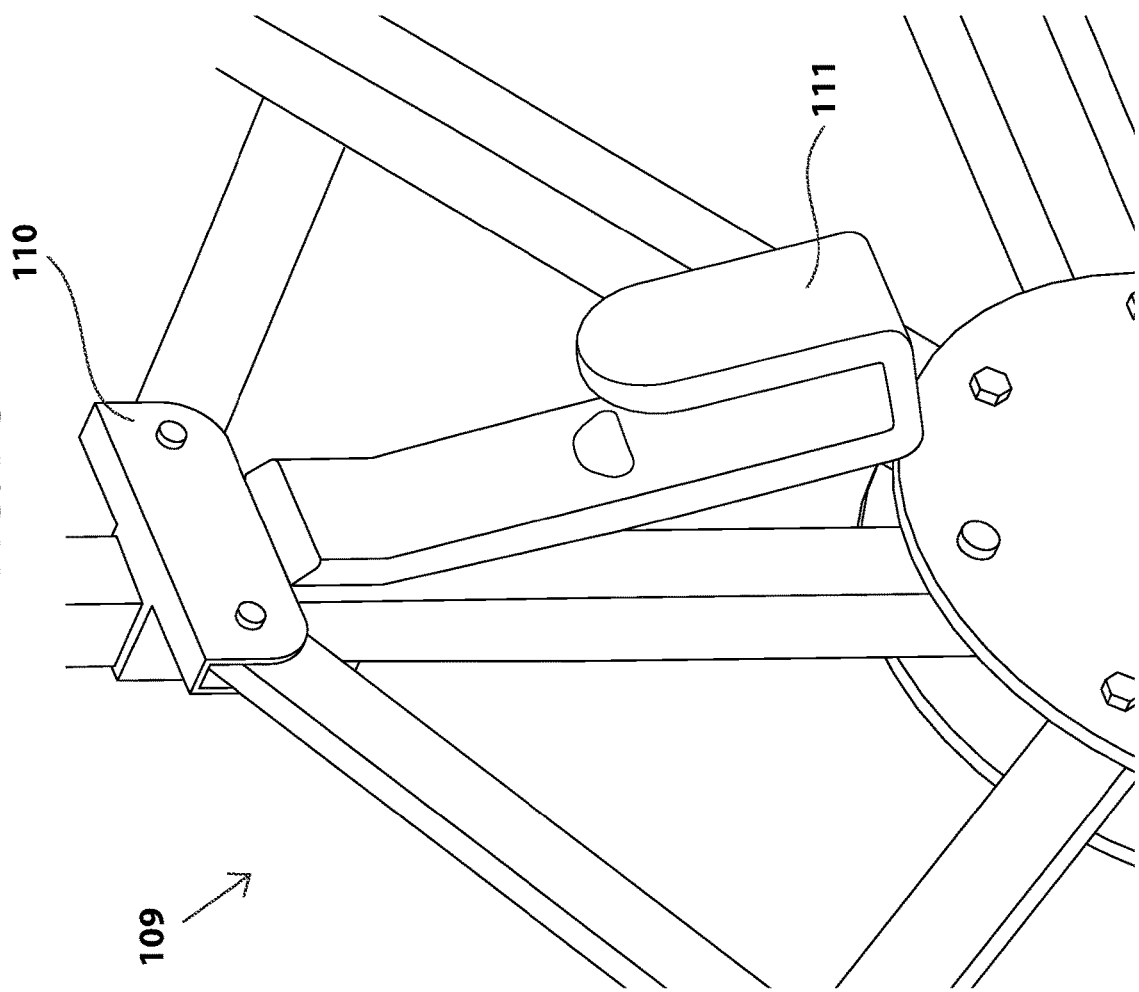

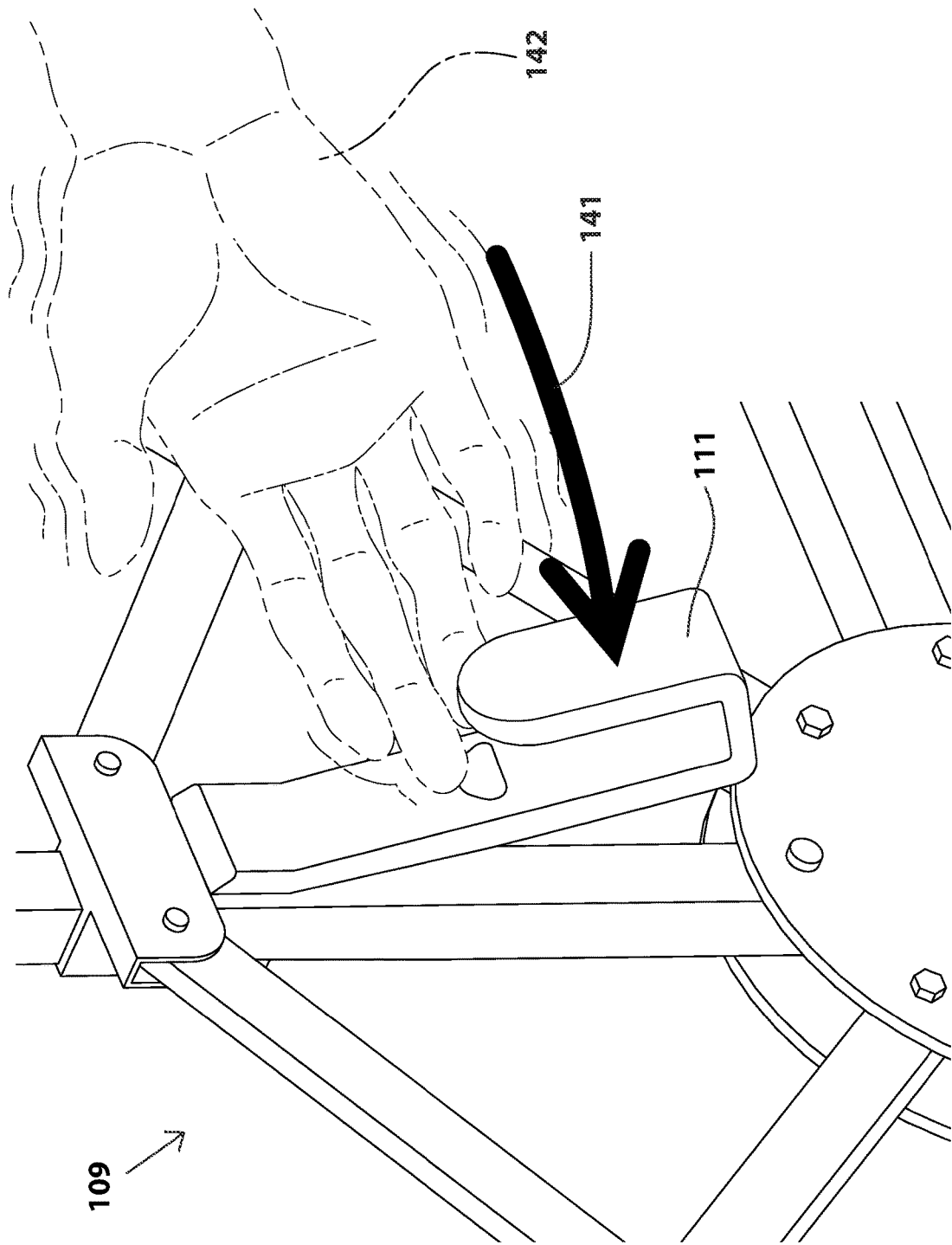

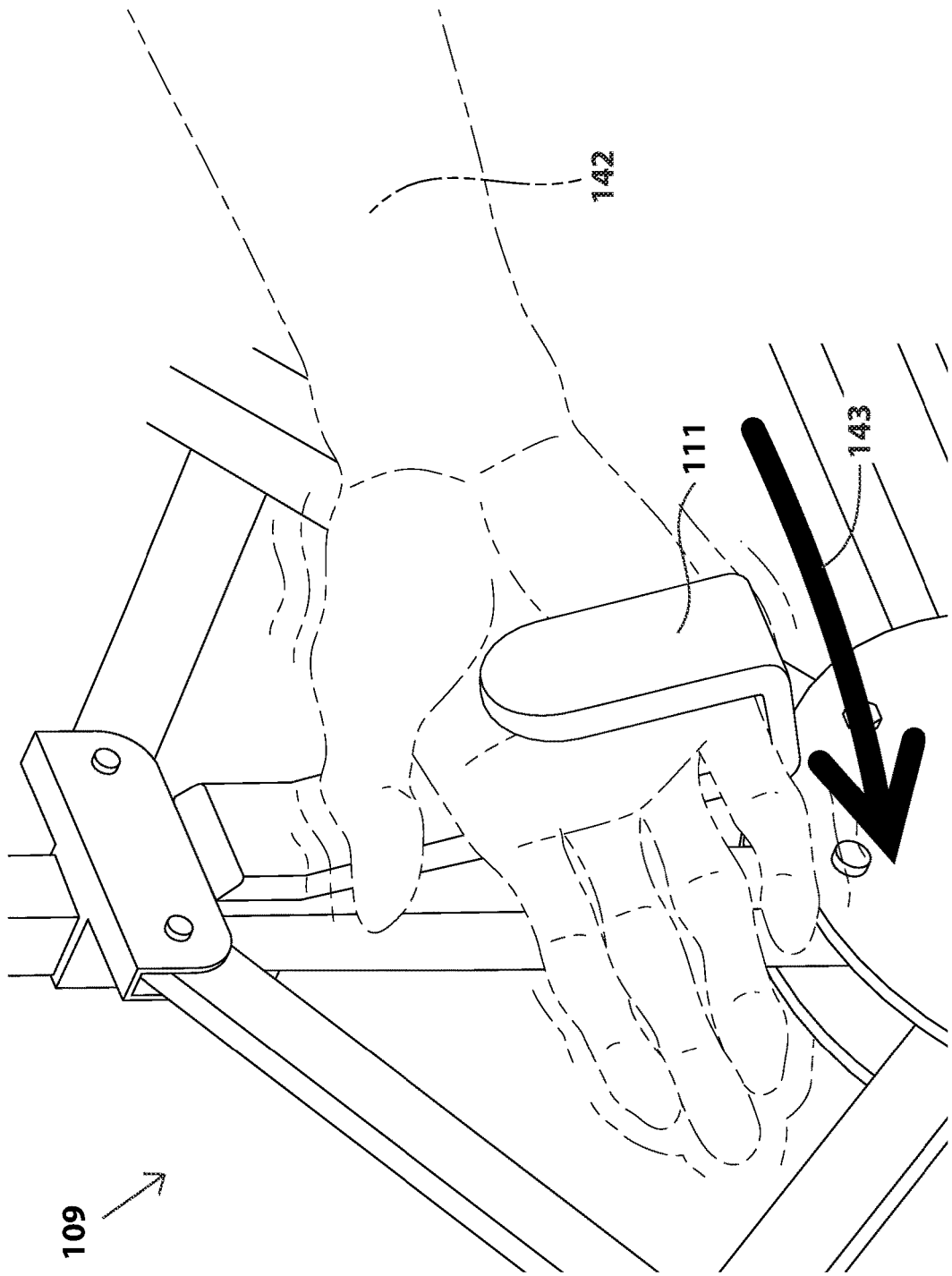

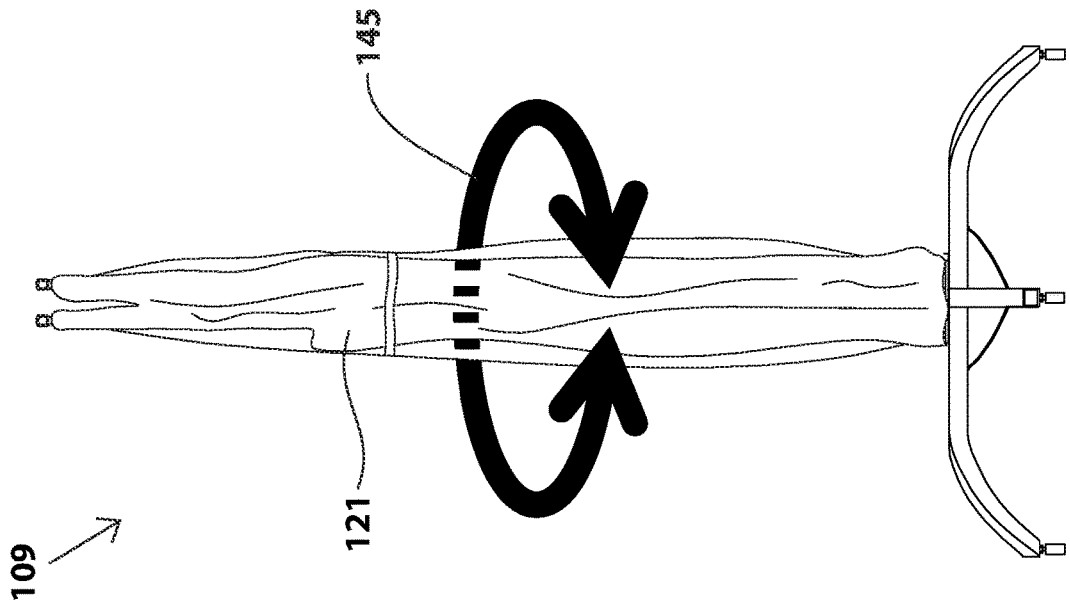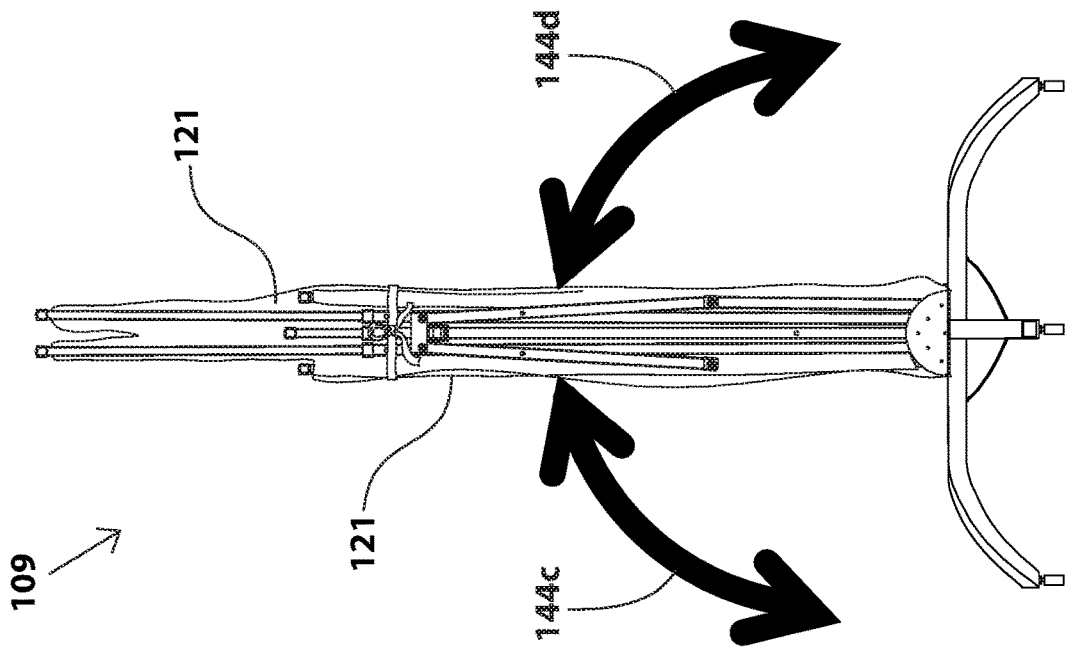

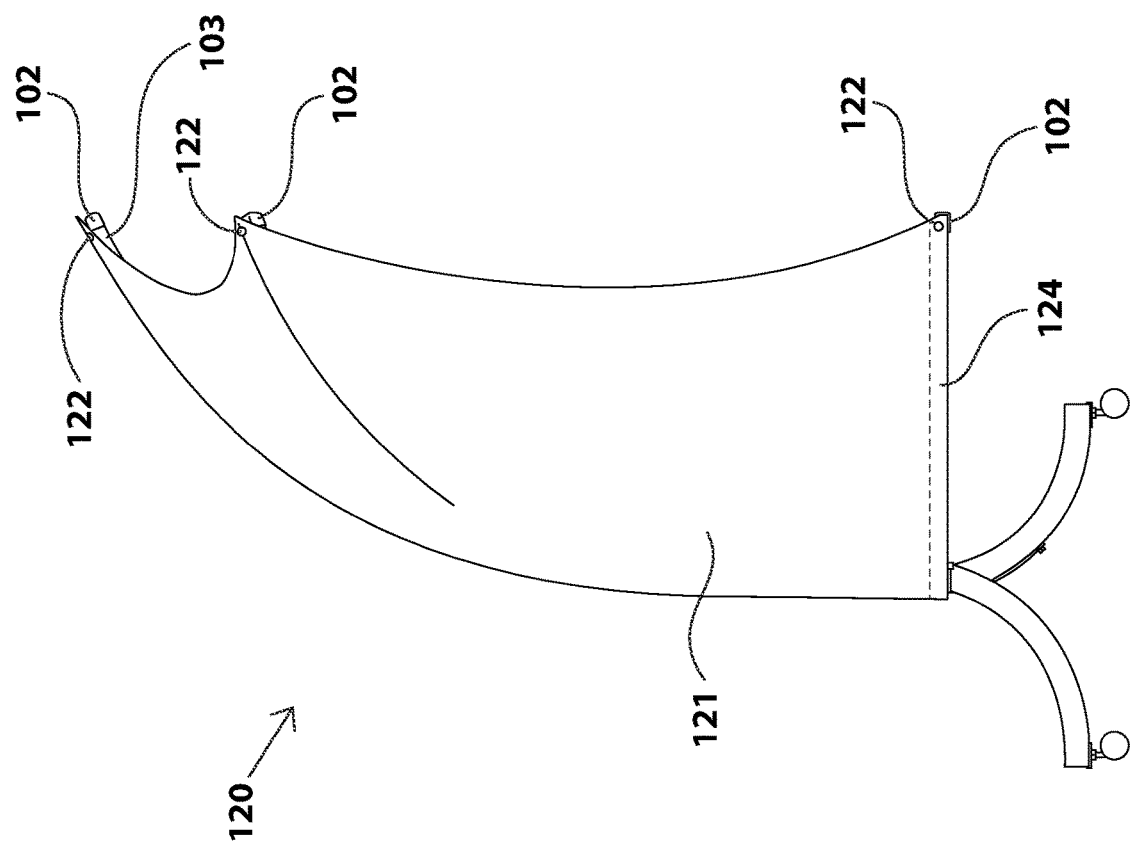

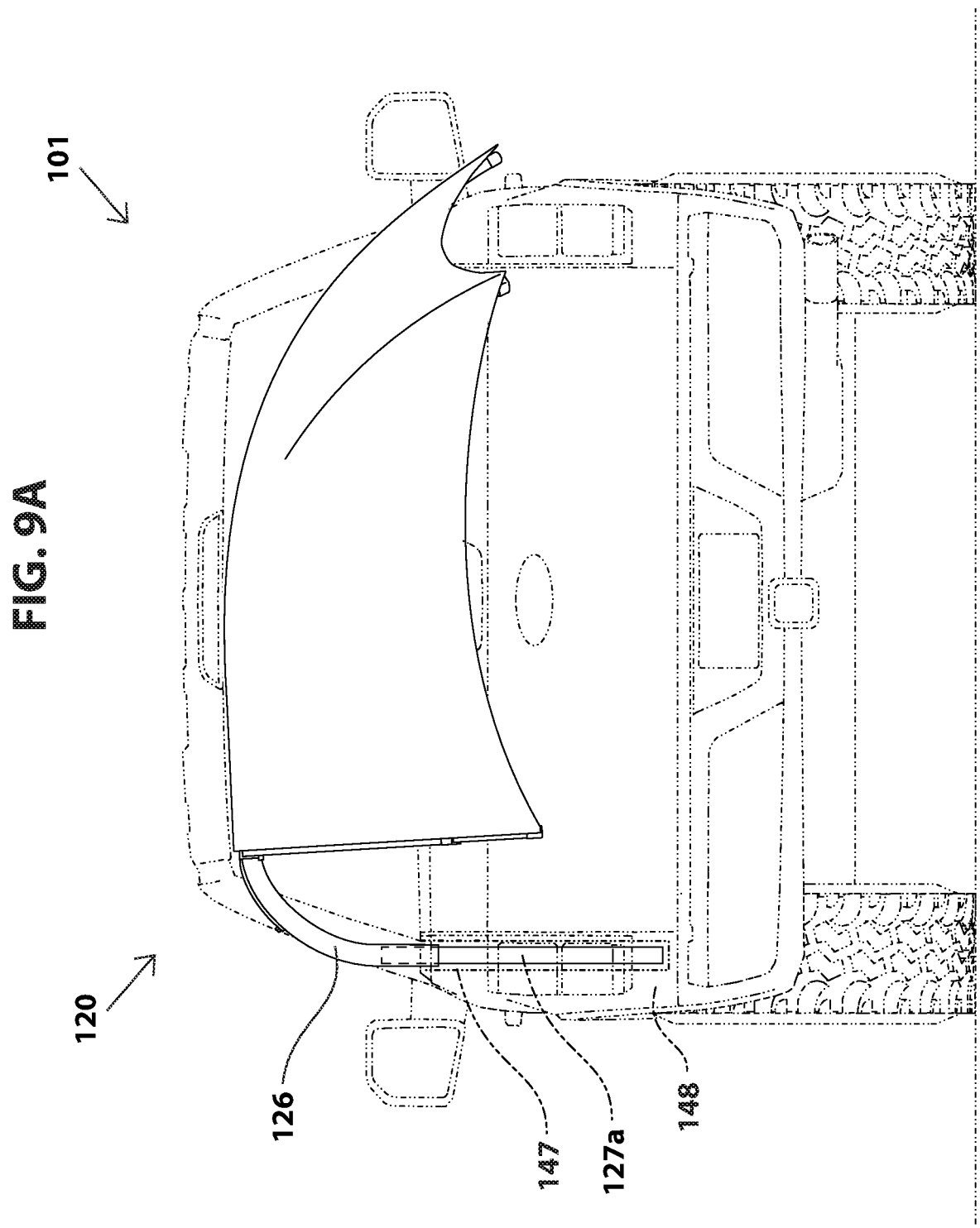

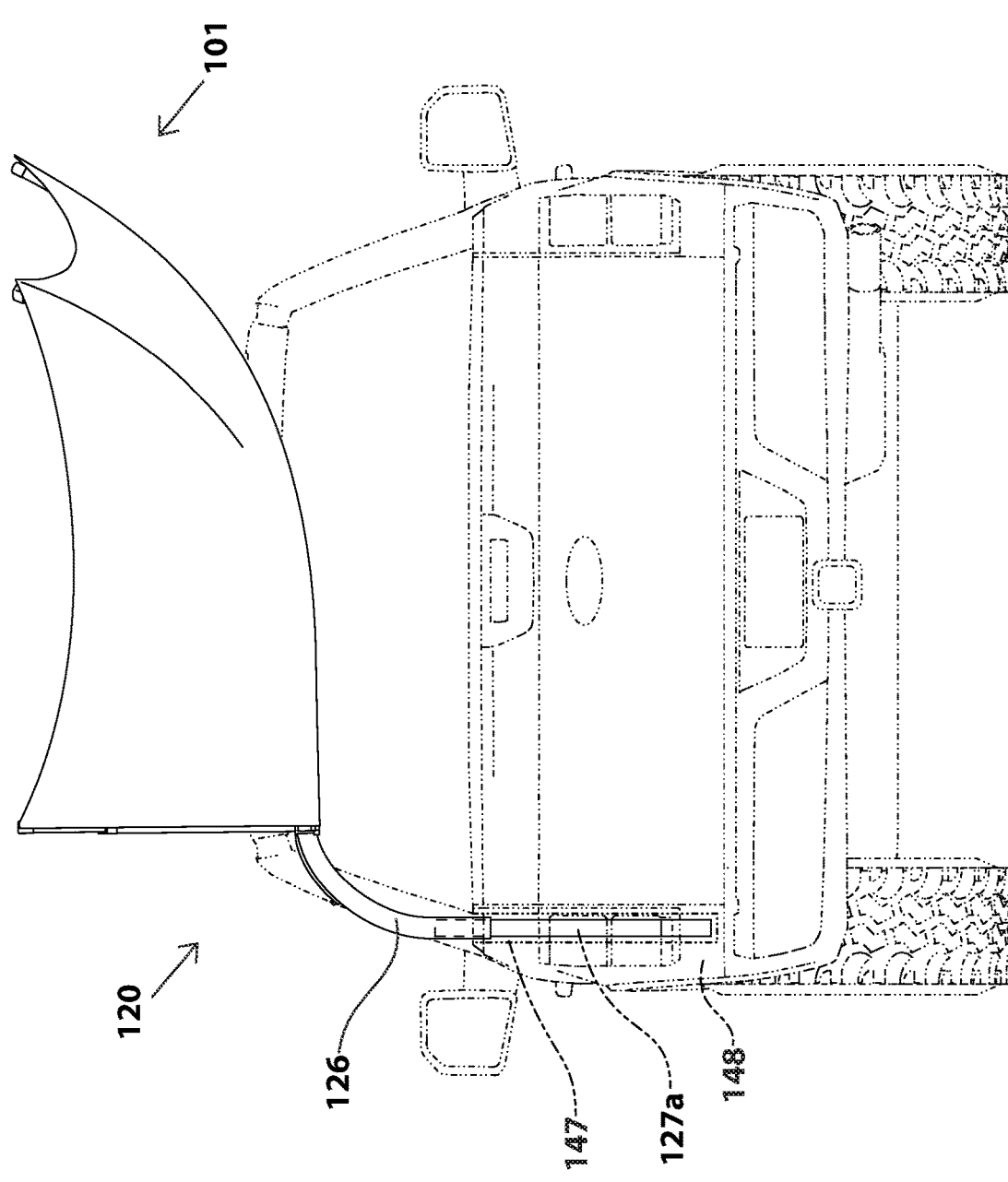

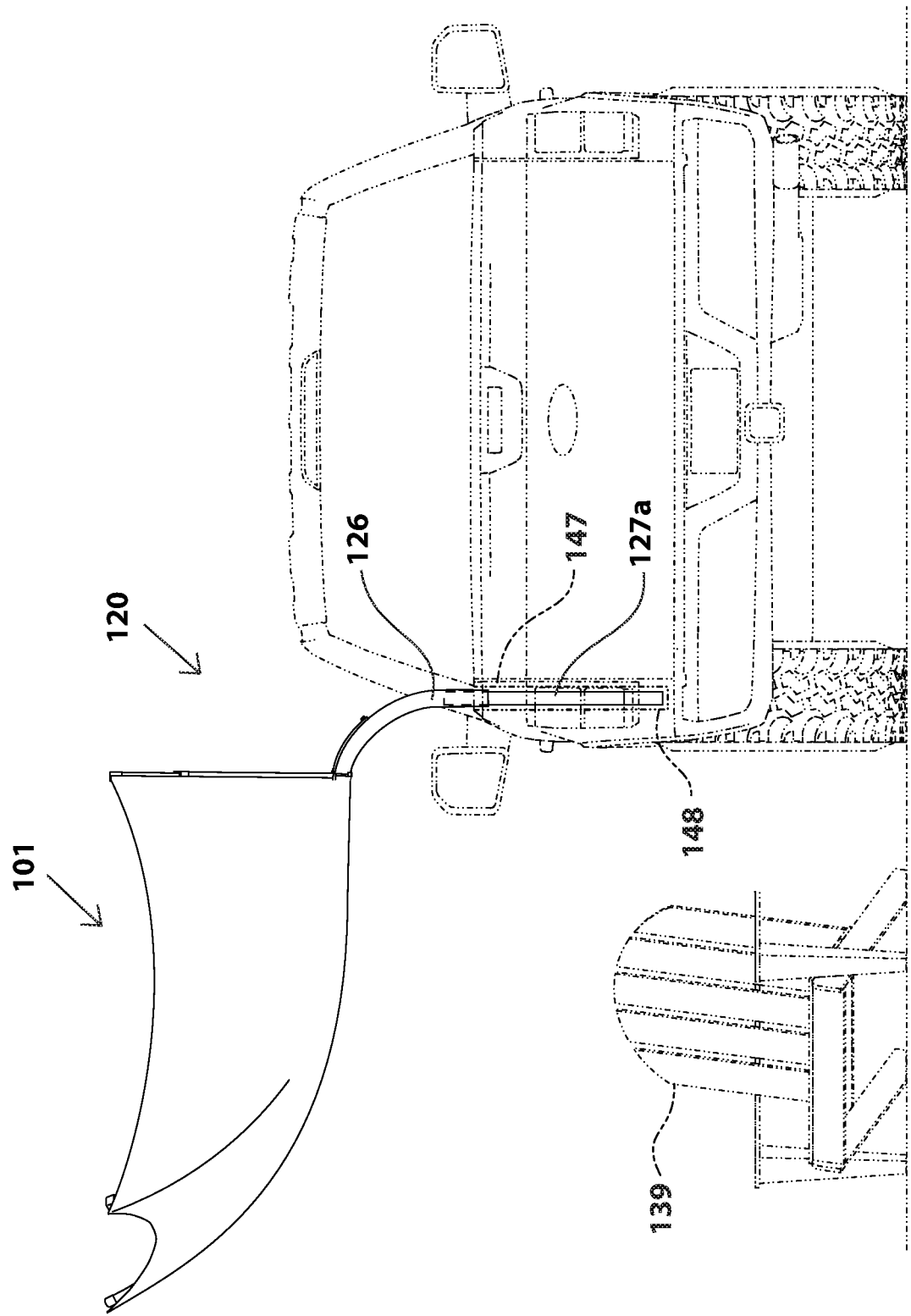

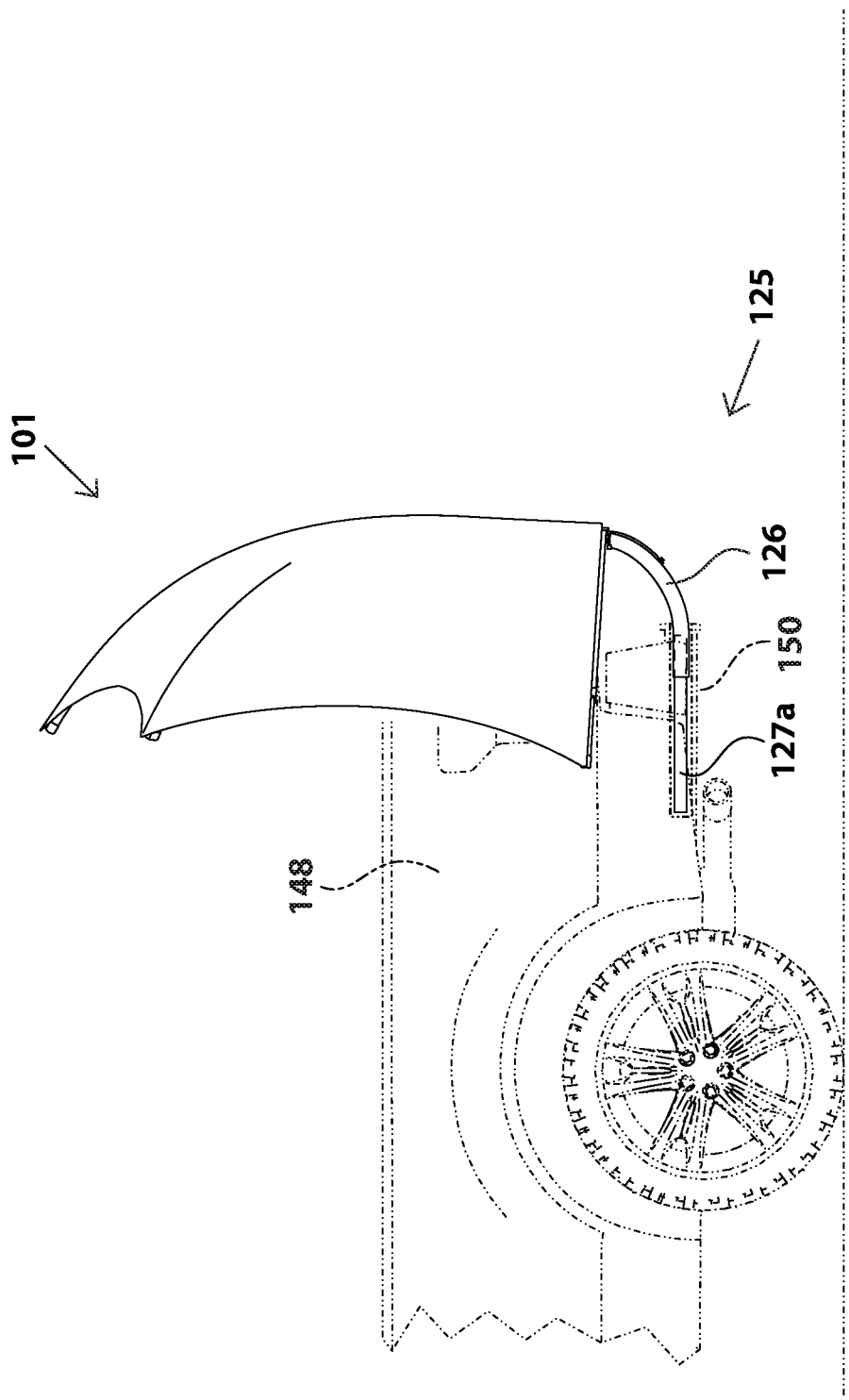

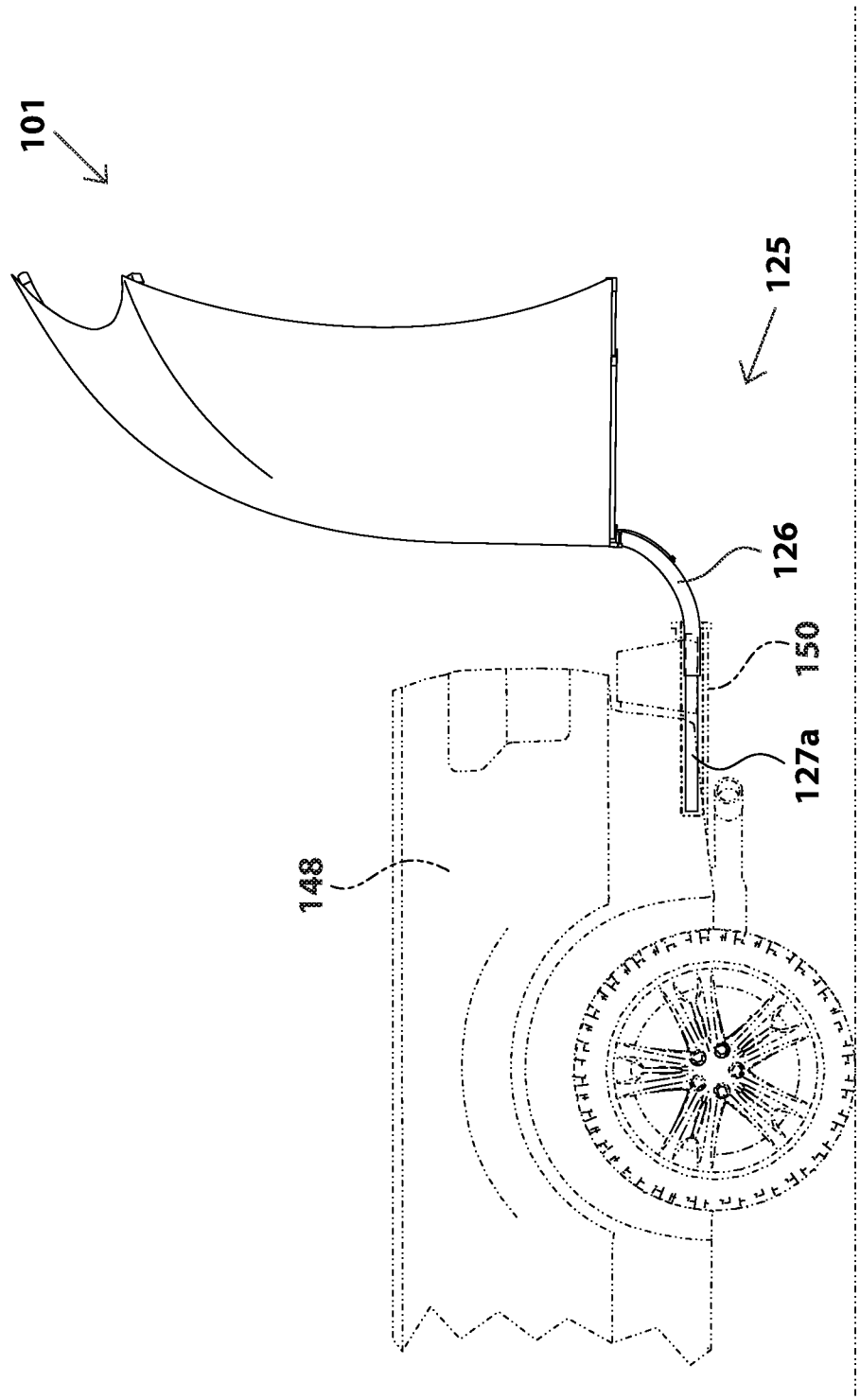

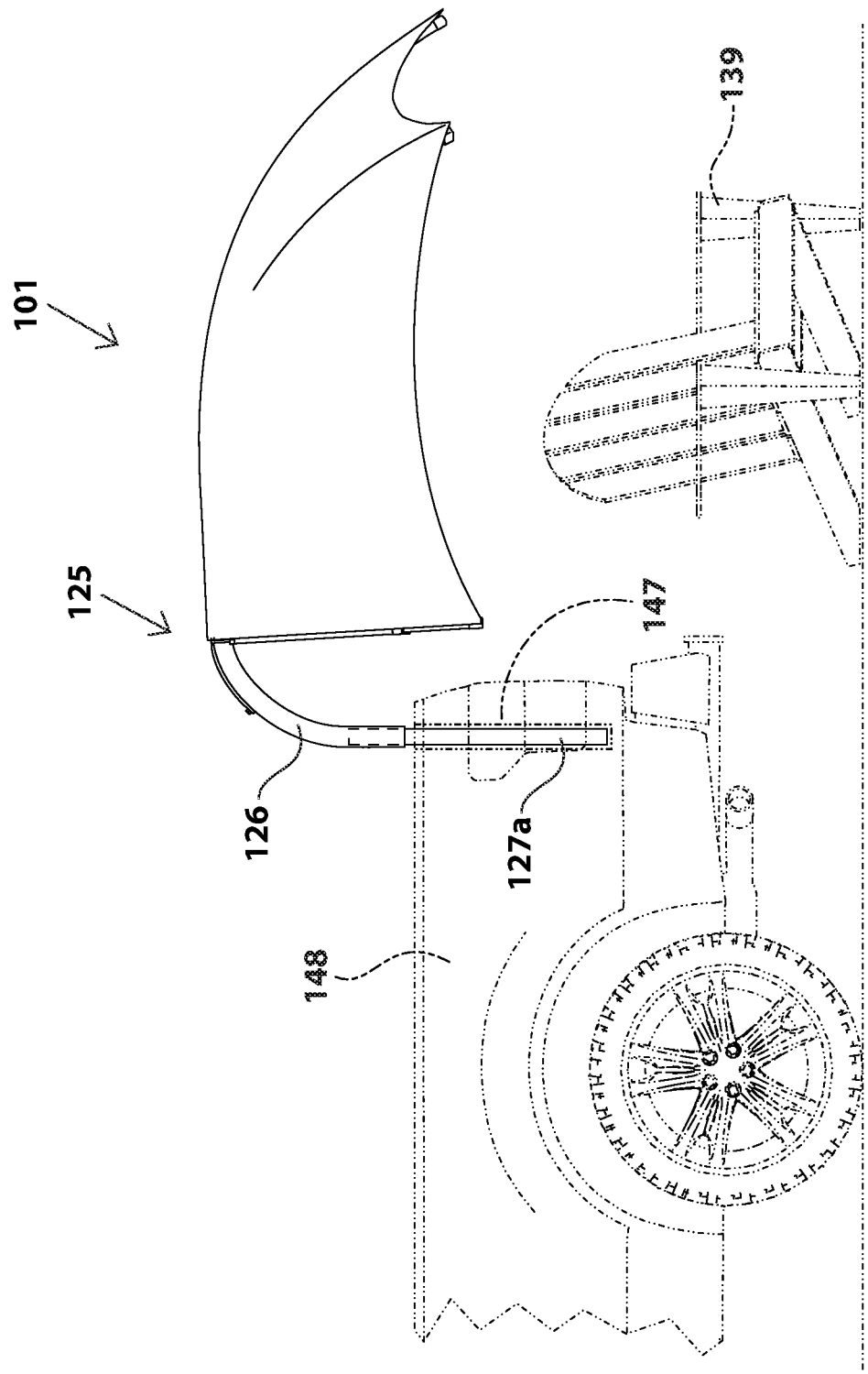

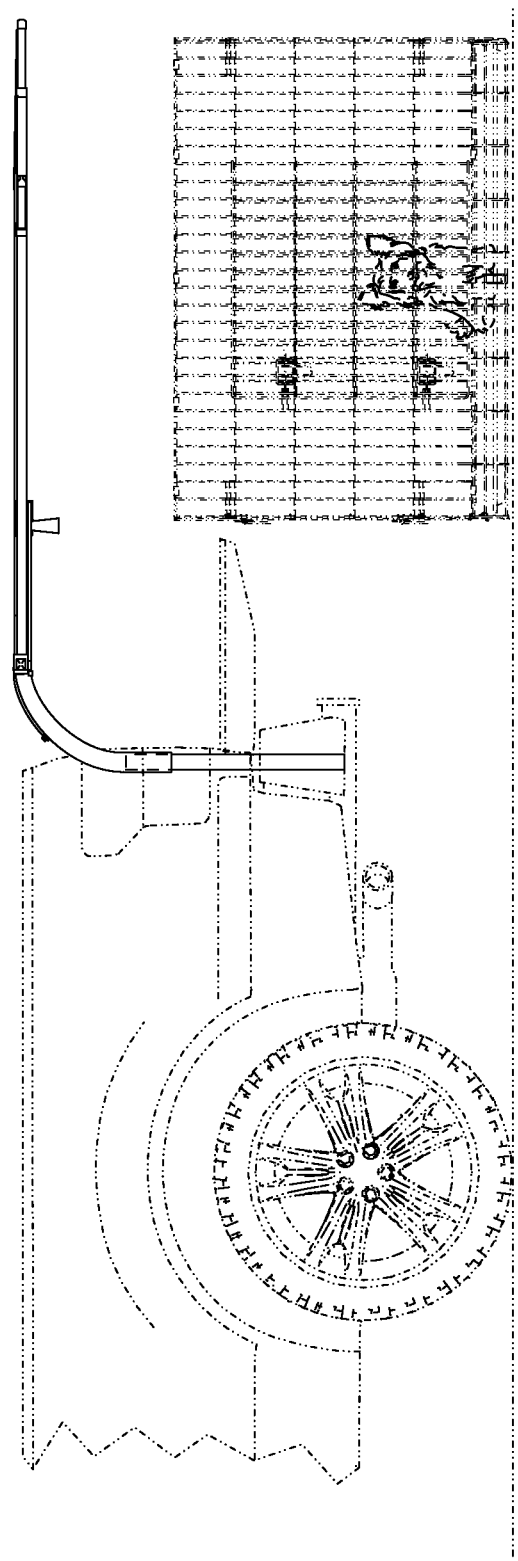

FIVE-DEVICE-IN-ONE SCREEN AWNING

REFERENCE TO PREVIOUSLY FILED PROVISIONAL PATENT APPLICATION

Provisional Patent Application No. 62/878,594 was filed on Jul. 25, 2019.

1. FIELD OF THE INVENTION

The present invention relates to a folding screen, which can be used as five different devices in one by a person with an arthritic hand, is cheap to produce, is easy to ship as one unit, can quickly and easily be assembled and disassembled, and can quickly and be easily folded and unfolded. Particularly, the present invention relates to a five-device-in-one arthritic-aiding reversible sun-blocking projector-screening event-sheltering vehicle-awning cupola, comprising:
1) Arthritic-aiding multi-function multi-unit-attaching cupola-spline system,
2) Arthritic-aiding cupola-spline-elevating and tensioning system,
3) Adjustable-utilitarian-volume double-sided-function dome system, and
4) Multi-unit-attaching utility-port trailer-hitch and tailgate-slot insertable and reversible tripod system.

2. DESCRIPTION OF THE PRIOR ART

A number of folding screens have been introduced.

U.S. Pat. No. 3,017,969, issued 1962 Jan. 23, to Harold R. Nielsen, discloses a portable privacy screen, that can easily be moved. Multiple screens can be used to create rows of walls to give privacy to the people therein.

U.S. Pat. No. 3,232,370, issued 1966 Feb. 1, to J. Christopher Jaffe, discloses a privacy screen, that is made of flexible materials that allow it to be stored compactly when not in use. The screens are made in such a way that they can be lined up in rows to create a longer wall for privacy. The frame of the screens are built to have means of transportation to make moving them easier.

U.S. Pat. No. 4,516,620, issued 1985 May 14, to Louise J. Mulhern, discloses a privacy screen module, that is free standing and may be joined with similar modules to make up a screened area. The screen module comprises a self-supporting stand having a hexagonal shape with parallel sides and a pair of end faces at each end, the pair of end faces having an included angle not greater than about 90.degree., frame having a nontransparent screen surface, the frame having upright members extending from the included angle of the stand, the upright members positioned such that a second screen module can be placed at an angle of up to about 90.degree. on either side from an in-line position adjacent the first screen module, and the upright members of the first and second screen modules retain the same minimum distance apart.

U.S. Pat. No. 4,838,525, issued 1989 Jun. 13, to Claud R. Snow, discloses a barrier shield device, that is foldable and easily portable, for outdoor use in providing wind-protection or other shielding effects, particularly for use on a sandy beach. A plurality of panels are hinged for a composite shield-effect when folded outwardly for use; and a plurality of spikes, which are supportingly connected to the panels, are movable between an upper position for ease of transport and a lower position in which they are pushed into the ground to hold the panel assembly stable. The connectors for connecting the spikes to the panels, but permitting the movement of the spikes into the sand or ground, are advantageously provided integrally from portions of the panels themselves, and they are located sufficiently low with respect to the bottom edge of the panels that the spikes are supported in and between both their transport position and their ground-engaging position; and the connectors for the spike or spikes inwardly of the end spikes are formed from the panel-portions adjacent the hinges of the panels, thus achieving the opening for accommodation of the spike by the panel-material which would be an outside corner of the panel assembly whether in folded condition for transport or open condition for shield-effect use.

U.S. Pat. No. 4,981,152, issued 1991 Jan. 1, to David R. Laurent, discloses a portable, foldable beach screen, that provides privacy and protection from wind and blowing sand for a reclining individual. The screen is constructed from a single panel and is foldable into a compact and easily carried configuration. The screen may include a reflective material on one or both major surfaces and can carry advertising messages or other printing.

U.S. Pat. No. 5,287,909, issued 1994 Feb. 22, to Jonathan J. King, discloses a freestanding privacy screen, that comprises a plurality of like panels shaped to be positioned in a side-by-side relationship. Each panel includes a frame on which an insert panel can be mounted, and hollow side members or uprights. A pair of hinge rods are positioned in the hollow uprights of the frame for axial rotation therein, and have first key members positioned adjacent opposite ends thereof. Panel connectors interconnect adjacent panels in a mutually vertically aligned relationship. Each panel connector has a two-part body construction interconnected by a removable fastener to capture associated end portions of adjacent hinge rods therebetween. The connectors have second key members that mate with the first key members on the hinge rod ends which rotationally interconnect adjacent hinge rods, such that when the privacy screen panels are pivoted, the hinge rods retain adjacent panels in their vertically aligned relationship.

U.S. Pat. No. 5,553,648, issued 1996 Sep. 10, to Ardavan Goharjou, discloses a portable wall component. The wall component comprises a pair of vertical posts. Each post has an upper component and a lower component with a hollow aperture extending therethrough. Each post also has a downwardly extending smaller cylindrical section at the bottom of the upper component and a complimentary cylindrical recess at the top of the lower post for receiving the smaller cylindrical section. An elastic band is located within each aperture extending along the length thereon and slightly beyond. A ring at the upper end of each upper component is coupled to the upper end of its associated band. A base component at the lower end of each lower component is coupled to the lower end of its associated band. A flexible sheet is provided with parallel upper and lower horizontal edges and parallel vertical end edges therebetween coupled to the posts. The flexible sheet has half-moon wind flaps cut therein and openings at the regions where the upper and lower components join.

U.S. Pat. No. 5,730,666, issued 1998 Mar. 24, to Glenn E. Hudson, discloses a portable and collapsible screen, that unfolds and extends to provide a wall, divider or backstop which has many uses. The screen can be used as a backstop for ball games, a wind block, a privacy screen, or anywhere a small divider, screen or barricade is needed. Two base poles support a main pole where all the poles extend telescopically and a screen is attached to the far ends of the extended main poles. Anchoring means and floor base means are connected to the poles. Additional frame members and nets can be attached to extend the screen and form various shapes.

U.S. Pat. No. 6,068,041, issued 2000 May 30, to George Miles, discloses a portable adjustable partition. The partition includes a first base barrier member and a second base barrier member wherein the first base barrier member is pivotably connected to the second base barrier member. First and second slidable barrier members are connected to the first base barrier member and the second base barrier member, respectively. A first glide member is connected to the first telescoping barrier member and a second glide member is connected to the second telescoping barrier member. A pivot limiter is attached to one of the first base barrier member and the second base barrier member.

U.S. Pat. No. 6,161,320, issued 2000 Dec. 19, to Steven Charles Peterson, discloses a portable display system for use by exhibitors at tradeshow and other events, that is comprised of a plurality of display stands and display-stand connectors. The individual display stands are comprised of a free-standing frame and a rollable panel that is attached to the frame for viewing. Multiple display stands may be easily connected and arranged relative to each other to create larger displays, for example, a substantially-curved wall or a triangular tower. The exhibitor has the flexibility of using the display stands individually or connected together.

U.S. Pat. No. 6,206,079, issued 2001 Mar. 27, to Robert Wayne Selgrad, discloses a frame, that has a top frame piece, a bottom frame piece with a receptor, a first side frame piece attached to the top frame piece and to the bottom frame piece and a second side frame piece attached to the top frame piece and to the bottom frame piece. A foot is attached to the receptor, wherein the receptor has a structure such that the foot can be attached to the receptor only at n predetermined positions, where n is .gtoreq.2.

U.S. Pat. No. 6,332,284, issued 2001 Dec. 25, to Jean-Luc Tafforeau, discloses a panel display, that has a stretchable structure made of articulated, tubular elements collapsible together with an internal elastic cord. The elements are articulated on a central assembling support for mounting. Some relatively rigid elements are fixed on the support while obliquely diverging away from it so as to form feet with a ground footprint shaped as a regular polygon. Other elements form relatively flexible bows each of which will respectively support at its free end a suspendable panel in its middle.

U.S. Pat. No. 6,622,771, issued 2003 Sep. 23, to Charles R. Plockmeyer, discloses an arcuately displaceable privacy screen assembly, that comprises: (a) a frame sub-assembly having an internal aperture contained therein, wherein at least a portion of the internal aperture is covered with a privacy screen; and (b) at least two ground engaging wheels associated with the frame sub-assembly, wherein the at least two ground engaging wheels controllably direct displacement of the privacy screen in an arcuate path of travel.

U.S. Pat. No. 6,631,751, issued 2003 Oct. 14, to Harold G. Coles, discloses a garden, patio or other screen or other vertical frame structure, which has a frame formed of elongate extruded plastic members, which include vertical frame elements, and a panel in the frame. The vertical frame elements have hollow interiors and downwardly open bottom openings. Metal L-shaped support members have vertical portions extending upwardly through the bottom openings into frictional engagement in the hollow interiors of the vertical frame elements, and horizontal portions extending forwardly and rearwardly of the screen from the vertical portions. U.S. Pat. No. 6,896,028, issued 2005 May 24, to Gareth J. Brennan, discloses a portable privacy screen assembly, which includes a frame assembly having a tubular frame, a wheel set adjacent one bottom corner of the tubular frame and a base plate adjacent an opposite bottom corner of the tubular frame. The wheel set and base plate support the tubular frame in a generally upright condition. A screen is releasably supported by the tubular frame and has opposed major surfaces. At least one of the opposed major surfaces is a dry-erase marker erasable writing surface.

U.S. Pat. No. 7,316,257, issued 2008 Jan. 8, to Ronald A. Cameron, discloses a portable screen assembly, which is easily assembled and highly compact when disassembled. The assembly includes a collapsible base having at least three leg members and a central support pole. The assembly includes top and bottom frame members in parallel relation supported via the central support pole supporting a screen. The screen is held in place with the frame members via flaps, sleeves, or hooks and eyelets, and is completely removable and preferably wrinkle resistant. Side supports are optionally included to provide additional support for the top and bottom frame members. The frame members and side supports are optionally telescoping members or frictionally fitting or threaded separable members. The top portion of the central support pole preferably includes a top cap which is part of a mounting mechanism for mounting the top frame member. In the preferred embodiment, the mounting mechanism allows for keystoning of the screen.

U.S. Pat. No. 8,006,420, issued 2011 Aug. 30, to Lyle D. Merner, discloses a retractable banner stand, that includes a canister with an extendable banner having an ad and/or message thereon viewable when the banner is extended. A kit comprised of a pair of end caps with foldable legs and a pole support are releasably engaged to the canister and can be removed without tools. The kit can be releasably engaged to a second canister, without tools, with the second canister containing a second banner with a different (or new) ad and/or message to thus facilitate changing banners.

U.S. Pat. No. 8,365,798, issued 2013 Feb. 5, to Thomas G. Feldpausch, discloses a privacy screen assembly, that has a first elongated support, a second elongated support, and a privacy screen having a first end operably coupled with the first elongated support and a second end operably coupled to the second elongated support, wherein the first privacy screen is positionable between a retracted position and a deployed position. A support member vertically supports the privacy screen and is positionable between a retracted position, wherein the support member is stored within an interior of one of the first elongated support and the second elongated support in a substantially linear configuration, and a deployed position, wherein a substantial portion of the support member extends from the interior of the elongated support and wherein a substantial portion of the support member exits the interior of the elongated support such that less of the support member is present in the interior of the elongated support.

U.S. Pat. No. 8,403,021, issued 2013 Mar. 26, to Julie M. Peterson, discloses a portable partition system for dividing spaces, which can easily be changed in appearance, function and size has at least one frame that includes interior grooves suitable for receiving rigid or flaccid panels. More frames may be connected with lift-off or removable pin hinge sections, which allows a user to add to or remove rigid rectangular frames from the system simply. Dowels may suspend fabric panels, or rigid flat panels may be slid down through an opening at the top of and into each frame along with removable bars to create a structure notably different in appearance or purpose. All of the components, including dowels, fabric panels, flat panels, and horizontal bars, are insertable into the rigid rectangular frames and are removable, reversible and replaceable at will, generally without tools, to achieve many different visual effects using the same set of frames.

U.S. Pat. No. 9,051,751, issued 2015 Jun. 9, to James A. Ogilvie, discloses a portable wind screen, which is composed of a collapsible metal frame with extendable legs and a fabric or plastic screen connected to said frame with Velcro® fasteners. The frame is fully collapsible and easily stored ion a bag or small box.

U.S. Pat. No. 9,920,520, issued 2018 Mar. 20, to Masamichi Udagawa, discloses a privacy screen apparatus, that can include a body having a plurality of elongated recesses and between elongated pillow regions. The pillow regions can have a larger width than the recesses. In some embodiments, the body can be configured to bend about the elongated recesses to different configurations. A plurality of stand elements can be connected to the bottom of the body to permit the body to be free standing. In other embodiments, a plurality of connectors can be connected to the body for connecting the body to an article of furniture, such as a tabletop or a desktop.

U.S. Pat. No. D359,161, issued 1995 Jun. 13, to Barbara Byrne, discloses the ornamental design for a sun and privacy screen apparatus, as shown.

U.S. Pat. No. D363,597, issued 1995 Oct. 31, to Barbara Byrne, discloses the ornamental design for a sun and privacy screen, as shown and described.

U.S. Pat. No. D422,796, issued 2000 Apr. 18, to Geoffrey Milligan, discloses the ornamental design for a privacy screen, as shown and described.

U.S. Pub. No. 20020043352, published 2002 Apr. 18, to Gordon J. Stannis, discloses a mobile privacy screen, which includes a support frame defining an opening, a screen member made of a flexible material, wherein the screen member is disposed across the opening and is attached the support frame at a periphery of the screen, and an outrigger extending from the support frame and having an end adapted to engage a support surface. In other embodiments, the privacy screen further comprises a wheel attached to the end of the outrigger, and the support frame further comprises a handle. A method of reconfiguring a workspace is also provided detailing the moving of the mobile privacy screen from one location to a second location.

U.S. Pub. No. 20030051832, published 2003 Mar. 20, to Charles R. Plockmeyer, discloses an arcuately displaceable privacy screen assembly, which comprises: (a) a frame sub-assembly having an internal aperture contained therein, wherein at least a portion of the internal aperture is covered with a privacy screen; and (b) at least two ground engaging wheels associated with the frame sub-assembly, wherein the at least two ground engaging wheels controllably direct displacement of the privacy screen in an arcuate path of travel.

U.S. Pub. No. 20040140066, published 2004 Jul. 22, to Gareth J. Brennan, discloses a portable privacy screen assembly, which includes a frame assembly having a tubular frame, a wheel set adjacent one bottom corner of the tubular frame and a base plate-adjacent an opposite bottom corner of the tubular frame. The wheel set and base plate support the tubular frame in a generally upright condition. A screen is releasably supported by the tubular frame and has opposed major surfaces. At least one of the opposed major surfaces is a dry-erase marker erasable writing surface.

DISADVANTAGES OF THE PRIOR ART

The prior art have failed to solve many problems associated with such folding screen, as follows:

1) No prior art mention or disclose any folding screen, having
   arched copula splines 108.
   Therefore, the prior art of folding screen is (or are each):
   a) Not capable of supporting adjustable-utilitarian-volume double-sided-function dome 121;
      in the direction (or directions) of arrows 137a and 137b
      (see FIG. 6A, FIG. 6B, and FIG. 6C);
   b) Not capable of tensioning adjustable-utilitarian-volume double-sided-function dome 121
      in the direction (or directions) of arrows 137a and 137b
      (see FIG. 6A and FIG. 6C);
   c) Not capable of deploying adjustable-utilitarian-volume double-sided-function dome 121
      in the direction (or directions) of arrows 137a and 137b
      (see FIG. 6A, FIG. 6B, and FIG. 6C);
   d) Not capable of retracting adjustable-utilitarian-volume double-sided-function dome 121
      in the direction (or directions) of arrows 137a and 137b
      (see FIG. 6A, FIG. 6B, and FIG. 6C); and
   e) Not capable of connecting and coupling multiple five-device-in-one arthritic-aiding reversible sun-blocking projector-screening event-sheltering vehicle-awning cupolas together
      in the direction (or directions) of arrows 137a, 137b, 137c, 137d, and 138
      (see FIG. 6D, FIG. 6E, FIG. 6F, and FIG. 6G).

2) No prior art mention or disclose any folding screen, having
   arthritic-aiding automatic-sliding elevator lock 110.
   Therefore, the prior art of folding screen is (or are each):
   a) Not capable of automatically deploying arthritic-aiding cupola-spline-elevating and tensioning system 109, in conjunction with elevator booms 113, and arched cupola splines 108
      in the direction (or directions) of arrows 140, 144a, 144b, 144c, 144d and 145
      (see FIG. 7A, FIG. 7B, FIG. 7C, FIG. 7D, FIG. 7E, FIG. 7F, FIG. 7G, FIG. 7H, and FIG. 7J);
   b) Not capable of retracting arthritic-aiding cupola-spline-elevating and tensioning system 109 in conjunction with elevator booms 113 and arched cupola splines 108
      in the direction (or directions) of arrows 144a, 144b, 144c, 144d, 145, and 146
      (see FIG. 7A, FIG. 7B, FIG. 7C, FIG. 7D, FIG. 7E, FIG. 7F, FIG. 7G, FIG. 7H, FIG. 7I, and FIG. 7J);
   c) Not capable of assisting elevator booms 113
      to provide tension to arthritic-aiding cupola-spline-elevating and tensioning system 109
      in the direction (or directions) of arrows 144a, 144b, 144c, 144d, 145, and 146
      (see FIG. 7A, FIG. 7B, FIG. 7D, FIG. 7E, FIG. 7F, FIG. 7G, and FIG. 7J); and
   d) Not capable of sliding vertically on respective arched cupola splines 108,
      (see FIG. 7A, FIG. 7B, FIG. 7C, FIG. 7D, and FIG. 7J).

3) No prior art mention or disclose any folding screen, having
   arthritic-aiding-elevator-lock lever 111.

Therefore, the prior art of folding screen is (or are each):
  a) Not capable of engaging arthritic-aiding automatic-sliding elevator lock 110 on arched cupola splines 108 using an arthritic's hand 142
      in the direction (or directions) of arrows 140, 141, 143, 144*a*, 144*b*, 144*c*, 144*d*, and 145
      (see FIG. 7A, FIG. 7B, FIG. 7C, FIG. 7D, and FIG. 7E);
  b) Not capable of assisting arthritic-aiding automatic-sliding elevator lock 110 to lock elevator booms 113 to a predetermined vertical position on respective arched cupola splines 108
      in the direction (or directions) of arrows 144*a*, 144*b*, 144*c*, 144*d*, 145, and 146
      (see FIG. 7A, FIG. 7B, FIG. 7D, FIG. 7E, FIG. 7F, FIG. 7G, and FIG. 7J);
  c) Not capable of quickly and easily repositioning arthritic-aiding automatic-sliding elevator lock 110 on arched cupola splines 108 with an arthritic's hand 142
      in the direction (or directions) of arrows 140, 141, 144*a*, 144*b*, 144*c*, and 144*d*
      (see FIG. 7B, FIG. 7D, FIG. 7E, FIG. 7F, FIG. 7G, and FIG. 7J); and
  d) Not capable of providing large surface area handles to aid those arthritic's with limited hand 142 mobility due to an arthritic physical condition
      in the direction (or directions) of arrows 140, 141, 143, 144*a*, 144*b*, 144*c*, 144*d* and 145
      (see FIG. 7A, FIG. 7B, FIG. 7C, FIG. 7D, and FIG. 7E).

4) No prior art mention or disclose any folding screen, having arthritic-aiding elevator-boom hand paddles 114.

Therefore, the prior art of folding screen is (or are each):
  a) Not capable of allowing an arthritic hand
      to securely and effectively grip arthritic-aiding cupola-spline-elevating and tensioning system 109
        in the direction (or directions) of arrow 146
        (see FIG. 7I and FIG. 7J);
  b) Not capable of allowing persons with arthritic hands to deploy the arthritic-aiding cupola-spline-elevating and tensioning system 109 easier, by sliding the arthritic-aiding automatic-sliding elevator lock 110 upwards and downwards on respective arched cupola splines 108
      in the direction (or directions) of arrow 146
      (see FIG. 7I and FIG. 7J);
  c) Not capable of allowing persons with arthritic hands to slide the arthritic-aiding automatic-sliding elevator lock 110 upwards and downwards on respective arched cupola splines 108
      in the direction (or directions) of arrows 144*a*, 144*b*, and 146
      (see FIG. 7F, FIG. 7I, and FIG. 7J);
  d) Not capable of accommodating arthritic hands
      to grip arthritic-aiding cupola-spline-elevating and tensioning system 109 in two points of contact, to the left and right sides of center of arthritic-aiding automatic-sliding elevator lock 110 thereby equalizing side-to-side pressure while pushing upwards and downwards
      in the direction (or directions) of arrows 144*a*, 144*b*, and 146
      (see FIG. 7F, FIG. 7I, and FIG. 7J);
  e) Not capable of reducing effort for a person with arthritic hands by providing two, rather than one, arthritic-aiding elevator-boom hand paddles 114
      to assist while operating arthritic-aiding automatic-sliding elevator lock 110
        in the direction (or directions) of arrows 144*a*, 144*b*, and 146
        (see FIG. 7F, FIG. 7I, and FIG. 7J);
  f) Not capable of reducing pain for those with arthritic-hand conditions by providing large paddle surface areas
      to distribute the pressure or their hands over the broad flat surfaces of arthritic-aiding elevator-boom hand paddles 114, thereby minimizing pressure to concentrated areas of their hands
        in the direction (or directions) of arrows 144*a*, 144*b*, and 146
        (see FIG. 7F, FIG. 7I, and FIG. 7J);
  g) Not capable of aiding those with arthritic-hand conditions by providing ridges at the front and back of arthritic-aiding elevator-boom hand paddles 114
      to aid by helping to easily position and maintain their hands in the center of arthritic-aiding elevator-boom hand paddles 114, without slipping off, as prior art would naturally promote
        in the direction (or directions) of arrows 144*a*, 144*b*, and 146
        (see FIG. 7F, FIG. 7I, and FIG. 7J); and
  h) Not capable of aiding those with arthritic-hand conditions by providing ridges at the top and bottom of arthritic-aiding elevator-boom hand paddles 114
      to aid those with arthritic hand conditions by helping them easily position and maintain their hands in the center of arthritic-aiding elevator-boom hand paddles 114, while pushing upwards or downwards
        in the direction (or directions) of arrows 144*a*, 144*b*, and 146
        (see FIG. 7F, FIG. 7I, and FIG. 7J).

5) No prior art mention or disclose any folding screen, having adjustable-utilitarian-volume double-sided-function dome 121.

Therefore, the prior art of folding screen is (or are each):
  a) Not capable of functioning as a weather shield
      to deflect the wind or to block radiation from the sun
      (see FIG. 9A, FIG. 9C, FIG. 9E, FIG. 10D, and FIG. 10F);
  b) Not capable of functioning as a freestanding privacy shield when mounted to a trailer hitch 150
      to visually block the view into private areas, such as courtyards, apartment patios, apartment balconies, and back yards
      (see FIG. 10A, FIG. 10B, and FIG. 10C);
  c) Not capable of functioning as a domed truck-bed cover when mounted in a utility port 147
      to provide greater volume in the height of the truck bed, allowing for additional items to be protected
      (see FIG. 9A, FIG. 9C, FIG. 9E, FIG. 10D, and FIG. 10F);
  d) Not capable of functioning as a domed truck-side tent when mounted in a utility port 147
      to provide shelter to persons camping in the truck bed
      (see FIG. 6F and FIG. 6G);

e) Not capable of functioning as a curved projection screen to view projected-light entertainment thereon, such as a movie, to
thereby provide a greater user experience
(see FIG. 8, 10A, 10B, and FIG. 10C);
f) Not capable of functioning as a truck-side awning when mounted to a utility port 147
to provide protection from the sun's radiation and rain during sports games, picnicking, and camping
(see FIG. 9C, FIG. 9D, FIG. 9E, and FIG. 9F);
g) Not capable of functioning as a tailgate awning when mounted to a utility port 147
to provide protection from the sun's radiation and rain, for picnic food being served, and a cover for a picnic table
(see FIG. 10F, and FIG. 10G);
h) Not capable of functioning as an awning when mounted to a back of a truck
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G);
i) Not capable of functioning as an awning when mounted to a tailgate-slot 152
to provide protection from the sun's radiation and rain to persons behind the truck, such as those watching sports games, or relaxing in a chair 139
(see FIG. 10D and FIG. 10E);
j) Not capable of functioning as an awning when mounted to a trailer hitch 150
to provide protection from the sun's radiation behind the truck, such as for food coolers, dog kennels, and persons sleeping in a sleeping bag on the ground
(see FIG. 10B and FIG. 10C);
k) Not capable of attaching to tension-dome sleeves 124, respectively, and
screwing to arched cupola-spline-extension prongs 103, respectively,
l) Not capable of providing a flexible, limited-stretch medium
to allow arthritic-aiding multi-function multi-unit-attaching cupola-spline system 101 to thereby deploy and retract
in the direction (or directions) of arrows 136a and 136b
(see FIG. 1B, FIG. 1C, FIG. 6A, FIG. 6B, FIG. 7F, and FIG. 8); and
m) Not capable of providing a flexible, limited-stretch medium
to become a tight and tensioned medium when arthritic-aiding cupola-spline-elevating and tensioning system 109 is deployed
in the direction (or directions) of arrows 136a and 136b
(see FIG. 1B, FIG. 6A, FIG. 6B, FIG. 7F, and FIG. 8E).
6) No prior art mention or disclose any folding screen, having
multi-unit-attachable utility-port-insertable reversible arch foot 126
Therefore, the prior art of folding screen is (or are each):
a) Not capable of attaching to utility port 147 of a pickup truck bed to function as a weather shield
to deflect the wind or to block radiation from the sun
(see FIG. 9A, FIG. 9C, FIG. 9E, FIG. 10D, and FIG. 10F);
b) Not capable of attaching to a utility port 147 of a pickup truck bed to
function as a privacy shield
to visually block the view into private areas, such as courtyards, apartment patios, apartment balconies, and back yards
(see FIG. 10A, FIG. 10B, and FIG. 10C);
c) Not capable of attaching to a utility port 147 of a pickup truck bed to function as a domed truck-bed cover
to provide greater volume in the height of the truck bed, allowing for additional items to be protected
(see FIG. 9A, FIG. 9C, FIG. 9E, FIG. 10D, and FIG. 10F);
d) Not capable of attaching to a utility port 147 of a pickup truck bed to function as a domed truck-side tent, mounted in utility port 147
to provide shelter to persons camping in the truck bed
(see FIG. 9A, FIG. 9C, FIG. 9E, FIG. 10D, and FIG. 10F);
e) Not capable of attaching to a utility port 147 of a pickup truck bed to function as a curved projection screen
to view projected-light entertainment thereon, such as a movie, to
thereby provide a greater user experience
(see FIG. 8, 10A, 10B, and FIG. 10C);
f) Not capable of attaching to a utility port 147 of a pickup truck bed to function as a truck-side awning
to provide protection from the sun's radiation and rain during sports games, picnicking, and camping
(see FIG. 9C, FIG. 9D, FIG. 9E, and FIG. 9F);
g) Not capable of attaching to a utility port 147 of a pickup truck bed to function as a tailgate awning
to provide protection from the sun's radiation and rain, for picnic food being served, and a cover for a picnic table
(see FIG. 10F, and FIG. 10G);
h) Not capable of attaching to a utility port 147 of a pickup truck bed to function as an awning
to provide protection from the sun's radiation and rain to persons, such
as those watching sports games, or relaxing in a chair 139
(see FIG. 10B, FIG. 10C, FIG. 10D, FIG. 10E, FIG. 10F, and FIG. 10G);
i) Not capable of attaching to a tailgate-slot 152 of a pickup truck to function as an awning
to provide protection from the sun's radiation and rain to persons behind the truck, such as those watching sports games, or relaxing in a chair 139
(see FIG. 10D and FIG. 10E); and
j) Not capable of attaching to a trailer hitch 150 of a pickup truck to function as an awning
to provide protection from the sun's radiation behind the truck, such as for food coolers, dog kennels, and persons sleeping in a sleeping bag on the ground
(see FIG. 10B and FIG. 10C);
k) Not capable of attaching to, detaching from, or reversing onto multi-unit-attaching utility-port trailer-hitch and tailgate-slot insertable and reversible tripod system 125;

l) Not capable of supporting arthritic-aiding multi-function multi-unit-attaching cupola-spline system 101.

7) No prior art mention or disclose any folding screen, having multi-unit-attachable utility-port-insertable reversible dual-arch feet 127a and 127b.

Therefore, the prior art of folding screen is (or are each):
- a) Not capable of attaching to a utility port 147 of a pickup truck bed to function as a weather shield
  - to deflect the wind or to block radiation from the sun
  - (see FIG. 9A, FIG. 9C, FIG. 9E, FIG. 10D, and FIG. 10F);
- b) Not capable of allowing the five-device-in-one arthritic-aiding reversible sun-blocking projector-screening event-sheltering vehicle-awning cupola to act as a privacy shield, as a freestanding device or when mounted to trailer hitch 150
  - to visually block the view into private areas, such as courtyards, apartment patios, apartment balconies, and back yards
  - (see FIG. 10A, FIG. 10B, and FIG. 10C);
- c) Not capable of attaching to a utility port 147 of a pickup truck bed to function as a domed truck-bed cover
  - to provide greater volume in the height of the truck bed, allowing for additional items to be protected
  - (see FIG. 9A, FIG. 9C, FIG. 9E, FIG. 10D, and FIG. 10F);
- d) Not capable of attaching to a utility port 147 of a pickup truck bed to function as a domed truck-side tent, mounted in utility port 147
  - to provide shelter to persons camping in the truck bed
  - (see FIG. 9A, FIG. 9C, FIG. 9E, FIG. 10D, and FIG. 10F);
- e) Not capable of attaching to a utility port 147 of a pickup truck bed to function as a curved projection screen
  - to view projected-light entertainment thereon, such as a movie, to thereby provide a greater user experience
  - (see FIG. 8, 10A, 10B, and FIG. 10C);
- f) Not capable of attaching to a utility port 147 of a pickup truck bed to function as a truck-side awning
  - to provide protection from the sun's radiation and rain during sports games, picnicking, and camping
  - (see FIG. 9C, FIG. 9D, FIG. 9E, and FIG. 9F);
- g) Not capable of attaching to a utility port 147 of a pickup truck bed to function as a tailgate awning
  - to provide protection from the sun's radiation and rain, for picnic food being served, and a cover for a picnic table
  - (see FIG. 10F, and FIG. 10G);
- h) Not capable of attaching to a utility port 147 of a pickup truck bed to function as an awning
  - to provide protection from the sun's radiation and rain to persons, such as those watching sports games, or relaxing in a chair 139
  - (see FIG. 10B, FIG. 10C, FIG. 10D, FIG. 10E, FIG. 10F, and FIG. 10G); and
- i) Not capable of attaching to a tailgate-slot 152 of a pickup truck to function as an awning
  - to provide protection from the sun's radiation and rain to persons behind a truck 148, such as those watching sports games, or relaxing in a chair 139, for food coolers, dog kennels, and persons camping in a sleeping bag on the ground
  - (see FIG. 10D and FIG. 10E).

8) No prior art mention or disclose any folding screen, having detachable wheels 133.

Therefore, the prior art of folding screen is (or are each):
- a) Not capable of allowing arthritic-aiding multi-function multi-unit-attaching cupola-spline system 101 to roll
  - to provide means to easily reposition the arthritic-hand-aiding reversible sun-blocking pet-protecting dome-shelter awning and truck-bed cupola for storage
  - (see FIG. 7G, FIG. 7H, FIG. 8, and FIG. 10A); and
- b) Not capable of easily attaching and detaching detachable wheels 133 to or from arthritic-aiding multi-function multi-unit-attaching cupola-spline system 101
  - to allow multi-unit-attachable utility-port-insertable reversible arch foot 126 or multi-unit-attachable utility-port-insertable reversible dual-arch feet 127a and 127b to be inserted into a utility port 147, a tailgate-slot 152, or a hitch 150
  - (see FIG. 10B, FIG. 10C, FIG. 10D, FIG. 10E, FIG. 10F, and FIG. 10G).

Objects and Advantages of the Invention

The new invention substantially departs from the conventional concepts and designs of the prior art. In doing so, the new invention provides (a or an) five-device-in-one arthritic-aiding reversible sun-blocking projector-screening event-sheltering vehicle-awning cupola, having many unique and significant features, functions, and advantages, which overcome all the disadvantages of the prior art, as follows:

1) It is an object of the new invention to provide (a or an) five-device-in-one arthritic-aiding reversible sun-blocking projector-screening event-sheltering vehicle-awning cupola, having
arched copula splines 108.

Therefore, the five-device-in-one arthritic-aiding reversible sun-blocking projector-screening event-sheltering vehicle-awning cupola is (or are each):
- a) Capable of supporting adjustable-utilitarian-volume double-sided-function dome 121;
  - in the direction (or directions) of arrows 137a and 137b
  - (see FIG. 6A, FIG. 6B, and FIG. 6C);
- b) Capable of tensioning adjustable-utilitarian-volume double-sided-function dome 121
  - in the direction (or directions) of arrows 137a and 137b
  - (see FIG. 6A and FIG. 6C);
- c) Capable of deploying adjustable-utilitarian-volume double-sided-function dome 121
  - in the direction (or directions) of arrows 137a and 137b
  - (see FIG. 6A, FIG. 6B, and FIG. 6C);
- d) Capable of retracting adjustable-utilitarian-volume double-sided-function dome 121
  - in the direction (or directions) of arrows 137a and 137b
  - (see FIG. 6A, FIG. 6B, and FIG. 6C); and e) Capable of connecting and coupling multiple five-device-in-one arthritic-aiding reversible sun-blocking projector-screening event-sheltering vehicle-awning cupolas together
in the direction (or directions) of arrows 137*a*, 137*b*, 137*c*, 137*d*, and 138
(see FIG. 6D, FIG. 6E, FIG. 6F, and FIG. 6G).

2) It is another object of the new invention to provide (a or an) five-device-in-one arthritic-aiding reversible sun-blocking projector-screening event-sheltering vehicle-awning cupola, having arthritic-aiding automatic-sliding elevator lock 110.
Therefore, the five-device-in-one arthritic-aiding reversible sun-blocking projector-screening event-sheltering vehicle-awning cupola is (or are each):
  a) Capable of automatically deploying arthritic-aiding cupola-spline-elevating and tensioning system 109, in conjunction with elevator booms 113, and arched cupola splines 108
    in the direction (or directions) of arrows 140, 144*a*, 144*b*, 144*c*,
    (see FIG. 7A, FIG. 7B, FIG. 7C, FIG. 7D, FIG. 7E, FIG. 7F, FIG. 7G, FIG. 7H, and FIG. 7J);
  b) Capable of retracting arthritic-aiding cupola-spline-elevating and tensioning system 109 in conjunction with elevator booms 113 and arched cupola splines 108
    in the direction (or directions) of arrows 144*a*, 144*b*, 144*c*, 144*d*, 145, and 146
    (see FIG. 7A, FIG. 7B, FIG. 7C, FIG. 7D, FIG. 7E, FIG. 7F, FIG. 7G, FIG. 7H, FIG. 7I, and FIG. 7J);
  c) Capable of assisting elevator booms 113 to provide tension to arthritic-aiding cupola-spline-elevating and tensioning system 109
    in the direction (or directions) of arrows 144*a*, 144*b*, 144*c*, 144*d*, 145, and 146
    (see FIG. 7A, FIG. 7B, FIG. 7D, FIG. 7E, FIG. 7F, FIG. 7G, and FIG. 7J); and
  d) Capable of sliding vertically on respective arched cupola splines 108,
    (see FIG. 7A, FIG. 7B, FIG. 7C, FIG. 7D, and FIG. 7J).

3) It is still another object of the new invention to provide (a or an) five-device-in-one arthritic-aiding reversible sun-blocking projector-screening event-sheltering vehicle-awning cupola, having arthritic-aiding-elevator-lock lever 111.
Therefore, the five-device-in-one arthritic-aiding reversible sun-blocking projector-screening event-sheltering vehicle-awning cupola is (or are each):
  a) Capable of engaging arthritic-aiding automatic-sliding elevator lock 110 on arched cupola splines 108 using an arthritic's hand 142
    in the direction (or directions) of arrows 140, 141, 143, 144*a*, 144*b*, 144*c*, 144*d*, and 145
    (see FIG. 7A, FIG. 7B, FIG. 7C, FIG. 7D, and FIG. 7E);
  b) Capable of assisting arthritic-aiding automatic-sliding elevator lock 110 to lock elevator booms 113 to a predetermined vertical position on respective arched cupola splines 108
    in the direction (or directions) of arrows 144*a*, 144*b*, 144*c*, 144*d*, 145, and 146
    (see FIG. 7A, FIG. 7B, FIG. 7D, FIG. 7E, FIG. 7F, FIG. 7G, and FIG. 7J);
  c) Capable of quickly and easily repositioning arthritic-aiding automatic-sliding elevator lock 110 on arched cupola splines 108 with an arthritic's hand 142
    in the direction (or directions) of arrows 140, 141, 144*a*, 144*b*, 144*c*, and 144*d*
    (see FIG. 7B, FIG. 7D, FIG. 7E, FIG. 7F, FIG. 7G, and FIG. 7J); and
  d) Capable of providing large surface area handles to aid those arthritic's with limited hand 142 mobility due to an arthritic physical condition
    in the direction (or directions) of arrows 140, 141, 143, 144*a*, 144*b*, 144*c*, 144*d* and 145
    (see FIG. 7A, FIG. 7B, FIG. 7C, FIG. 7D, and FIG. 7E).

4) It is yet still another object of the new invention to provide (a or an) five-device-in-one arthritic-aiding reversible sun-blocking projector-screening event-sheltering vehicle-awning cupola, having arthritic-aiding elevator-boom hand paddles 114.
Therefore, the five-device-in-one arthritic-aiding reversible sun-blocking projector-screening event-sheltering vehicle-awning cupola is (or are each):
  a) Capable of allowing an arthritic hand to securely and effectively grip arthritic-aiding cupola-spline-elevating and tensioning system 109
    in the direction (or directions) of arrow 146
    (see FIG. 7I and FIG. 7J);
  b) Capable of allowing persons with arthritic hands to deploy the arthritic-aiding cupola-spline-elevating and tensioning system 109 easier, by sliding the arthritic-aiding automatic-sliding elevator lock 110 upwards and downwards on respective arched cupola splines 108
    in the direction (or directions) of arrow 146
    (see FIG. 7I and FIG. 7J);
  c) Capable of allowing persons with arthritic hands to slide the arthritic-aiding automatic-sliding elevator lock 110 upwards and downwards on respective arched cupola splines 108
    in the direction (or directions) of arrows 144*a*, 144*b*, and 146
    (see FIG. 7F, FIG. 7I, and FIG. 7J);
  d) Capable of accommodating arthritic hands to grip arthritic-aiding cupola-spline-elevating and tensioning system 109 in two points of contact, to the left and right sides of center of arthritic-aiding automatic-sliding elevator lock 110 thereby equalizing side-to-side pressure while pushing upwards and downwards
    in the direction (or directions) of arrows 144*a*, 144*b*, and 146
    (see FIG. 7F, FIG. 7I, and FIG. 7J);
  e) Capable of reducing effort for a person with arthritic hands by providing two, rather than one, arthritic-aiding elevator-boom hand paddles 114 to assist while operating arthritic-aiding automatic-sliding elevator lock 110
    in the direction (or directions) of arrows 144*a*, 144*b*, and 146
    (see FIG. 7F, FIG. 7I, and FIG. 7J);
  f) Capable of reducing pain for those with arthritic-hand conditions by providing large paddle surface areas
    to distribute the pressure or their hands over the broad flat surfaces of arthritic-aiding elevator-boom hand paddles 114, thereby minimizing pressure to concentrated areas of their hands
in the direction (or directions) of arrows 144*a*, 144*b*, and 146
(see FIG. 7F, FIG. 7I, and FIG. 7J);
g) Capable of aiding those with arthritic-hand conditions by providing ridges at the front and back of arthritic-aiding elevator-boom hand paddles 114
to aid by helping to easily position and maintain their hands in the center of arthritic-aiding elevator-boom hand paddles 114, without slipping off, as prior art would naturally promote
in the direction (or directions) of arrows 144*a*, 144*b*, and 146
(see FIG. 7F, FIG. 7I, and FIG. 7J); and
h) Capable of aiding those with arthritic-hand conditions by providing ridges at the top and bottom of arthritic-aiding elevator-boom hand paddles 114
to aid those with arthritic hand conditions by helping them easily position and maintain their hands in the center of arthritic-aiding elevator-boom hand paddles 114, while pushing upwards or downwards
in the direction (or directions) of arrows 144*a*, 144*b*, and 146
(see FIG. 7F, FIG. 7I, and FIG. 7J).
5) It is a further object of the new invention to provide (a or an) five-device-in-one arthritic-aiding reversible sun-blocking projector-screening event-sheltering vehicle-awning cupola, having
adjustable-utilitarian-volume double-sided-function dome 121.
Therefore, the five-device-in-one arthritic-aiding reversible sun-blocking projector-screening event-sheltering vehicle-awning cupola is (or are each):
a) Capable of functioning as a weather shield
to deflect the wind or to block radiation from the sun
(see FIG. 9A, FIG. 9C, FIG. 9E, FIG. 10D, and FIG. 10F);
b) Capable of functioning as a freestanding privacy shield when mounted to a trailer hitch 150
to visually block the view into private areas, such as courtyards, apartment patios, apartment balconies, and back yards
(see FIG. 10A, FIG. 10B, and FIG. 10C);
c) Capable of functioning as a domed truck-bed cover when mounted in a utility port 147
to provide greater volume in the height of the truck bed, allowing for additional items to be protected
(see FIG. 9A, FIG. 9C, FIG. 9E, FIG. 10D, and FIG. 10F);
d) Capable of functioning as a domed truck-side tent when mounted in a utility port 147
to provide shelter to persons camping in the truck bed
(see FIG. 6F and FIG. 6G);
e) Capable of functioning as a curved projection screen
to view projected-light entertainment thereon, such as a movie, to thereby provide a greater user experience
(see FIG. 8, 10A, 10B, and FIG. 10C);
f) Capable of functioning as a truck-side awning when mounted to a utility port 147
to provide protection from the sun's radiation and rain during sports games, picnicking, and camping
(see FIG. 9C, FIG. 9D, FIG. 9E, and FIG. 9F);
g) Capable of functioning as a tailgate awning when mounted to a utility port 147
to provide protection from the sun's radiation and rain, for picnic food being served, and a cover for a picnic table
(see FIG. 10F, and FIG. 10G);
h) Capable of functioning as an awning when mounted to a back of a truck
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G);
i) Capable of functioning as an awning when mounted to a tailgate-slot 152
to provide protection from the sun's radiation and rain to persons behind the truck, such as those watching sports games, or relaxing in a chair 139
(see FIG. 10D and FIG. 10E);
j) Capable of functioning as an awning when mounted to a trailer hitch 150 to provide protection from the sun's radiation behind the truck, such as for food coolers, dog kennels, and persons sleeping in a sleeping bag on the ground
(see FIG. 10B and FIG. 10C);
k) Capable of attaching to tension-dome sleeves 124, respectively, and screwing to arched cupola-spline-extension prongs 103, respectively,
l) Capable of providing a flexible, limited-stretch medium
to allow arthritic-aiding multi-function multi-unit-attaching cupola-spline system 101 to thereby deploy and retract
in the direction (or directions) of arrows 136*a* and 136*b*
(see FIG. 1B, FIG. 1C, FIG. 6A, FIG. 6B, FIG. 7F, and FIG. 8); and
m) Capable of providing a flexible, limited-stretch medium
to become a tight and tensioned medium when arthritic-aiding cupola-spline-elevating and tensioning system 109 is deployed
in the direction (or directions) of arrows 136*a* and 136*b*
(see FIG. 1B, FIG. 6A, FIG. 6B, FIG. 7F, and FIG. 8E).
6) It is an even further object of the new invention to provide (a or an) five-device-in-one arthritic-aiding reversible sun-blocking projector-screening event-sheltering vehicle-awning cupola, having
multi-unit-attachable utility-port-insertable reversible arch foot 126.
Therefore, the five-device-in-one arthritic-aiding reversible sun-blocking projector-screening event-sheltering vehicle-awning cupola is (or are each):
a) Capable of attaching to utility port 147 of a pickup truck bed to function as a weather shield
to deflect the wind or to block radiation from the sun
(see FIG. 9A, FIG. 9C, FIG. 9E, FIG. 10D, and FIG. 10F);
b) Capable of attaching to a utility port 147 of a pickup truck bed to function as a privacy shield
to visually block the view into private areas, such as courtyards, apartment patios, apartment balconies, and back yards
(see FIG. 10A, FIG. 10B, and FIG. 10C);

c) Capable of attaching to a utility port 147 of a pickup truck bed to function as a domed truck-bed cover
  to provide greater volume in the height of the truck bed, allowing for additional items to be protected
   (see FIG. 9A, FIG. 9C, FIG. 9E, FIG. 10D, and FIG. 10F);
d) Capable of attaching to a utility port 147 of a pickup truck bed to function as a domed truck-side tent, mounted in utility port 147
  to provide shelter to persons camping in the truck bed
   (see FIG. 9A, FIG. 9C, FIG. 9E, FIG. 10D, and FIG. 10F);
e) Capable of attaching to a utility port 147 of a pickup truck bed to function as a curved projection screen
  to view projected-light entertainment thereon, such as a movie, to thereby provide a greater user experience
   (see FIG. 8, 10A, 10B, and FIG. 10C);
f) Capable of attaching to a utility port 147 of a pickup truck bed to function as a truck-side awning
  to provide protection from the sun's radiation and rain during sports games, picnicking, and camping
   (see FIG. 9C, FIG. 9D, FIG. 9E, and FIG. 9F);
g) Capable of attaching to a utility port 147 of a pickup truck bed to function as a tailgate awning
  to provide protection from the sun's radiation and rain, for picnic food being served, and a cover for a picnic table
   (see FIG. 10F, and FIG. 10G);
h) Capable of attaching to a utility port 147 of a pickup truck bed to function as an awning
  to provide protection from the sun's radiation and rain to persons, such as those watching sports games, or relaxing in a chair 139
   (see FIG. 10B, FIG. 10C, FIG. 10D, FIG. 10E, FIG. 10F, and FIG. 10G);
i) Capable of attaching to a tailgate-slot 152 of a pickup truck to function as an awning
  to provide protection from the sun's radiation and rain to persons behind the truck, such as those watching sports games, or relaxing in a chair 139
   (see FIG. 10D and FIG. 10E); and
j) Capable of attaching to a trailer hitch 150 of a pickup truck to function as an awning
  to provide protection from the sun's radiation behind the truck, such as for food coolers, dog kennels, and persons sleeping in a sleeping bag on the ground
   (see FIG. 10B and FIG. 10C);
k) Capable of attaching to, detaching from, or reversing onto multi-unit-attaching utility-port trailer-hitch and tailgate-slot insertable and reversible tripod system 125;
l) Capable of supporting arthritic-aiding multi-function multi-unit-attaching cupola-spline system 101.

7) It is still an even further object of the new invention to provide (a or an) five-device-in-one arthritic-aiding reversible sun-blocking projector-screening event-sheltering vehicle-awning cupola, having
  multi-unit-attachable utility-port-insertable reversible dual-arch feet 127a and 127b.
Therefore, the five-device-in-one arthritic-aiding reversible sun-blocking projector-screening event-sheltering vehicle-awning cupola is (or are each):
a) Capable of attaching to a utility port 147 of a pickup truck bed to function as
  a weather shield
   to deflect the wind or to block radiation from the sun
    (see FIG. 9A, FIG. 9C, FIG. 9E, FIG. 10D, and FIG. 10F);
b) Capable of allowing the five-device-in-one arthritic-aiding reversible sun-blocking projector-screening event-sheltering vehicle-awning cupola to act as a privacy shield, as a freestanding device or when mounted to trailer hitch 150
  to visually block the view into private areas, such as courtyards, apartment patios, apartment balconies, and back yards
   (see FIG. 10A, FIG. 10B, and FIG. 10C);
c) Capable of attaching to a utility port 147 of a pickup truck bed to function as a domed truck-bed cover
  to provide greater volume in the height of the truck bed, allowing for additional items to be protected
   (see FIG. 9A, FIG. 9C, FIG. 9E, FIG. 10D, and FIG. 10F);
d) Capable of attaching to a utility port 147 of a pickup truck bed to function as a domed truck-side tent, mounted in utility port 147
  to provide shelter to persons camping in the truck bed
   (see FIG. 9A, FIG. 9C, FIG. 9E, FIG. 10D, and FIG. 10F);
e) Capable of attaching to a utility port 147 of a pickup truck bed to function as a curved projection screen
  to view projected-light entertainment thereon, such as a movie, to thereby provide a greater user experience
   (see FIG. 8, 10A, 10B, and FIG. 10C);
f) Capable of attaching to a utility port 147 of a pickup truck bed to function as a truck-side awning
  to provide protection from the sun's radiation and rain during sports games, picnicking, and camping
   (see FIG. 9C, FIG. 9D, FIG. 9E, and FIG. 9F);
g) Capable of attaching to a utility port 147 of a pickup truck bed to function as a tailgate awning
  to provide protection from the sun's radiation and rain, for picnic food being served, and a cover for a picnic table
   (see FIG. 10F, and FIG. 10G);
h) Capable of attaching to a utility port 147 of a pickup truck bed to function as an awning
  to provide protection from the sun's radiation and rain to persons, such as those watching sports games, or relaxing in a chair 139
   (see FIG. 10B, FIG. 10C, FIG. 10D, FIG. 10E, FIG. 10F, and FIG. 10G); and
i) Capable of attaching to a tailgate-slot 152 of a pickup truck to function as an awning
  to provide protection from the sun's radiation and rain to persons behind a truck 148, such as those watching sports games, or relaxing in a chair 139, for food coolers, dog kennels, and persons camping in a sleeping bag on the ground
   (see FIG. 10D and FIG. 10E).

8) It is yet still an even further object of the new invention to provide (a or an) five-device-in-one arthritic-aiding reversible sun-blocking projector-screening event-sheltering vehicle-awning cupola, having
  detachable wheels 133.

19

Therefore, the five-device-in-one arthritic-aiding reversible sun-blocking projector-screening event-sheltering vehicle-awning cupola is (or are each):
  a) Capable of allowing arthritic-aiding multi-function multi-unit-attaching cupola-spline system 101 to roll to provide means to easily reposition the arthritic-hand-aiding reversible sun-blocking pet-protecting dome-shelter awning and truck-bed cupola for storage
    (see FIG. 7G, FIG. 7H, FIG. 8, and FIG. 10A); and
  b) Capable of easily attaching and detaching detachable wheels 133 to or from arthritic-aiding multi-function multi-unit-attaching cupola-spline system 101
    to allow multi-unit-attachable utility-port-insertable reversible arch foot 126 or multi-unit-attachable utility-port-insertable reversible dual-arch feet 127a and 127b to be inserted into a utility port 147, a tailgate-slot 152, or a hitch 150
    (see FIG. 10B, FIG. 10C, FIG. 10D, FIG. 10E, FIG. 10F, and FIG. 10G).

Other objects and advantages of the present invention will become apparent from a consideration of the accompanying drawings and ensuing description.

SUMMARY OF THE INVENTION

A five-device-in-one arthritic-aiding reversible sun-blocking projector-screening event-sheltering vehicle-awning cupola comprises: a spline hub, arched splines screwed to the spline hub for connecting multiple cupolas together and supporting and tensioning and deploying and retracting the cupola, arched spline-extension prongs inserted into arched splines, elevator booms, an automatic-sliding elevator lock slidably attached to the arched splines for automatically deploying and retracting the cupola and assisting the elevator booms to provide tension to the cupola and sliding vertically on the respective arched spline, an elevator-lock lever attached to the elevator lock for engaging the elevator lock on the arched splines using an arthritic's hand and assisting the elevator lock to lock the elevator booms to a predetermined vertical position on the arched splines and quickly and easily repositioning the elevator lock on the arched splines with an arthritic's hand and providing large surface area to aid those arthritics with limited hand mobility to operate, elevator-boom hand paddles attached to the elevator booms for allowing an arthritic hand to securely grip the hand paddles and allowing persons with arthritic hands to deploy the cupola by easily sliding the elevator lock upward and downward on the arched splines and allowing persons with arthritic hands to slide the elevator lock upward or downward on the arched splines and accommodating persons with arthritic hands to grip the hand paddles in two points of contact to equalize side-to-side pressure while pushing upward or downward and reducing effort for a person with arthritic hands by providing two hand paddles to assist while operating the elevator lock and reducing pain for those with arthritic hand conditions by providing large surface areas to distribute the pressure on their hands thereby minimizing pressure to concentrated areas of their hands and aiding those with arthritic hand conditions by providing front and back and top and bottom ridges on the hand paddles to help to easily position and maintain their hands in the center of hand paddles without slipping off while pushing upwards or downwards, an adjustable dome attached to the arched spline-extension prongs for functioning as a weather shield and a privacy shield and a domed truck-bed cover and a domed truck-side tent and a curved

20 projection screen and a truck-side awning and a tailgate awning and an awning to provide privacy and protection from weather to persons and pets and belongings and dog kennels and persons camping and to view projected media thereon or to increase the volume and security to items in a truck bed when attached to a utility port or a trailer hitch or a tailgate slot of a pickup truck bed and providing a flexible stretch medium to allow the cupola to deploy and retract and providing a flexible stretch medium to become tensioned when the cupola is deployed, a foot-stabilizing-and-reversing plate, an attachable insertable reversible arch foot and attachable insertable reversible dual-arch feet screwed to the foot-stabilizing-and-reversing plate and the spline hub for attaching to a utility port or a trailer hitch or a tailgate slot of a pickup truck bed to function as a weather shield and a privacy shield and a domed truck-side tent and a truck-side awning and a tailgate awning and an awning and a curved projection screen and a domed truck-bed cover to provide privacy and protection from weather to persons and pets and belongings and dog kennels and persons camping or to view projected media thereon or to increase the volume and security to items in a truck bed.

BRIEF DESCRIPTION OF THE DRAWINGS

FIG. 1A, FIG. 1B, and FIG. 1C illustrate a front perspective, front, and a back perspective view of the five-device-in-one arthritic-aiding reversible sun-blocking projector-screening event-sheltering vehicle-awning cupola.

FIG. 2A, FIG. 2B, FIG. 2C, FIG. 2D, FIG. 2E, and FIG. 2F illustrate front, back, side, perspective, top, and upper-right-side views of the five-device-in-one arthritic-aiding reversible sun-blocking projector-screening event-sheltering vehicle-awning cupola, and depict the arthritic-aiding multi-function multi-unit-attaching cupola-spline system, respectively.

FIG. 3A, FIG. 3B, FIG. 3C, and FIG. 3D illustrate a side, partial enlarged perspective, and partial enlarged front, and front view of arthritic-aiding cupola-spline-elevating and tensioning system, respectively.

FIG. 4A, FIG. 4B, and FIG. 4C illustrate a side, upper-back, and top view of adjustable-utilitarian-volume double-sided-function dome system, respectively FIG. 5 illustrates a back view of the multi-unit-attaching utility-port trailer-hitch and tailgate-slot insertable and reversible tripod system.

FIG. 6A, FIG. 6B, and FIG. 6C illustrate a perspective, partial views of arthritic-aiding multi-function multi-unit-attaching cupola-spline system, and arched cupola-spline-extension prongs telescoping inward and outward from arched cupola splines, respectively.

FIG. 6D and FIG. 6E illustrate partial views of arthritic-aiding multi-function multi-unit-attaching cupola-spline system, and arched cupola-spline-extension prongs being inserted inside arched cupola splines, of another five-device-in-one arthritic-aiding reversible sun-blocking projector-screening event-sheltering vehicle-awning cupola, respectively.

FIG. 7A and FIG. 7B illustrate a front and partial side views of arthritic-aiding cupola-spline-elevating and tensioning system, arthritic-aiding-elevator-lock lever, and the movement thereof, respectively.

FIG. 7C, FIG. 7D, and FIG. 7E illustrate perspective views of arthritic-aiding cupola-spline-elevating and tensioning system, and demonstrates arthritic-aiding-elevator-lock levers, and the positions in which an arthritic hand would insert within and operate such, respectively.

FIG. 7F, FIG. 7G, FIG. 7H, FIG. 7I, and FIG. 7J illustrate front and perspective views of the arthritic-aiding cupola-spline-elevating and tensioning system, being deployed or retracted by arthritic-aiding elevator-boom hand paddles into a storage configuration, and the adjustable-utilitarian-volume double-sided-function dome, being wrapped thereon, respectively FIG. 8 illustrates a side view of the adjustable-utilitarian-volume double-sided-function dome system.

FIG. 9A, FIG. 9B, FIG. 9C, and FIG. 9D illustrate back views of a truck with the five-device-in-one arthritic-aiding reversible sun-blocking projector-screening event-sheltering vehicle-awning cupola in which the multi-unit-attachable utility-port-insertable reversible arch feet are connecting to multi-unit-attachable utility-port-insertable reversible dual-arch foot and are inserted into utility ports, and functions as a truck bed cover, and a side awning, respectively.

FIGS. 10B and 10C illustrate side views of a truck demonstrating the five-device-in-one arthritic-aiding reversible sun-blocking projector-screening event-sheltering vehicle-awning cupola in which the multi-unit-attachable utility-port-insertable reversible dual-arch foot is inserted into hitch, and functions as a wind and privacy screen.

FIGS. 10F and 10G illustrate side views of a truck demonstrating the five-device-in-one arthritic-aiding reversible sun-blocking projector-screening event-sheltering vehicle-awning cupola in which the multi-unit-attachable utility-port-insertable reversible dual-arch foot is inserted into a utility port, and functions as tailgate awning.

FIG. 11F and FIG. 11G illustrate side views of a truck demonstrating an equivalent variation of the five-device-in-one arthritic-aiding reversible sun-blocking projector-screening event-sheltering vehicle-awning cupola with a star-shaped adjustable-utilitarian-volume double-sided-function dome system inserted into a utility port, by the multi-unit-attachable utility-port-insertable reversible dual-arch foot, and functions as a tailgate awning.

DETAILED DESCRIPTION OF THE INVENTION

Figure 1B:
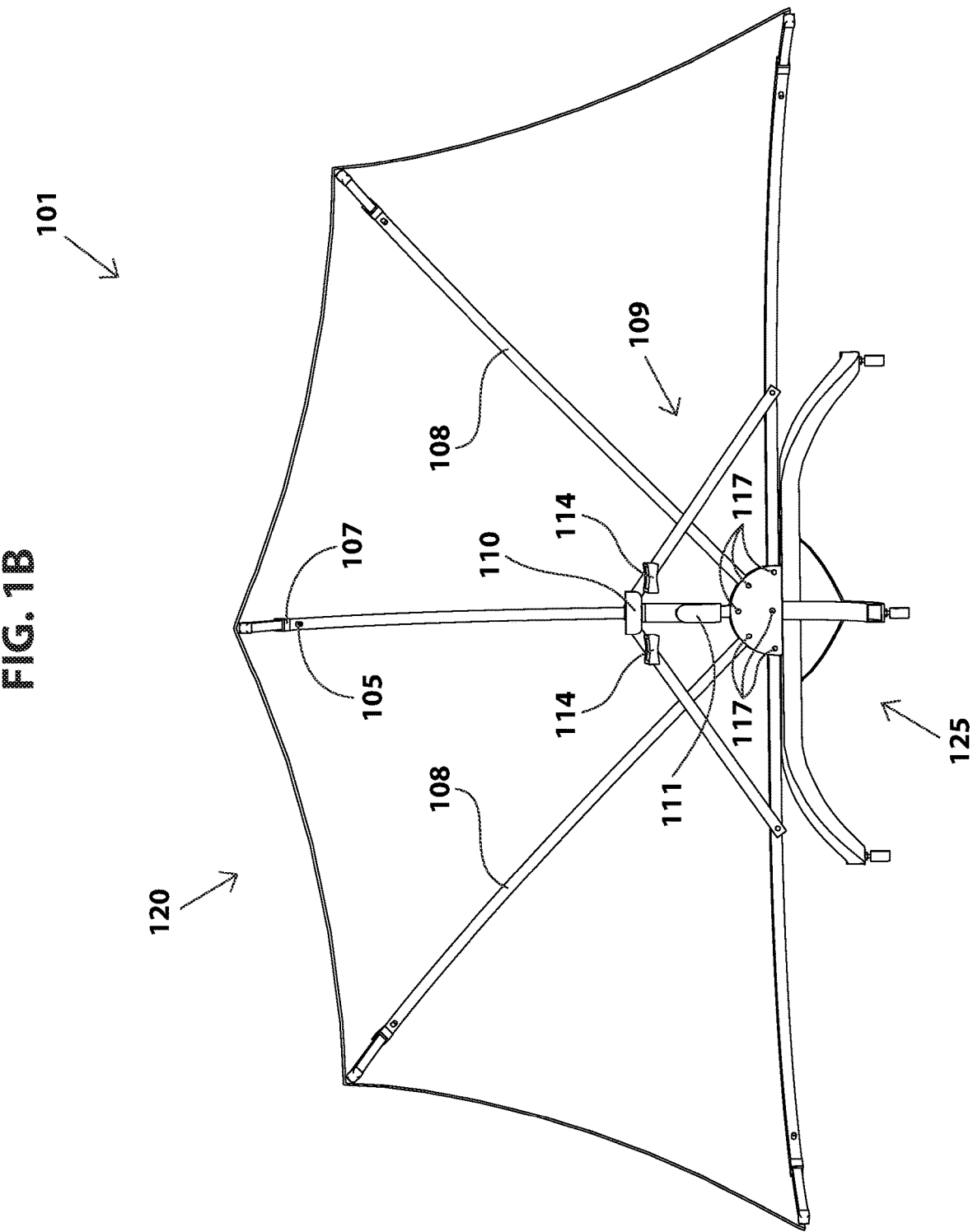
Figure 2B:
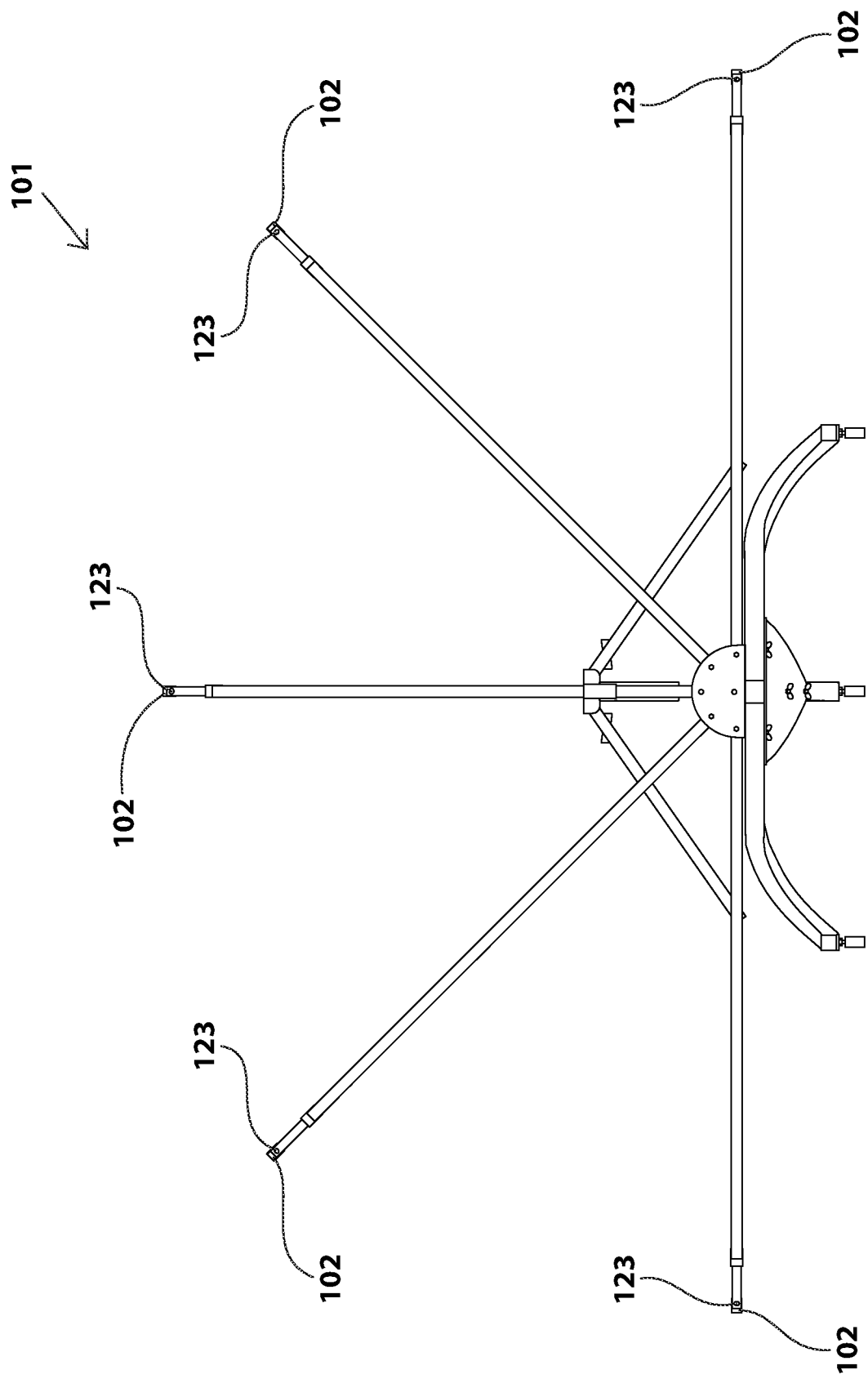
Figure 2D:
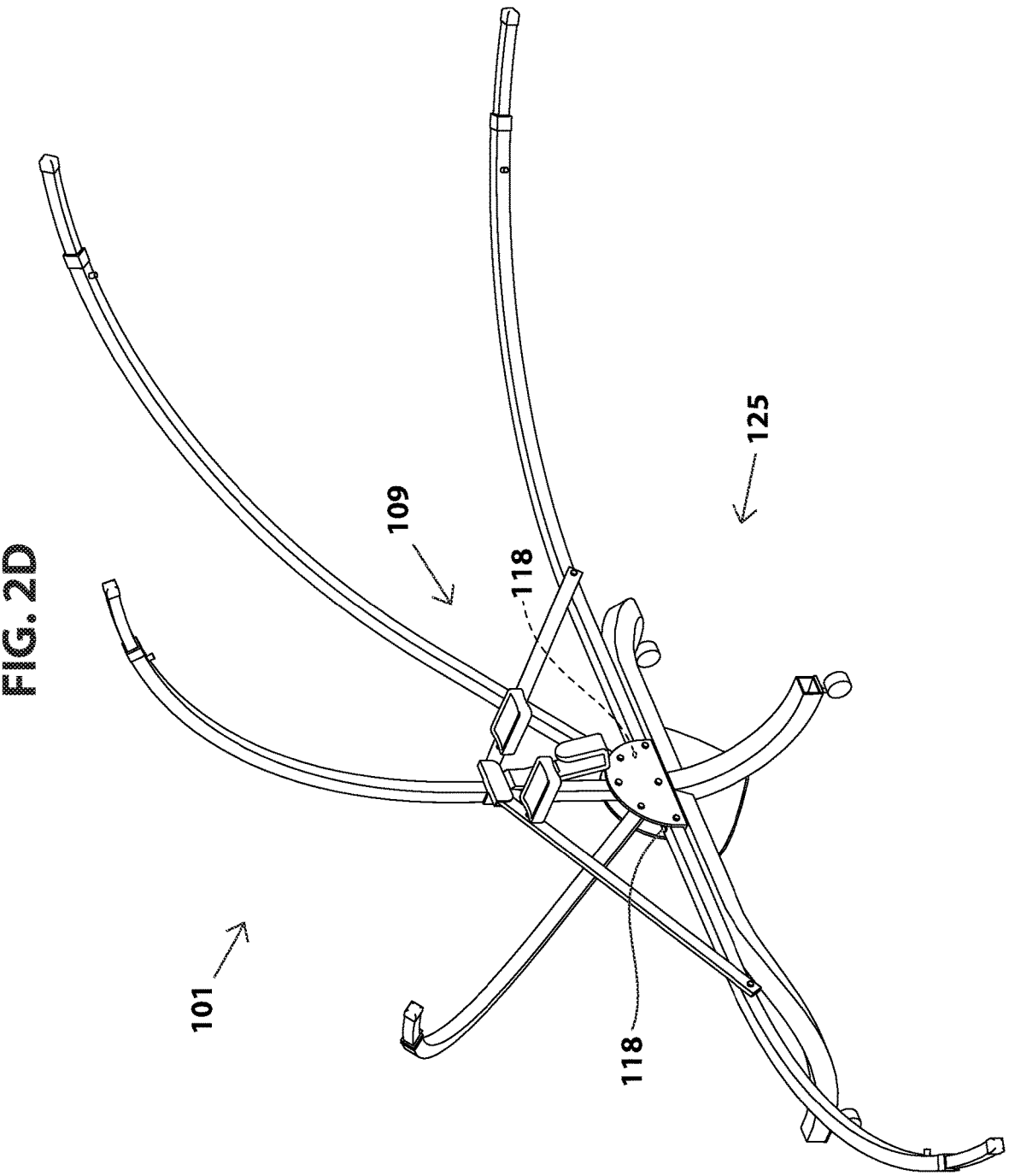
Figure 2E:
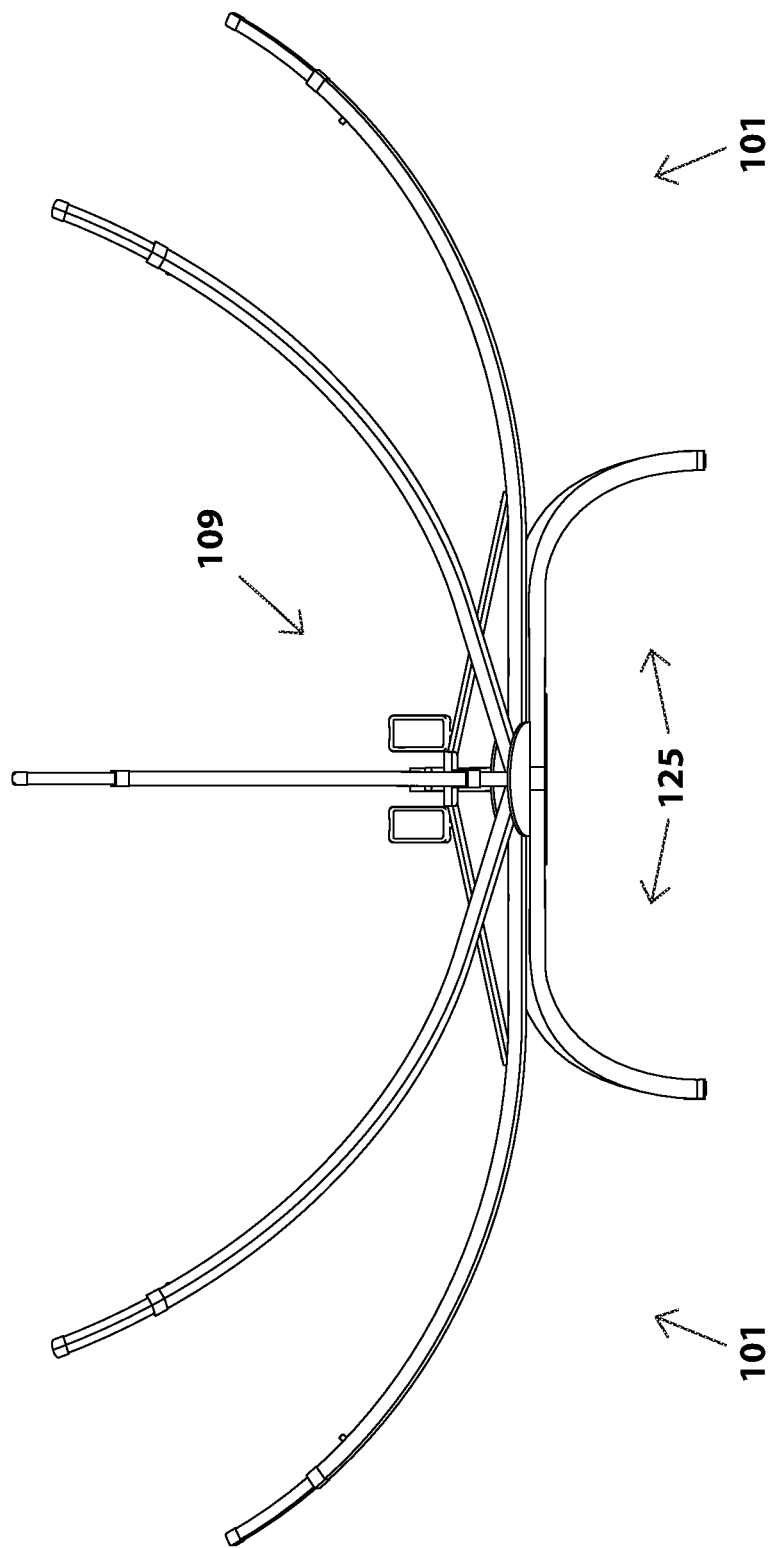
Figure 3B:
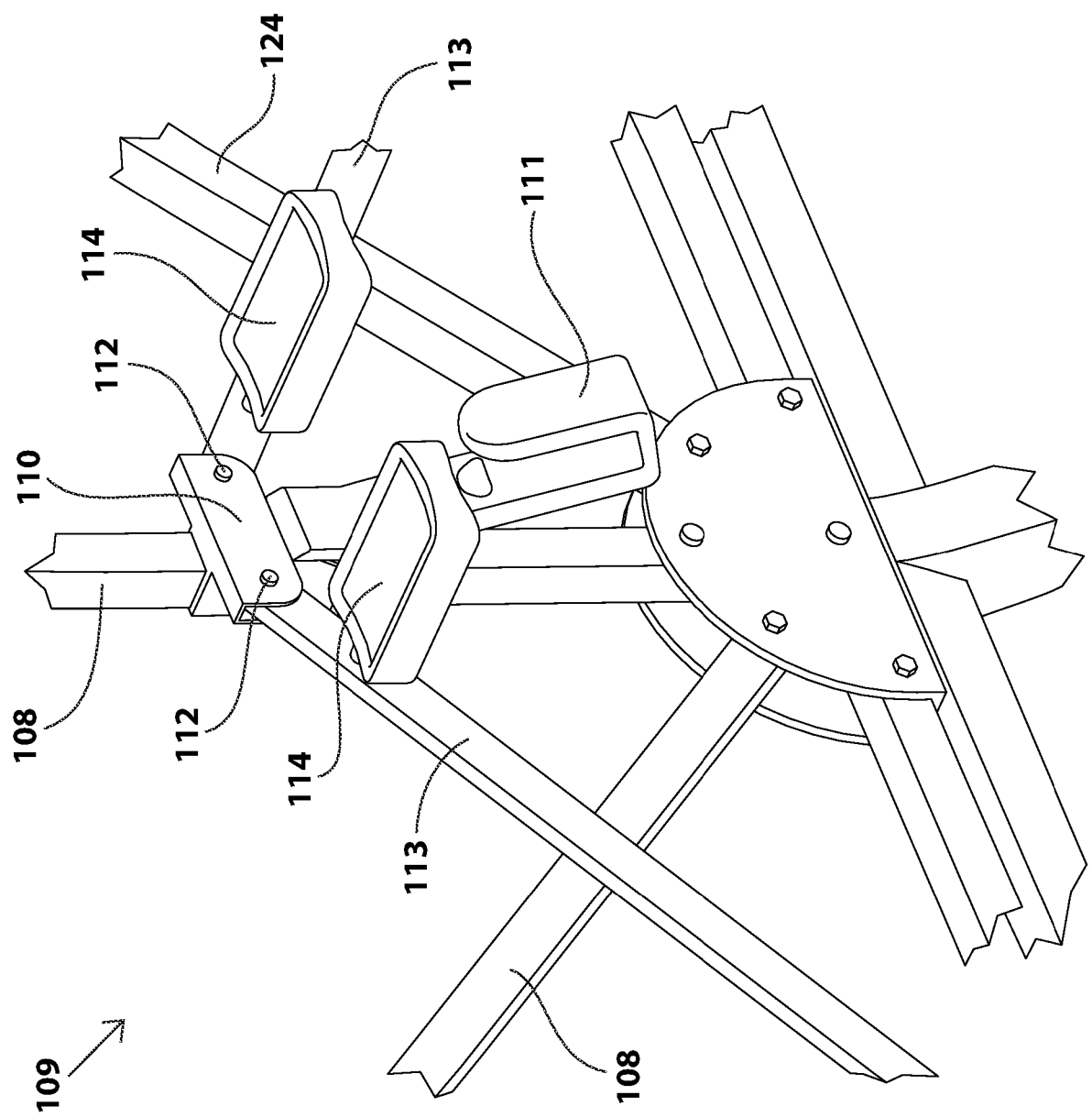
Figure 3C:
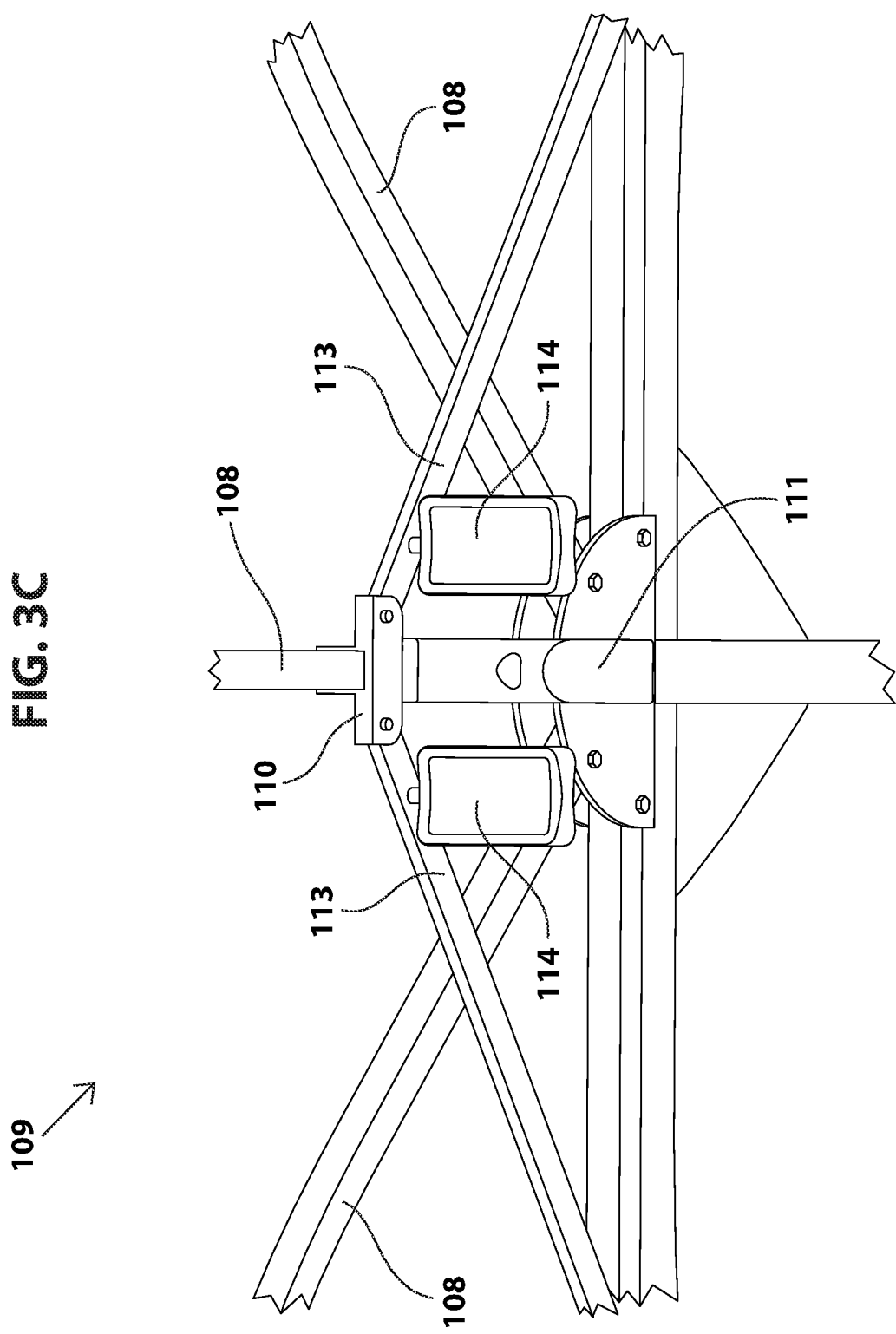
Figure 4B:
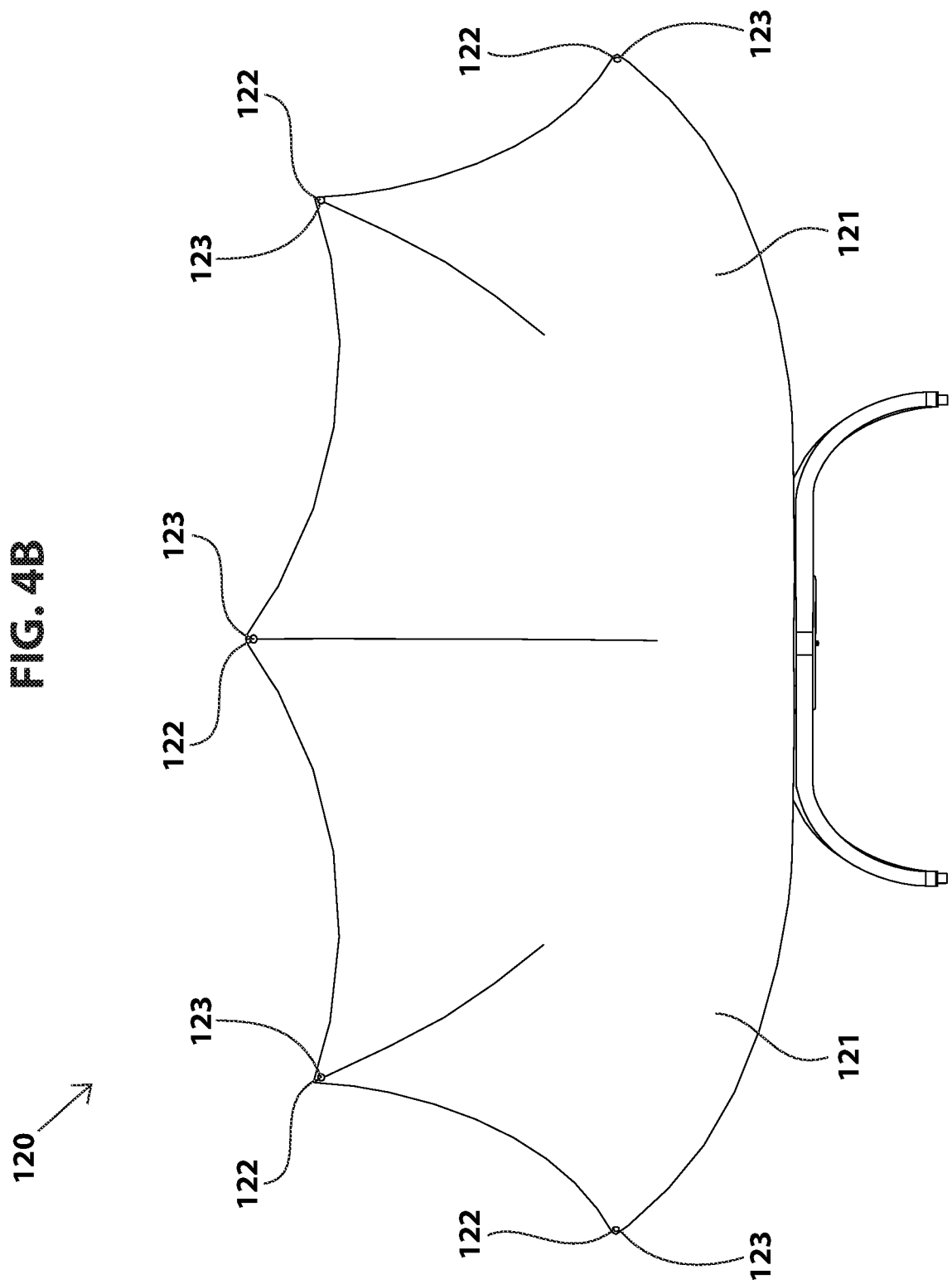
Figure 4C:
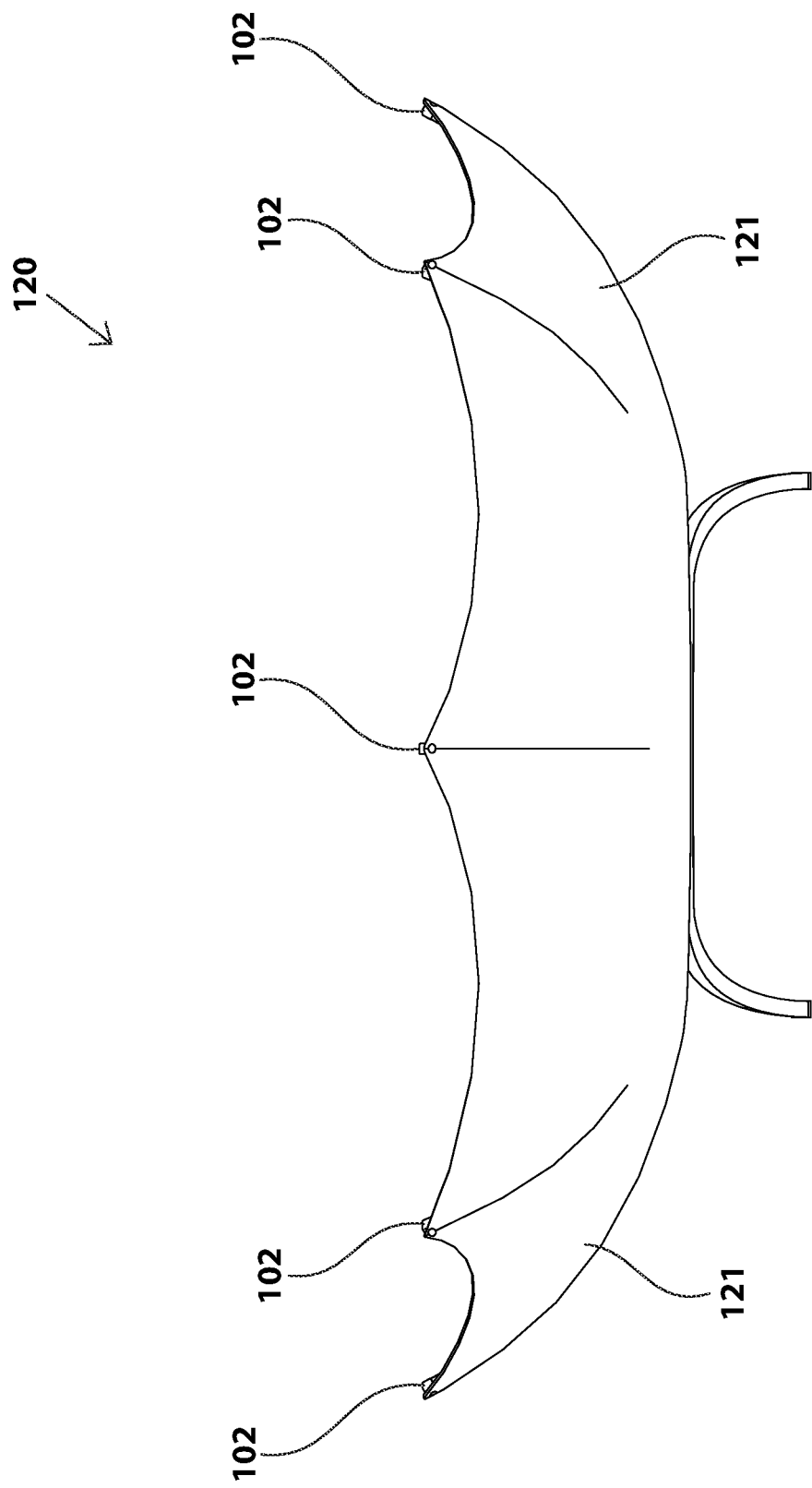
Figure 6F:
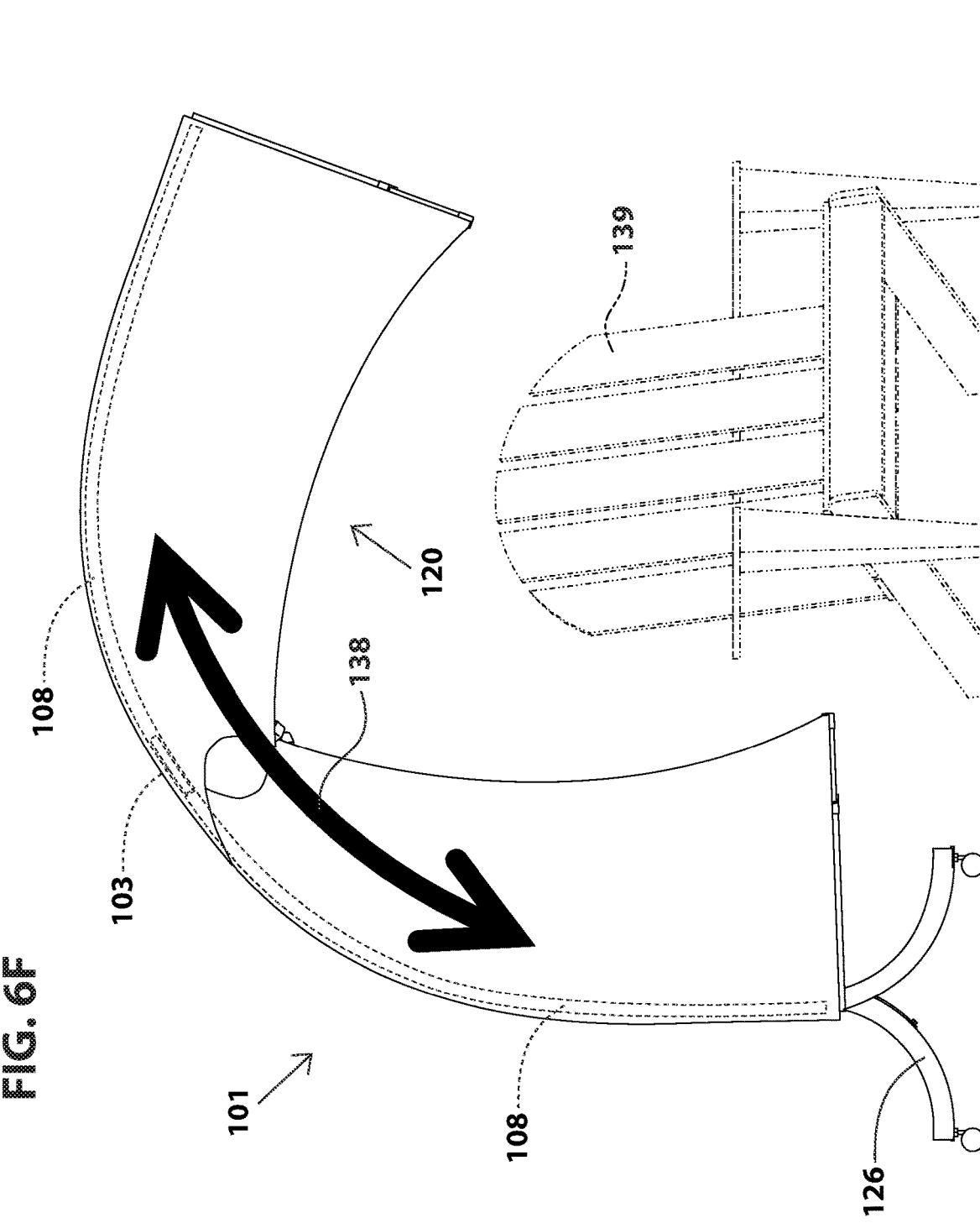
FIG. 6F and FIG. 6G illustrate side views of two five-device-in-one arthritic-aiding reversible sun-blocking projector-screening event-sheltering vehicle-awning cupolas, being coupled together by a common arched cupola-spline-extension prongs, to function as awnings, shading a chair, respectively.
Figure 6G:
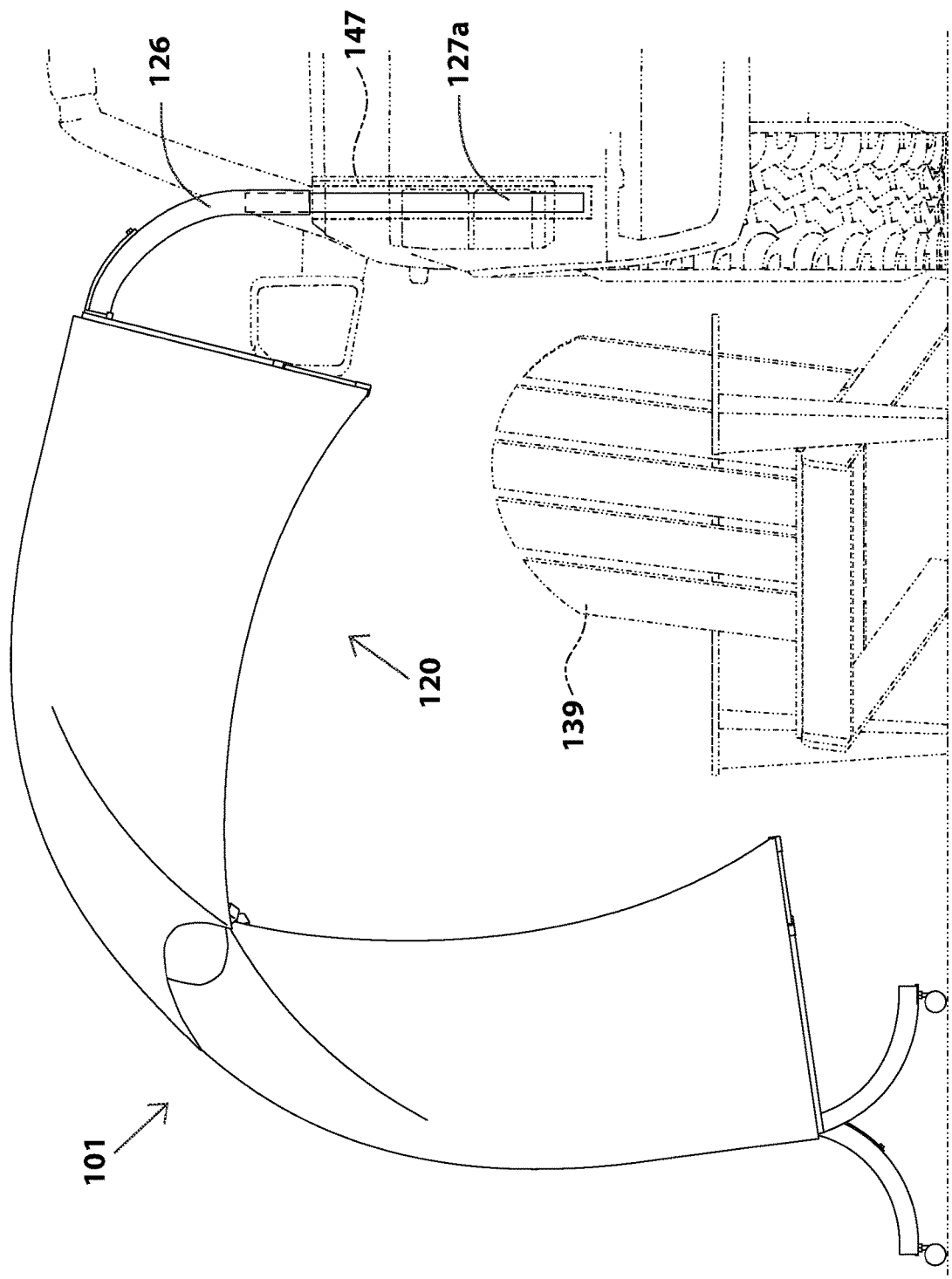
Figure 7F:
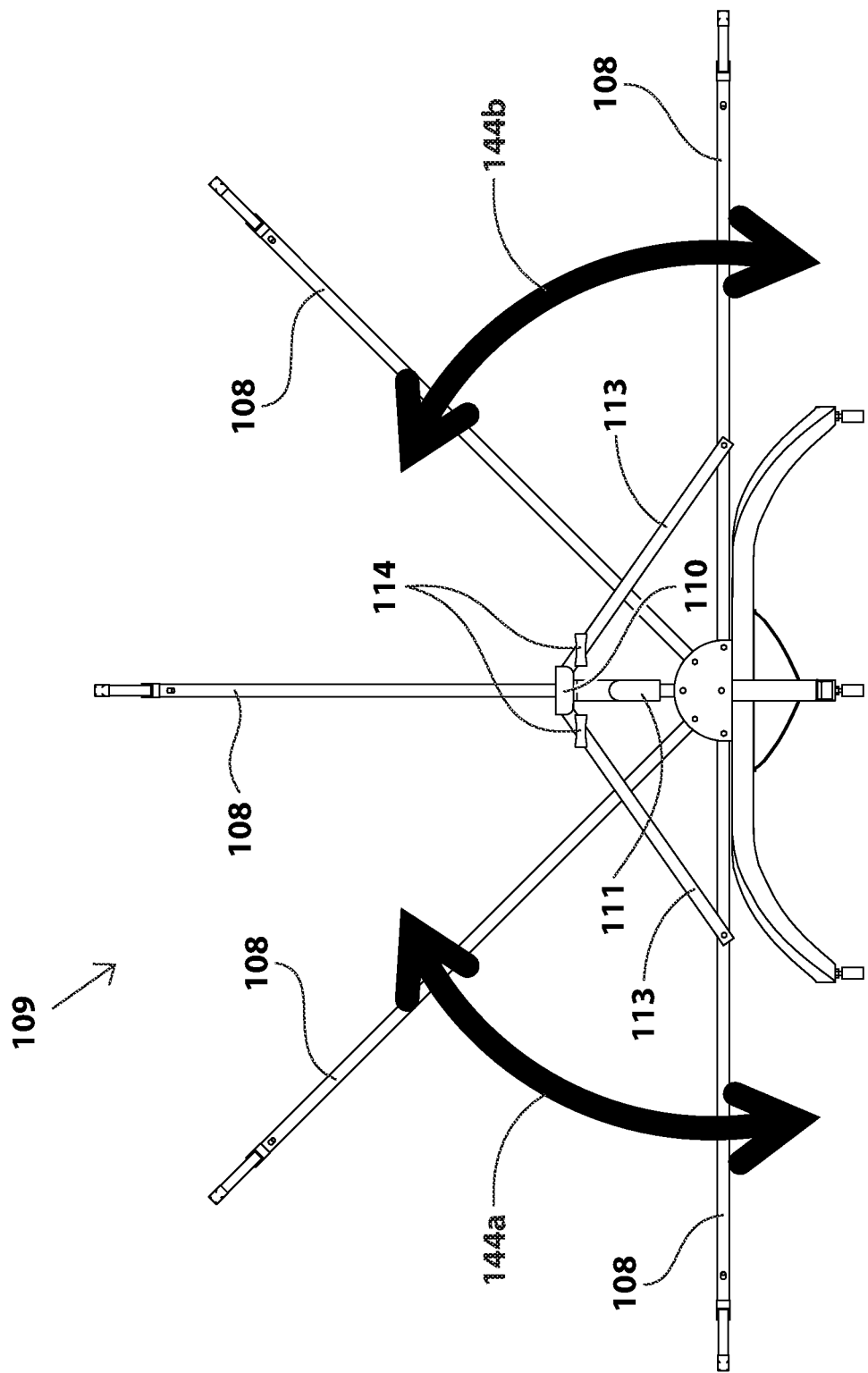
Figure 71:
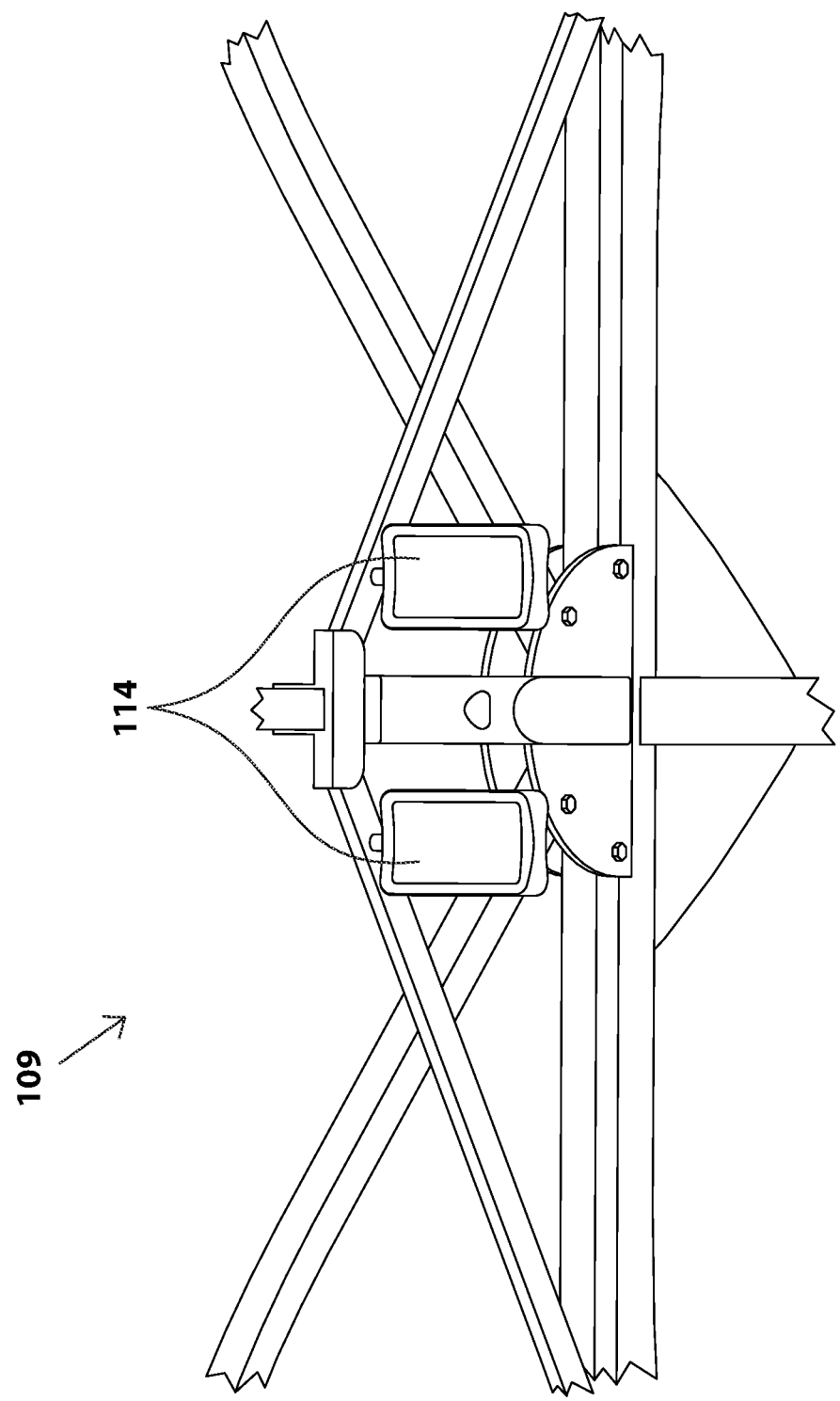
Figure 7J:
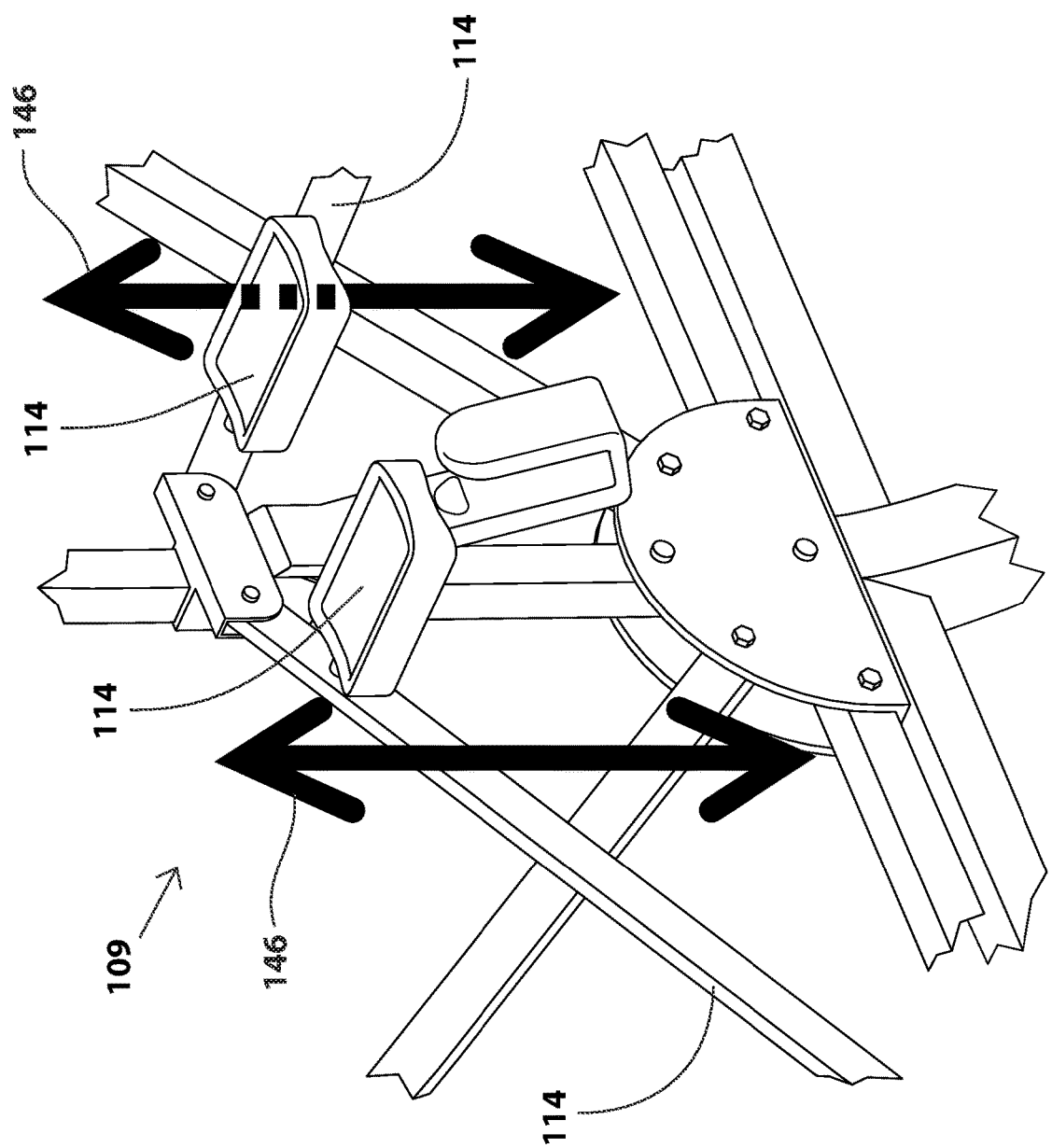
Figure 9C:
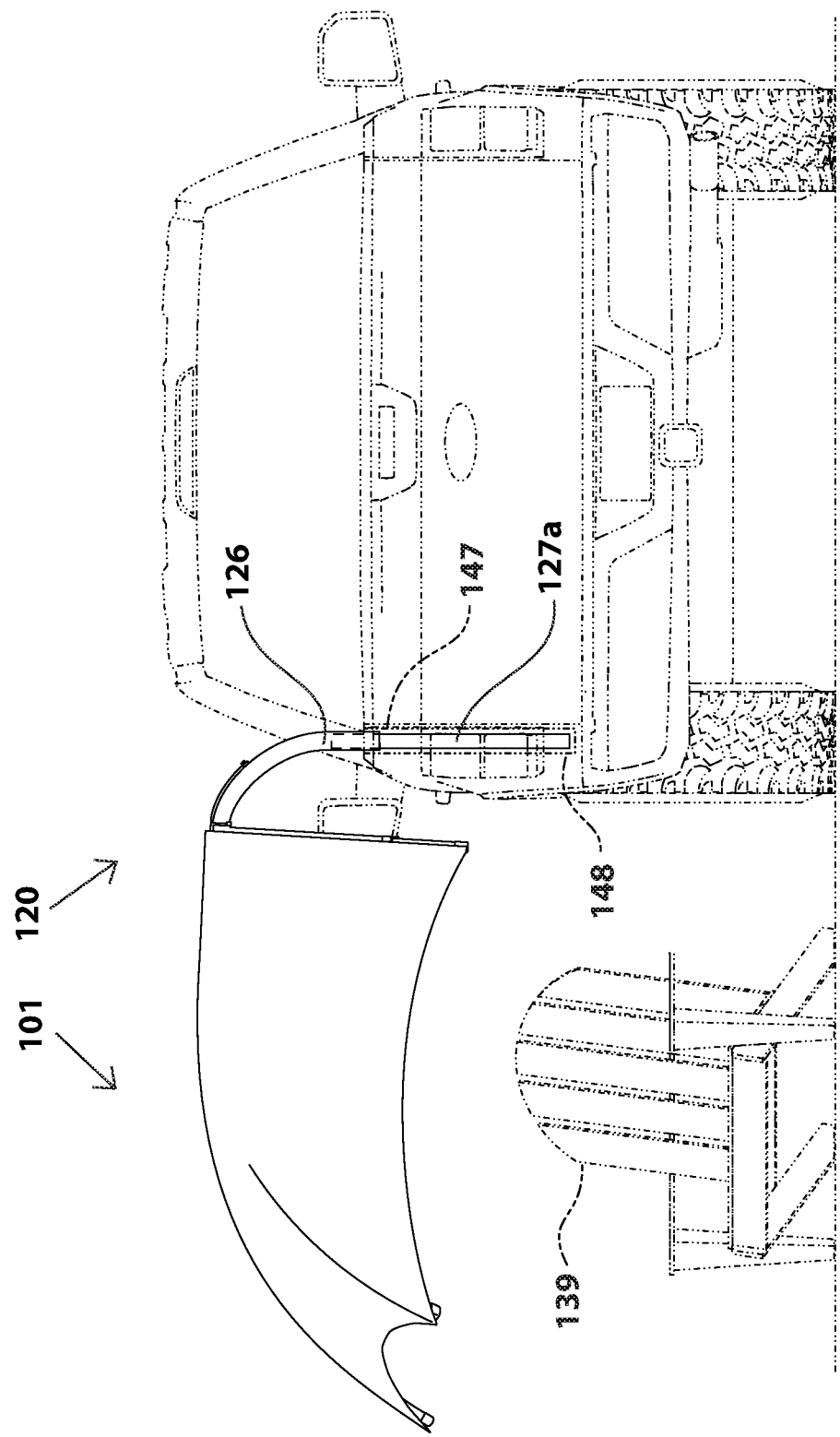
Figure 9E:
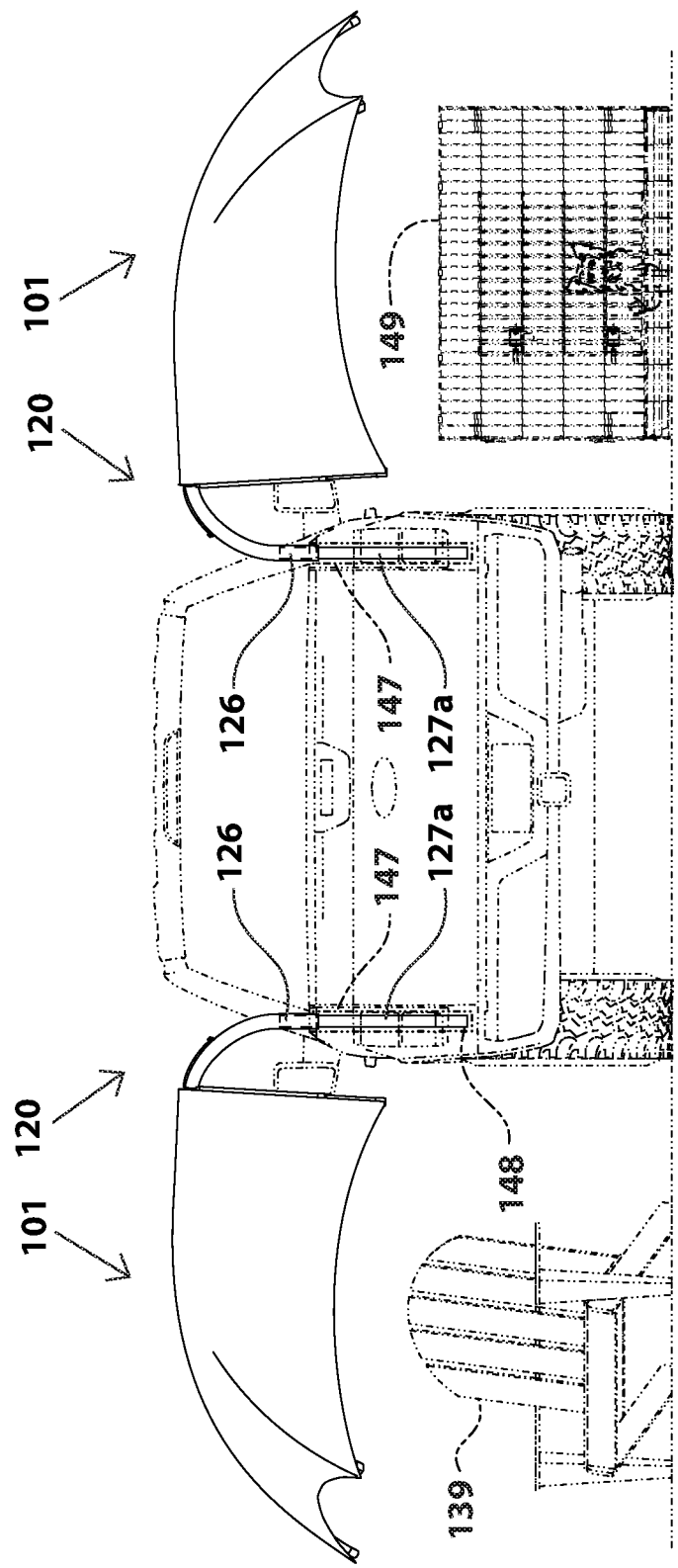
FIG. 9E and FIG. 9F illustrate back views a of truck demonstrating a configuration of two five-device-in-one arthritic-aiding reversible sun-blocking projector-screening event-sheltering vehicle-awning cupolas in which the multi-unit-attachable utility-port-insertable reversible dual-arch foot are inserted into utility ports, and function as dual side awnings, respectively.
Figure 9F:
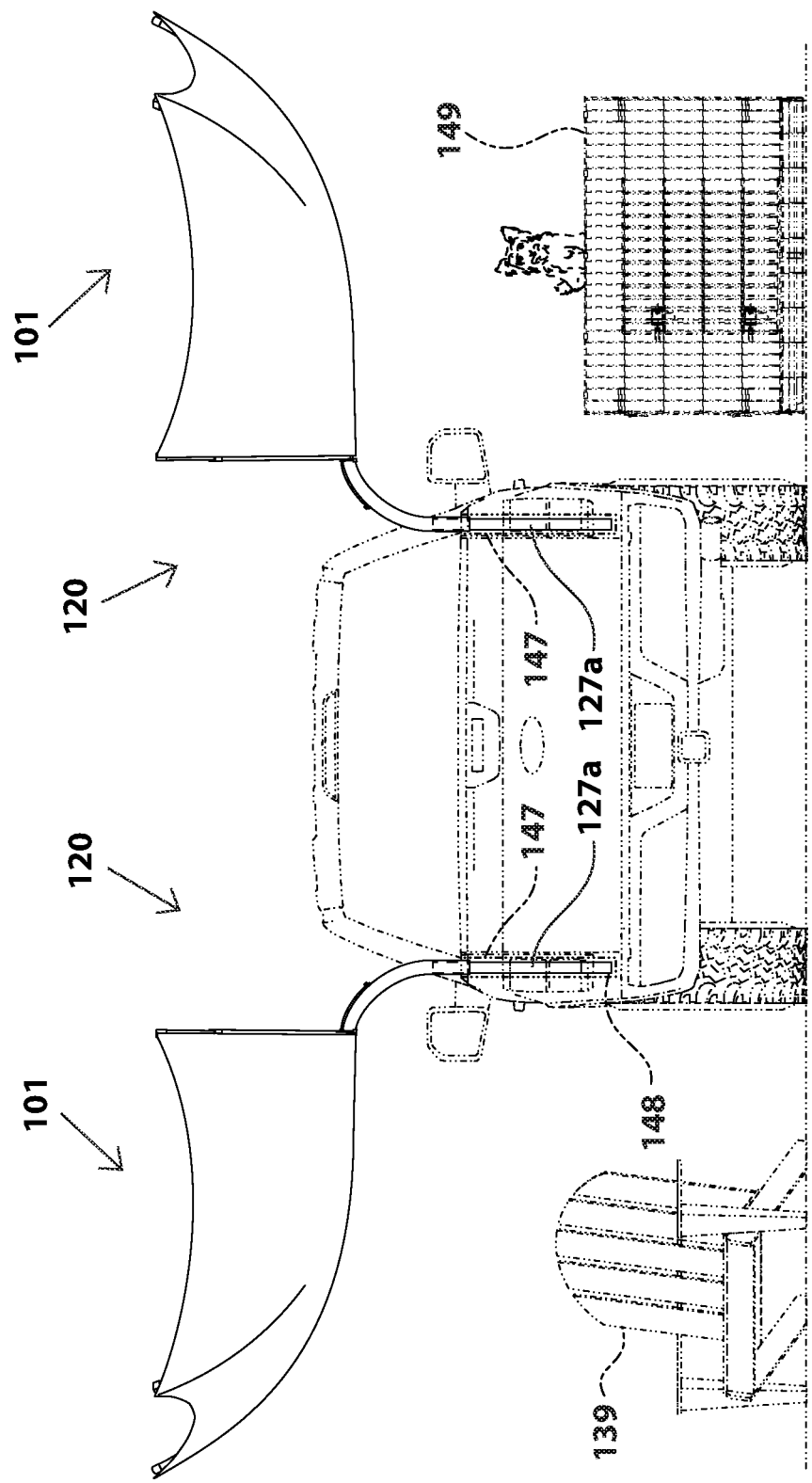
Figure 10A:
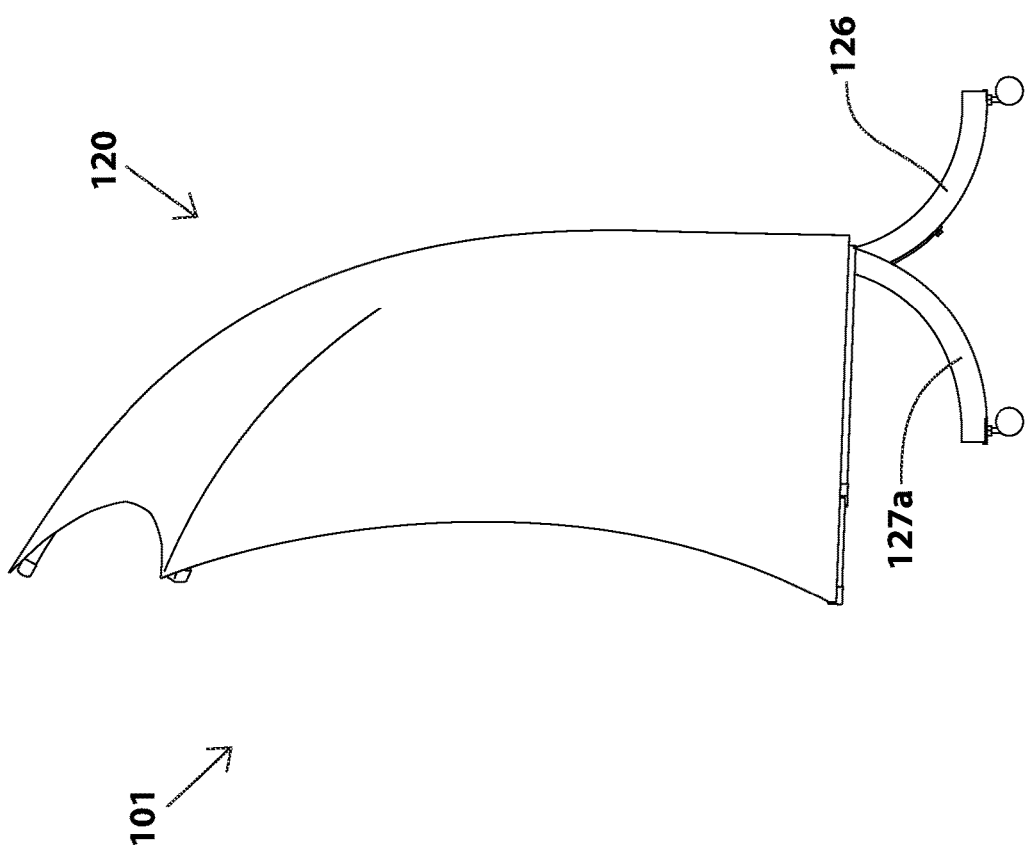
FIG. 10A illustrates a side view of the five-device-in-one arthritic-aiding reversible sun-blocking projector-screening event-sheltering vehicle-awning cupola.
Figure 10D:
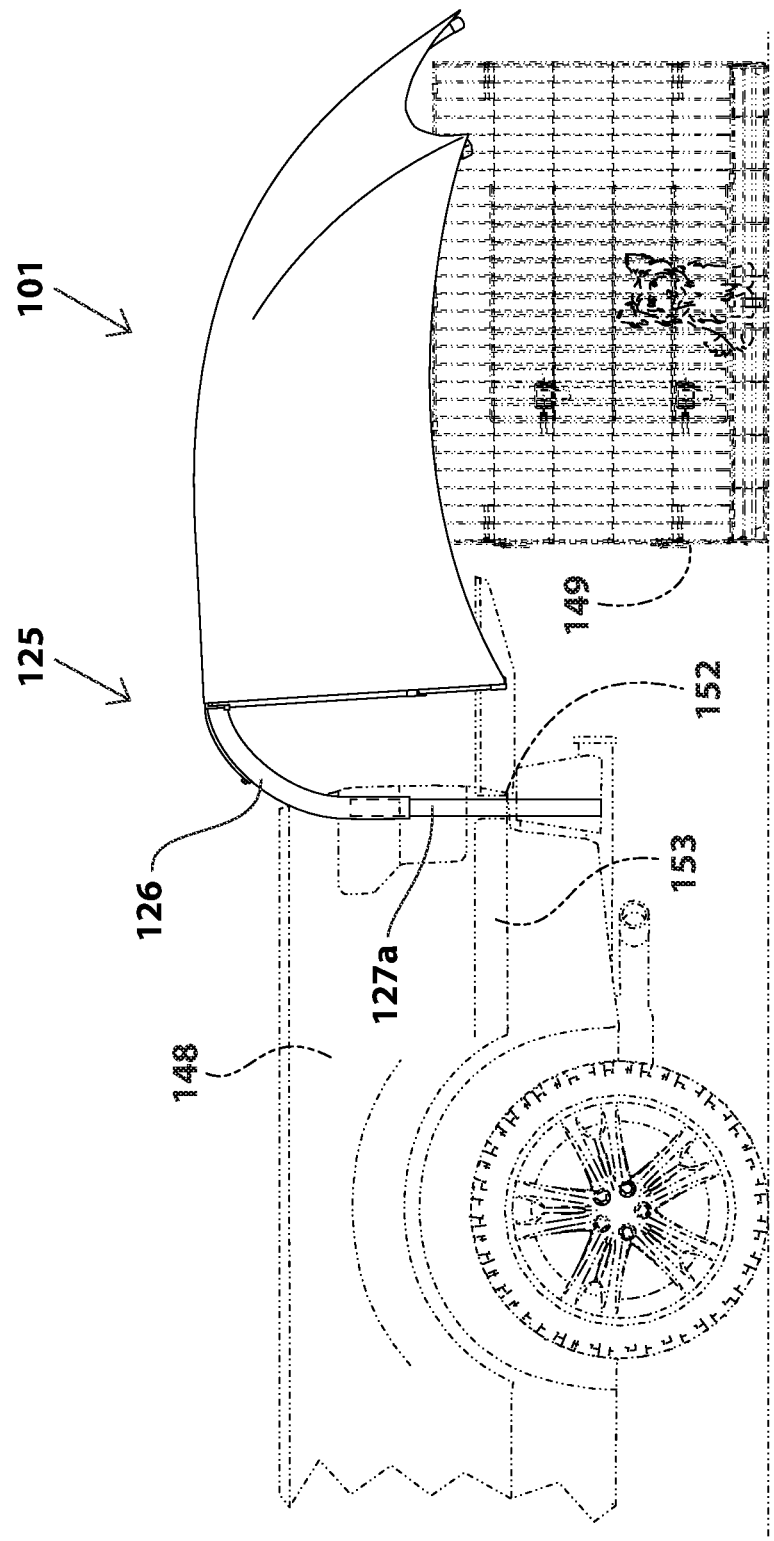
FIGS. 10D and 10E illustrate side views of a truck demonstrating the five-device-in-one arthritic-aiding reversible sun-blocking projector-screening event-sheltering vehicle-awning cupola in which the multi-unit-attachable utility-port-insertable reversible dual-arch foot is inserted into a tailgate slot, and functions as a tailgate awning.
Figure 10E:
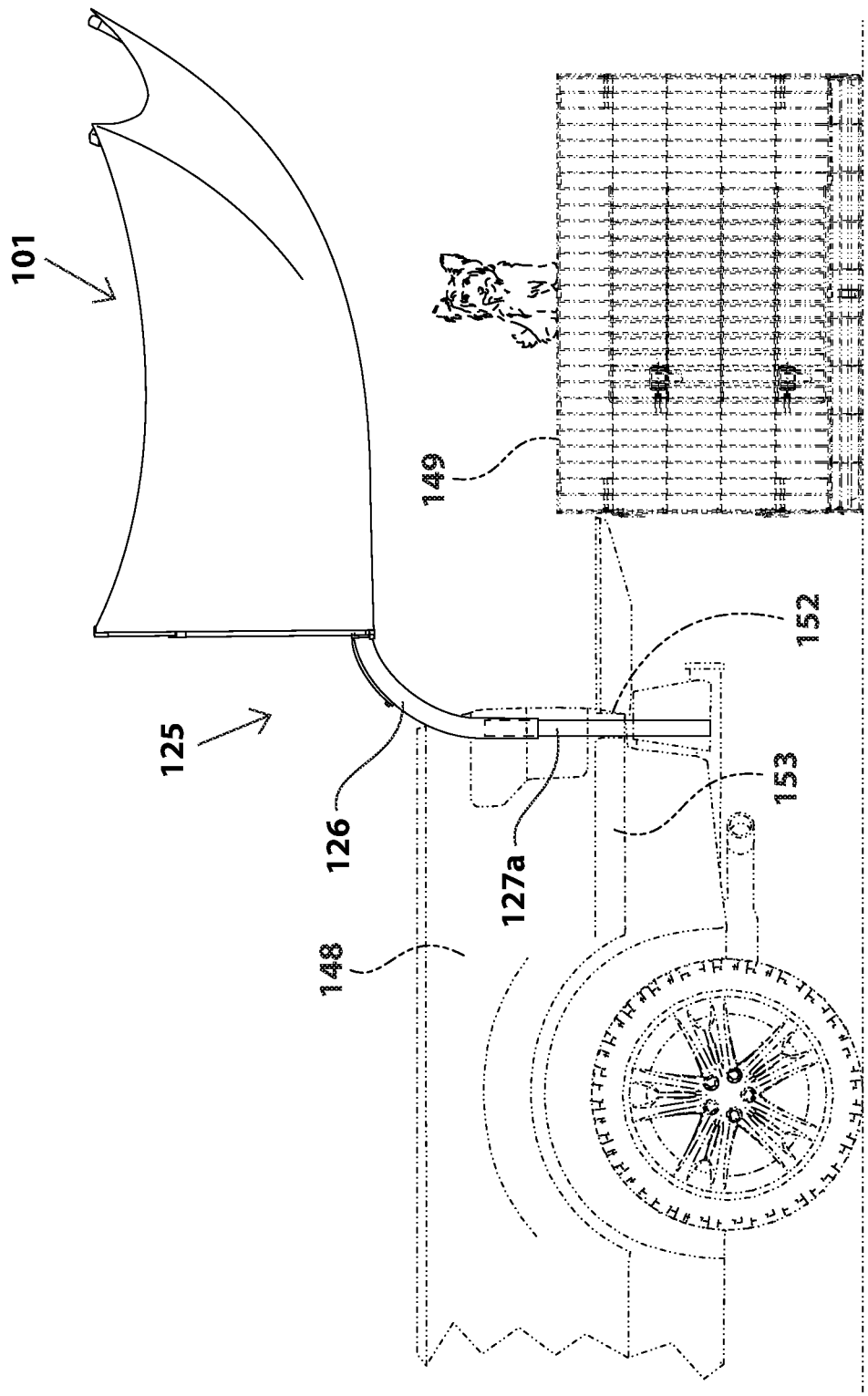
Figure 10G:
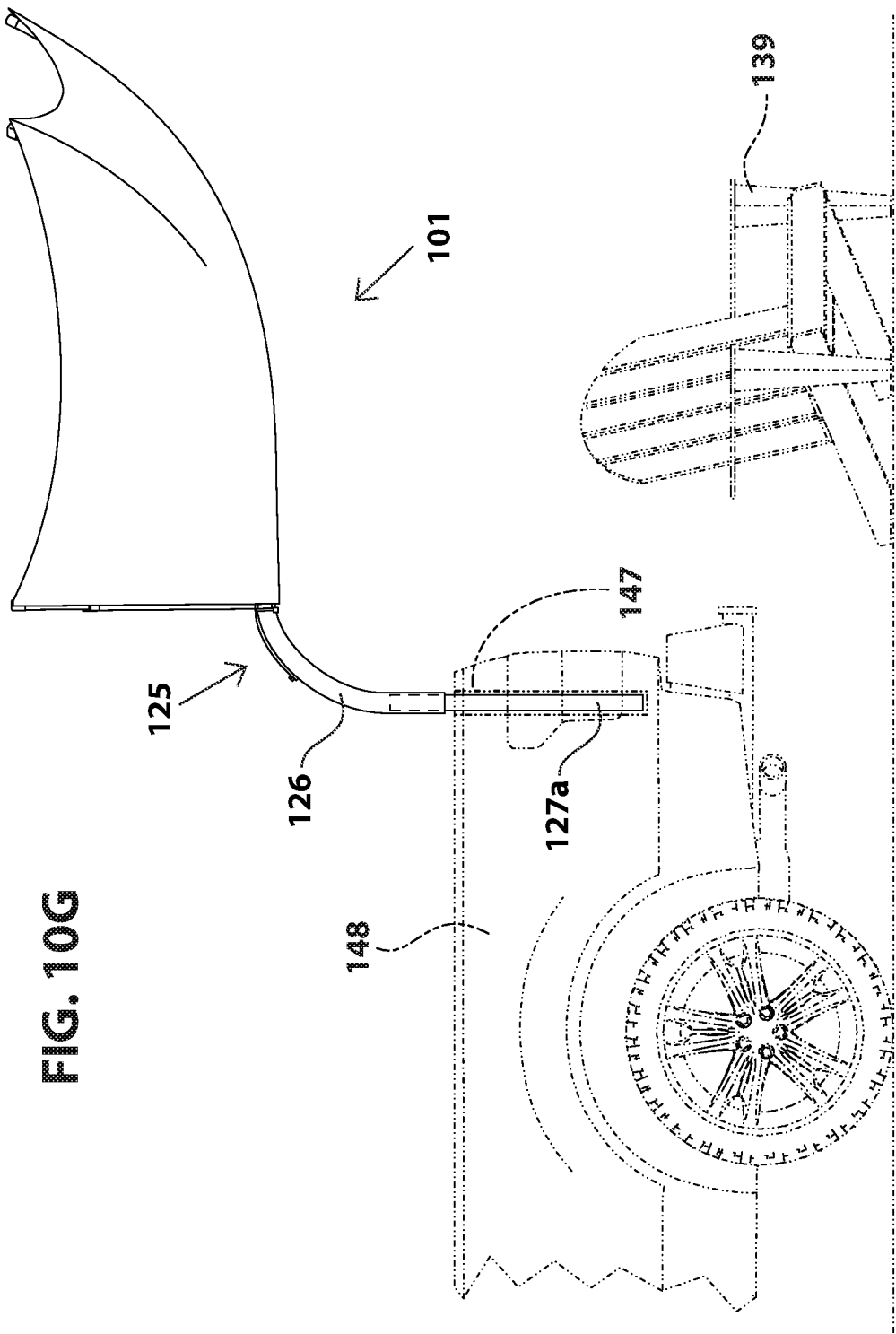

The five-device-in-one arthritic-aiding reversible sun-blocking projector-screening event-sheltering vehicle-awning cupola comprises:
1) Arthritic-aiding multi-function multi-unit-attaching cupola-spline system,
2) Arthritic-aiding cupola-spline-elevating and tensioning system,
3) Adjustable-utilitarian-volume double-sided-function dome system, and
4) Multi-unit-attaching utility-port trailer-hitch and tailgate-slot insertable and reversible tripod system.
Component Referring to FIG. 1A, FIG. 1B, FIG. 1C, FIG. 2A, FIG. 2B, FIG. 2C, FIG. 2D, FIG. 2E, FIG. 2F, FIG. 3A, FIG. 3B, FIG. 3C, FIG. 3D, FIG. 4A, FIG. 4B, FIG. 4C, and FIG. 5, the five-device-in-one arthritic-aiding reversible sun-blocking projector-screening event-sheltering vehicle-awning cupola comprises:
1) Arthritic-aiding multi-function multi-unit-attaching cupola-spline system 101 comprising:
2) Rubber end caps 102,
3) Arched cupola-spline-extension prongs 103,
4) Threaded cupola-attachment-screw holes 104,
5) Arthritic-aiding spline-extension spring-loaded buttons 105,
6) Spline-extension locking holes 106,
7) Spline step-down spacers 107,
8) Arched cupola splines 108;
9) Arthritic-aiding cupola-spline-elevating and tensioning system 109 comprising:
10) Arthritic-aiding automatic-sliding elevator lock 110,
11) Arthritic-aiding-elevator-lock lever 111,
12) Elevator-slide-lock cross-pins and cross-pin holes 112,
13) Elevator booms 113,
14) Arthritic-aiding elevator-boom hand paddles 114,
15) Elevator-boom bottom screws and screw holes 115a and 115b,
16) Cupola-spline base rotational and retraction hub 116,
17) Cupola-spline base-rotational-hub screws and holes 117,
18) Tripod-attaching square-head screws 118, 19) Tripod-attaching square holes 119;
20) Adjustable-utilitarian-volume double-sided-function dome system 120 comprising:
21) Adjustable-utilitarian-volume double-sided-function dome 121,
22) Shield-tensioning mounting grommet 122,
23) Shield-tensioning-mounting-grommet screws 123,
24) Tension-dome sleeves 124; and
25) Multi-unit-attaching utility-port trailer-hitch and tailgate-slot insertable and reversible tripod system 125 comprising:
26) Multi-unit-attachable utility-port-insertable reversible arch foot 126,
27) Multi-unit-attachable utility-port-insertable reversible dual-arch feet 127a and 127b,
28) Triangular arch-foot-stabilizing and reversing plate 128,
29) Arch-foot wing-screws 129,
30) Arch-foot screw holes 130,
31) Dual-arch-feet-attaching wing-nuts 131,
32) Dual-arch-feet-wing-nut square holes 132,
33) Detachable wheels 133,
34) Detachable-wheel posts 134,
35) Detachable-wheel-post threaded sockets 135,
36) Detachable-wheel mounting plates 136.

Material

Referring to FIG. 1A, FIG. 1B, FIG. 1C, FIG. 2A, FIG. 2B, FIG. 2C, FIG. 2D, FIG. 2E,
FIG. 2F, FIG. 3A, FIG. 3B, FIG. 3C, FIG. 3D, FIG. 4A, FIG. 4B, FIG. 4C, and FIG. 5:

1) Arthritic-aiding multi-function multi-unit-attaching cupola-spline system 101 is made of the combined materials of its components.
2) Rubber end caps 102
   each are made of rubber material.
3) Arched cupola-spline-extension prongs 103
   each are made of metallic material.
4) Threaded cupola-attachment-screw holes 104
   each are made of empty space.
5) Arthritic-aiding spline-extension spring-loaded buttons 105
   each are made of metallic material.
6) Spline-extension locking holes 106
   each are made of empty space.
7) Spline step-down spacers 107,
   each are made of plastic material.
8) Arched cupola splines 108
   each are made of metallic material.
9) Arthritic-aiding cupola-spline-elevating and tensioning system 109 is made of the combined materials of its components.
10) Arthritic-aiding automatic-sliding elevator lock 110
    is made of plastic and metallic material.
11) Arthritic-aiding-elevator-lock lever 111
    is made of plastic material.
12) Elevator-slide-lock cross-pins and cross-pin holes 112
    each are made of metallic material and empty space, respectively.
13) Elevator booms 113,
    each are made of metallic material.
14) Arthritic-aiding elevator-boom hand paddles 114
    each are made of plastic material.
15) Elevator-boom bottom screws and screw holes 115a and 115b
    each are made of metallic material and empty space, respectively.
16) Cupola-spline base rotational and retraction hub 116
    is made of metallic material.
17) Cupola-spline base-rotational-hub screws and holes 117
    each are made of metallic material and empty space, respectively.
18) Tripod-attaching square-head screws 118
    each are made of metallic material.
19) Tripod-attaching square holes 119
    each are made of empty space.
20) Adjustable-utilitarian-volume double-sided-function dome system 120 is made of the combined materials of its components.
21) Adjustable-utilitarian-volume double-sided-function dome 121
    is made of nylon fabric, the like, or the equivalent material.
22) Shield-tensioning mounting grommets 122
    each are made of plastic material and empty space.
23) Shield-tensioning-mounting-grommet screws 123
    each are made of metallic material.
24) Tension-dome sleeves 124
    each are made of nylon fabric, the like, or the equivalent material.
25) Multi-unit-attaching utility-port trailer-hitch and tailgate-slot insertable and reversible tripod system 125 is made of the combined materials of its components.
26) Multi-unit-attachable utility-port-insertable reversible arch foot 126
    is made of metallic material.
27) Multi-unit-attachable utility-port-insertable reversible dual-arch feet 127a and 127b
    each are made of metallic material.
28) Triangular arch-foot-stabilizing and reversing plate 128
    is made of metallic material.
29) Arch-foot wing-screws 129
    each are made of metallic material.
30) Arch-foot screw holes 130
    each are made of empty space.
31) Dual-arch-feet-attaching wing-nuts 131
    each are made of metallic material.
32) Dual-arch-feet-wing-nut square holes 132
    each are made of empty space.
33) Detachable wheels 133
    each are made of plastic and metallic materials.
34) Detachable-wheel posts 134
    each are made of metallic material.
35) Detachable-wheel-post threaded sockets 135
    each are made of metallic material.
36) Detachable-wheel mounting plates 136
    each are made of metallic material.

Shape

Referring to FIG. 1A, FIG. 1B, FIG. 1C, FIG. 2A, FIG. 2B, FIG. 2C, FIG. 2D, FIG. 2E, FIG. 2F, FIG. 3A, FIG. 3B, FIG. 3C, FIG. 3D, FIG. 4A, FIG. 4B, FIG. 4C, and FIG. 5:

1) Arthritic-aiding multi-function multi-unit-attaching cupola-spline system 101 is formed into the combined shapes of its components.
2) Rubber end caps 102
   each have a square cup shape.
3) Arched cupola-spline-extension prongs 103
   each have a curved tube shape.
4) Threaded cupola-attachment-screw holes 104
   each have a circular shape.
5) Arthritic-aiding spline-extension spring-loaded buttons 105
   each have a oval shape.
6) Spline-extension locking holes 106
   each have a circular shape.

7) Spline step-down spacers 107
   each have a square-ring shape.
8) Arched cupola splines 108
   each have a curved tube shape.
9) Arthritic-aiding cupola-spline-elevating and tensioning system 109 is formed into the combined shapes of its components.
10) Arthritic-aiding automatic-sliding elevator lock 110 has a T shape.
11) Arthritic-aiding-elevator-lock lever 111 has a rectangular shape.
12) Elevator-slide-lock cross-pins and cross-pin holes 112 each have a cylindrical shape and circular shape, respectively.
13) Elevator booms 113,
   each have a rectangular tube shape.
14) Arthritic-aiding elevator-boom hand paddles 114
   each have a flat rectangular shape.
15) Elevator-boom bottom screws and screw holes 115a and 115b
   each have a screw shape and a circular shape, respectively.
16) Cupola-spline base rotational and retraction hub 116 has a semi-circle shape.
17) Cupola-spline base-rotational-hub screws and holes 117
   each have a screw shape and circular shape, respectively.
18) Tripod-attaching square-head screws 118
   each have a screw shape with a square head.
19) Tripod-attaching square holes 119
   each have a square shape.
20) Adjustable-utilitarian-volume double-sided-function dome system 120 is formed into the combined shapes of its components.
21) Adjustable-utilitarian-volume double-sided-function dome 121 has a concaved crown shape.
22) Shield-tensioning mounting grommets 122
   each have a circular shape.
23) Shield-tensioning-mounting-grommet screws 123
   each have a screw shape.
24) Tension-dome sleeves 124
   each have a flattened tubular shape.
25) Multi-unit-attaching utility-port trailer-hitch and tailgate-slot insertable and reversible tripod system 125 is formed into the combined shapes of its components.
26) Multi-unit-attachable utility-port-insertable reversible arch foot 126 has a curved rectangular-tube shape.
27) Multi-unit-attachable utility-port-insertable reversible dual-arch feet 127a and 127b
   each have a curved rectangular-tube shape.
28) Triangular arch-foot-stabilizing and reversing plate 128 has a flat triangular shape.
29) Arch-foot wing-screws 129
   each have a screw shape with elongated double wings.
30) Arch-foot screw holes 130
   each have a circular shape.
31) Dual-arch-feet-attaching wing-nuts 131
   each have a hexagon shape with elongated double wings.
32) Dual-arch-feet-wing-nut square holes 132
   each have a square shape.
33) Detachable wheels 133
   each have a cylindrical shape.
34) Detachable-wheel posts 134
   each have a round post shape.
35) Detachable-wheel-post threaded sockets 135
   each have a hexagon shape.
36) Detachable-wheel mounting plates 136
   each have a L shape.

Connection

Referring to FIG. 1A, FIG. 1B, FIG. 1C, FIG. 2A, FIG. 2B, FIG. 2C, FIG. 2D, FIG. 2E, FIG. 2F, FIG. 3A, FIG. 3B, FIG. 3C, FIG. 3D, FIG. 4A, FIG. 4B, FIG. 4C, and FIG. 5:
1) Arthritic-aiding multi-function multi-unit-attaching cupola-spline system 101 is connected by the combined connections of its components.
2) Rubber end caps 102
   respectively are friction fit to arched cupola-spline-extension prongs 103.
3) Arched cupola-spline-extension prongs 103
   respectively and slidably are inserted into arched cupola splines 108.
4) Threaded cupola-attachment-screw holes 104
   respectively are drilled into arched cupola-spline-extension prongs 103.
5) Arthritic-aiding spline-extension spring-loaded buttons 105
   respectively are secured to arched cupola splines 108, and are springably and detachably inserted into spline-extension locking holes 106.
6) Spline-extension locking holes 106
   respectively are drilled into arched cupola splines 108.
7) Spline step-down spacers 107
   respectively are friction fit to arched cupola splines 108.
8) Arched cupola splines 108
   respectively and swingably are screwed to cupola-spline base rotational and retraction hub 116.
9) Arthritic-aiding cupola-spline-elevating and tensioning system 109 is connected by the combined connections of its components.
10) Arthritic-aiding automatic-sliding elevator lock 110 is slidably attached to an arched cupola splines 108.
11) Arthritic-aiding-elevator-lock lever 111
   is swingably attached to arthritic-aiding automatic-sliding elevator lock 110.
12) Elevator-slide-lock cross-pins cross-pin holes 112
   respectively and screwedly are inserted through, and drilled into arthritic-aiding automatic-sliding elevator lock 110.
13) Elevator booms 113
   respectively and rotatably are screwed to arched cupola splines 108 and arthritic-aiding automatic-sliding elevator lock 110.
14) Arthritic-aiding elevator-boom hand paddles 114
   respectively and rotatably are attached to elevator booms 113.
15) Elevator-boom bottom screws 115a
   respectively are inserted through elevator-boom bottom screw holes 115b. Elevator-boom bottom screw holes 115b
   respectively are drilled into elevator booms 113.
16) Cupola-spline base rotational and retraction hub 116 is screwedly attached to multi-unit-attachable utility-port-insertable reversible dual-arch feet 127a and 127b.
17) Cupola-spline base-rotational-hub screws and holes 117
   respectively are inserted through and drilled into cupola-spline base rotational and retraction hub 116.
18) Tripod-attaching square-head screws 118
   respectively are inserted through tripod-attaching square holes 119 and dual-arch-feet-wing-nut square holes 132.
19) Tripod-attaching square holes 119
   respectively are punched through the bottom of cupola-spline base rotational and retraction hub 116, respectively.

20) Adjustable-utilitarian-volume double-sided-function dome system 120 is connected by the combined connections of its components.
21) Adjustable-utilitarian-volume double-sided-function dome 121
is attached to respective tension-dome sleeves 124 and screwed to arched cupola-spline-extension prongs 103.
22) Shield-tensioning mounting grommets 122
respectively are sewn to adjustable-utilitarian-volume double-sided-function dome 121.
23) Shield-tensioning-mounting-grommet screws 123
respectively are inserted through shield-tensioning mounting grommets 122 and to threaded cupola-attachment-screw holes 104, respectively.
24) Tension-dome sleeves 124
respectively are slide over arched cupola splines 108.
25) Multi-unit-attaching utility-port trailer-hitch and tailgate-slot insertable and reversible tripod system 125 is connected by the combined connections of its components.
26) Multi-unit-attachable utility-port-insertable reversible arch foot 126
is detachably screwed to triangular arch-foot-stabilizing and reversing plate 128.
27) Multi-unit-attachable utility-port-insertable reversible dual-arch feet 127a and 127b
respectively are detachably screwed to cupola-spline base rotational and retraction hub 116.
28) Triangular arch-foot-stabilizing and reversing plate 128
is detachably screwed to multi-unit-attachable utility-port-insertable reversible dual-arch feet 127a and 127b and multi-unit-attachable utility-port-insertable reversible arch foot 126.
29) Arch-foot wing-screws 129
respectively are screwed into multi-unit-attachable utility-port-insertable reversible arch foot 126.
30) Arch-foot screw holes 130
respectively are drilled into multi-unit-attachable utility-port-insertable reversible arch foot 126.
31) Dual-arch-feet-attaching wing-nuts 131
respectively are screwed onto cupola-spline base-rotational-hub screws 117.
32) Dual-arch-feet-wing-nut square holes 132
respectively are punched into multi-unit-attachable utility-port-insertable reversible dual-arch feet 127a and 127b.
33) Detachable wheels 133
respectively are attached to detachable-wheel posts 134.
34) Detachable-wheel posts 134
respectively and detachably are screwed into detachable-wheel-post threaded sockets 135.
35) Detachable-wheel-post threaded sockets 135
respectively are molded to detachable-wheel mounting plates 136.
36) Detachable-wheel mounting plates 136
respectively are welded to multi-unit-attachable utility-port-insertable reversible dual-arch feet 127a and 127b and multi-unit-attachable utility-port-insertable reversible arch foot 126.
Function
Referring to FIG. 6A, FIG. 6B, FIG. 6C, FIG. 6D, FIG. 6E, FIG. 6F, FIG. 6G, FIG. 7A, FIG. 7B, FIG. 7C, FIG. 7D, FIG. 7E, FIG. 7F, FIG. 7G, FIG. 7H, FIG. 7I, FIG. 7J, FIG. 8, FIG. 9A, FIG. 9B, FIG. 9C, FIG. 9D, FIG. 9E, FIG. 9F, FIG. 10A, FIG. 10B, FIG. 10C, FIG. 10D, FIG. 10E, FIG. 10F, and FIG. 10G:

1) Arthritic-aiding multi-function multi-unit-attaching cupola-spline system 101 is for performing the combined functions of its components.
2) Rubber end caps 102 respectively are for:
protecting people from the sharp end-point of the arched cupola-spline-extension prongs 103.
3) Arched cupola-spline-extension prongs 103 respectively are for:
extending the length of the arched cupola splines 108.
4) Threaded cupola-attachment-screw holes 104 respectively are for:
securing adjustable-utilitarian-volume double-sided-function dome 121 to arched cupola-spline-extension prongs 103.
5) Arthritic-aiding spline-extension spring-loaded buttons 105 respectively are for:
manually locking and releasing arthritic-aiding automatic-sliding elevator lock 110 to arched cupola splines 108.
6) Spline-extension locking holes 106 respectively are for:
Locking arthritic-aiding spline-extension spring-loaded buttons 105 to arched cupola splines 108 at a predetermined vertical position.
7) Spline step-down spacers 107 respectively are for:
Providing a slidable bearing surface between arched cupola-spline-extension prongs 103 and arched cupola splines 108.
8) Arched cupola splines 108 respectively are for:
a) Supporting adjustable-utilitarian-volume double-sided-function dome 121;
in the direction (or directions) of arrows 137a and 137b (see FIG. 6A, FIG. 6B, and FIG. 6C);
b) Tensioning adjustable-utilitarian-volume double-sided-function dome 121
in the direction (or directions) of arrows 137a and 137b (see FIG. 6A and FIG. 6C);
c) Deploying adjustable-utilitarian-volume double-sided-function dome 121
in the direction (or directions) of arrows 137a and 137b (see FIG. 6A, FIG. 6B, and FIG. 6C);
d) Retracting adjustable-utilitarian-volume double-sided-function dome 121
in the direction (or directions) of arrows 137a and 137b (see FIG. 6A, FIG. 6B, and FIG. 6C); and
e) Connecting and coupling multiple five-device-in-one arthritic-aiding reversible sun-blocking projector-screening event-sheltering vehicle-awning cupolas together
in the direction (or directions) of arrows 137a, 137b, 137c, 137d, and 138
(see FIG. 6D, FIG. 6E, FIG. 6F, and FIG. 6G).
9) Arthritic-aiding cupola-spline-elevating and tensioning system 109 is for performing the combined functions of its components.
10) Arthritic-aiding automatic-sliding elevator lock 110 is for:
a) Automatically deploying arthritic-aiding cupola-spline-elevating and tensioning system 109, in conjunction with elevator booms 113, and arched cupola splines 108
in the direction (or directions) of arrows 140, 144a, 144b, 144c, 144d and 145
(see FIG. 7A, FIG. 7B, FIG. 7C, FIG. 7D, FIG. 7E, FIG. 7F, FIG. 7G, FIG. 7H, and FIG. 7J);
b) Retracting arthritic-aiding cupola-spline-elevating and tensioning system 109 in conjunction with elevator booms 113 and arched cupola splines 108 in the direction (or directions) of arrows 144*a*, 144*b*, 144*c*, 144*d*, 145, and 146
(see FIG. 7A, FIG. 7B, FIG. 7C, FIG. 7D, FIG. 7E, FIG. 7F, FIG. 7G, FIG. 7H, FIG. 7I, and FIG. 7J);
  c) Assisting elevator booms 113
    to provide tension to arthritic-aiding cupola-spline-elevating and tensioning system 109
      in the direction (or directions) of arrows 144*a*, 144*b*, 144*c*, 144*d*, 145, and 146
      (see FIG. 7A, FIG. 7B, FIG. 7D, FIG. 7E, FIG. 7F, FIG. 7G, and FIG. 7J); and
  d) Sliding vertically on respective arched cupola splines 108,
    (see FIG. 7A, FIG. 7B, FIG. 7C, FIG. 7D, and FIG. 7J).
11) Arthritic-aiding-elevator-lock lever 111 is for:
  a) Engaging arthritic-aiding automatic-sliding elevator lock 110 on arched cupola splines 108 using an arthritic's hand 142
    in the direction (or directions) of arrows 140, 141, 143, 144*a*, 144*b*, 144*c*, 144*d*, and 145
    (see FIG. 7A, FIG. 7B, FIG. 7C, FIG. 7D, and FIG. 7E);
  b) Assisting arthritic-aiding automatic-sliding elevator lock 110
    to lock elevator booms 113 to a predetermined vertical position on respective arched cupola splines 108
      in the direction (or directions) of arrows 144*a*, 144*b*, 144*c*, 144*d*, 145, and 146
      (see FIG. 7A, FIG. 7B, FIG. 7D, FIG. 7E, FIG. 7F, FIG. 7G, and FIG. 7J);
  c) Quickly and easily repositioning arthritic-aiding automatic-sliding elevator lock 110 on arched cupola splines 108 with an arthritic's hand 142
    in the direction (or directions) of arrows 140, 141, 144*a*, 144*b*, 144*c*, and 144*d*
    (see FIG. 7B, FIG. 7D, FIG. 7E, FIG. 7F, FIG. 7G, and FIG. 7J); and
  d) Providing large surface area handles
    to aid those arthritic's with limited hand 142 mobility due to an arthritic physical condition
      in the direction (or directions) of arrows 140, 141, 143, 144*a*, 144*b*, 144*c*, 144*d* and 145
      (see FIG. 7A, FIG. 7B, FIG. 7C, FIG. 7D, and FIG. 7E).
12) Elevator-slide-lock cross-pins and cross-pin holes 112 respectively are for:
  Hingingly securing arched cupola splines 108 to cupola-spline base rotational and retraction hub 116.
13) Elevator booms 113 respectively are for:
  Hingedly and adjustably connecting arthritic-aiding automatic-sliding elevator lock 110 to respective arched cupola splines 108.
14) Arthritic-aiding elevator-boom hand paddles 114 respectively are for:
  a) Allowing an arthritic hand
    to securely and effectively grip arthritic-aiding cupola-spline-elevating and tensioning system 109
      in the direction (or directions) of arrow 146
      (see FIG. 7I and FIG. 7J);
  b) Allowing persons with arthritic hands to deploy the arthritic-aiding cupola-spline-elevating and tensioning system 109 easier, by sliding the arthritic-aiding automatic-sliding elevator lock 110 upwards and downwards on respective arched cupola splines 108
    in the direction (or directions) of arrow 146
    (see FIG. 7I and FIG. 7J);
  c) Allowing persons with arthritic hands to slide the arthritic-aiding automatic-sliding elevator lock 110 upwards and downwards on respective arched cupola splines 108
    in the direction (or directions) of arrows 144*a*, 144*b*, and 146
    (see FIG. 7F, FIG. 7I, and FIG. 7J);
  d) Accommodating arthritic hands
    to grip arthritic-aiding cupola-spline-elevating and tensioning system 109 in two points of contact, to the left and right sides of center of arthritic-aiding automatic-sliding elevator lock 110 thereby equalizing side-to-side pressure while pushing upwards and downwards
      in the direction (or directions) of arrows 144*a*, 144*b*, and 146 (see FIG. 7F, FIG. 7I, and FIG. 7J);
  e) Reducing effort for a person with arthritic hands by providing two, rather than one, arthritic-aiding elevator-boom hand paddles 114
    to assist while operating arthritic-aiding automatic-sliding elevator lock 110
      in the direction (or directions) of arrows 144*a*, 144*b*, and 146 (see FIG. 7F, FIG. 7I, and FIG. 7J);
  f) Reducing pain for those with arthritic-hand conditions by providing large paddle surface areas
    to distribute the pressure or their hands over the broad flat surfaces of arthritic-aiding elevator-boom hand paddles 114, thereby minimizing pressure to concentrated areas of their hands
      in the direction (or directions) of arrows 144*a*, 144*b*, and 146 (see FIG. 7F, FIG. 7I, and FIG. 7J);
  g) Aiding those with arthritic-hand conditions by providing ridges at the front and back of arthritic-aiding elevator-boom hand paddles 114
    to aid by helping to easily position and maintain their hands in the center of arthritic-aiding elevator-boom hand paddles 114, without slipping off, as prior art would naturally promote
      in the direction (or directions) of arrows 144*a*, 144*b*, and 146
      (see FIG. 7F, FIG. 7I, and FIG. 7J); and
  h) Aiding those with arthritic-hand conditions by providing ridges at the top and bottom of arthritic-aiding elevator-boom hand paddles 114
    to aid those with arthritic hand conditions by helping them easily position and maintain their hands in the center of arthritic-aiding elevator-boom hand paddles 114, while pushing upwards or downwards
      in the direction (or directions) of arrows 144*a*, 144*b*, and 146
      (see FIG. 7F, FIG. 7I, and FIG. 7J).
15) Elevator-boom bottom screws 115*a* respectively are for:
  Hingedly securing respective elevator booms 113 to cupola-spline base rotational and retraction hub 116.
  Elevator-boom bottom screw holes 115*b* respectively are for:
  Screwing onto elevator-boom bottom screws 115*a*.
16) Cupola-spline base rotational and retraction hub 116 respectively are for:
  Allowing respective arched cupola splines 108 to rotate from a respective central location
    to allow arched cupola splines 108 to thereby deploy and retract.

17) Cupola-spline base-rotational-hub screws and holes 117 respectively are for:
    Hingedly attaching respective arched cupola splines 108 to cupola-spline base rotational and retraction hub 116 to allow arched cupola splines 108 to thereby deploy and retract.
18) Tripod-attaching square-head screws 118 respectively are for:
    Inserting through tripod-attaching square holes 119, respectively.
19) Tripod-attaching square holes 119 respectively are for:
    Securing tripod-attaching square-head screws 118 to cupola-spline base rotational and retraction hub 116, respectively.
20) Adjustable-utilitarian-volume double-sided-function dome system 120 is for performing the combined functions of its components.
21) Adjustable-utilitarian-volume double-sided-function dome 121 is for:
    a) Functioning as a weather shield
        to deflect the wind or to block radiation from the sun
            (see FIG. 9A, FIG. 9C, FIG. 9E, FIG. 10D, and FIG. 10F);
    b) Functioning as a freestanding privacy shield when mounted to a trailer hitch 150
        to visually block the view into private areas, such as courtyards, apartment patios, apartment balconies, and back yards
            (see FIG. 10A, FIG. 10B, and FIG. 10C);
    c) Functioning as a domed truck-bed cover when mounted in a utility port 147
        to provide greater volume in the height of the truck bed, allowing for additional items to be protected
            (see FIG. 9A, FIG. 9C, FIG. 9E, FIG. 10D, and FIG. 10F);
    d) Functioning as a domed truck-side tent when mounted in a utility port 147
        to provide shelter to persons camping in the truck bed
            (see FIG. 6F and FIG. 6G);
    e) Functioning as a curved projection screen
        to view projected-light entertainment thereon, such as a movie, to thereby provide a greater user experience
            (see FIG. 8, 10A, 10B, and FIG. 10C);
    f) Functioning as a truck-side awning when mounted to a utility port 147
        to provide protection from the sun's radiation and rain during sports games, picnicking, and camping
            (see FIG. 9C, FIG. 9D, FIG. 9E, and FIG. 9F);
    g) Functioning as a tailgate awning when mounted to a utility port 147
        to provide protection from the sun's radiation and rain, for picnic food being served, and a cover for a picnic table
            (see FIG. 10F, and FIG. 10G);
    h) Functioning as an awning when mounted to a back of a truck
        to provide protection from the sun's radiation and rain to persons, such as those watching sports games, or relaxing in a chair 139
            (see FIG. 10B, FIG. 10C, FIG. 10D, FIG. 10E, FIG. 10F, and FIG. 10G);
    i) Functioning as an awning when mounted to a tailgate-slot 152
        to provide protection from the sun's radiation and rain to persons behind the truck, such as those watching sports games, or relaxing in a chair 139
            (see FIG. 10D and FIG. 10E);
    j) Functioning as an awning when mounted to a trailer hitch 150
        to provide protection from the sun's radiation behind the truck, such as for food coolers, dog kennels, and persons sleeping in a sleeping bag on the ground
            (see FIG. 10B and FIG. 10C);
    k) Attaching to tension-dome sleeves 124, respectively, and screwing to arched cupola-spline-extension prongs 103, respectively,
    l) Providing a flexible, limited-stretch medium
        to allow arthritic-aiding multi-function multi-unit-attaching cupola-spline system 101 to thereby deploy and retract
            in the direction (or directions) of arrows 136a and 136b
                (see FIG. 1B, FIG. 1C, FIG. 6A, FIG. 6B, FIG. 7F, and FIG. 8); and
    m) Providing a flexible, limited-stretch medium
        to become a tight and tensioned medium when arthritic-aiding cupola-spline-elevating and tensioning system 109 is deployed
            in the direction (or directions) of arrows 136a and 136b
                (see FIG. 1B, FIG. 6A, FIG. 6B, FIG. 7F, and FIG. 8E).
22) Shield-tensioning mounting grommets 122 respectively are for:
    Securing adjustable-utilitarian-volume double-sided-function dome 121 to arched cupola-spline-extension prongs 103
23) Shield-tensioning-mounting-grommet screws 123 respectively are for:
    Screwing through shield-tensioning mounting grommets 122 and to threaded cupola-attachment-screw holes 104, respectively.
24) Tension-dome sleeves 124 respectively are for:
    Fitting over respective arched cupola splines 108
        to thereby secure the bottom of adjustable-utilitarian-volume double-sided-function dome 121 to arthritic-aiding multi-function multi-unit-attaching cupola-spline system 101, respectively.
25) Multi-unit-attaching utility-port trailer-hitch and tailgate-slot insertable and reversible tripod system 125 is for performing the combined functions of its components.
26) Multi-unit-attachable utility-port-insertable reversible arch foot 126 is for:
    a) Attaching to utility port 147 of a pickup truck bed to function as a weather shield
        to deflect the wind or to block radiation from the sun
            (see FIG. 9A, FIG. 9C, FIG. 9E, FIG. 10D, and FIG. 10F);
    b) Attaching to a utility port 147 of a pickup truck bed to function as a privacy shield
        to visually block the view into private areas, such as courtyards, apartment patios, apartment balconies, and back yards
            (see FIG. 10A, FIG. 10B, and FIG. 10C);
    c) Attaching to a utility port 147 of a pickup truck bed to function as a domed truck-bed cover
        to provide greater volume in the height of the truck bed, allowing for additional items to be protected
            (see FIG. 9A, FIG. 9C, FIG. 9E, FIG. 10D, and FIG. 10F);
    d) Attaching to a utility port 147 of a pickup truck bed to function as a domed truck-side tent, mounted in utility port 147 to provide shelter to persons camping in the truck bed
(see FIG. 9A, FIG. 9C, FIG. 9E, FIG. 10D, and FIG. 10F);
e) Attaching to a utility port 147 of a pickup truck bed to function as a curved projection screen
to view projected-light entertainment thereon, such as a movie, to thereby provide a greater user experience
(see FIG. 8, 10A, 10B, and FIG. 10C);
f) Attaching to a utility port 147 of a pickup truck bed to function as a truck-side awning
to provide protection from the sun's radiation and rain during sports games, picnicking, and camping
(see FIG. 9C, FIG. 9D, FIG. 9E, and FIG. 9F);
g) Attaching to a utility port 147 of a pickup truck bed to function as a tailgate awning
to provide protection from the sun's radiation and rain, for picnic food being served, and a cover for a picnic table
(see FIG. 10F, and FIG. 10G);
h) Attaching to a utility port 147 of a pickup truck bed to function as an awning
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G);
i) Attaching to a tailgate-slot 152 of a pickup truck to function as an awning
to provide protection from the sun's radiation and rain to persons behind the truck, such as those watching sports games, or relaxing in a chair 139
(see FIG. 10D and FIG. 10E); and
j) Attaching to a trailer hitch 150 of a pickup truck to function as an awning
to provide protection from the sun's radiation behind the truck, such as for food coolers, dog kennels, and persons sleeping in a sleeping bag on the ground
(see FIG. 10B and FIG. 10C);
k) Attaching to, detaching from, or reversing onto multi-unit-attaching utility-port trailer-hitch and tailgate-slot insertable and reversible tripod system 125;
l) Supporting arthritic-aiding multi-function multi-unit-attaching cupola-spline system 101.
27) Multi-unit-attachable utility-port-insertable reversible dual-arch feet 127a and 127b respectively are for:
a) Attaching to a utility port 147 of a pickup truck bed to function as a weather shield
to deflect the wind or to block radiation from the sun
(see FIG. 9A, FIG. 9C, FIG. 9E, FIG. 10D, and FIG. 10F);
b) Allowing the five-device-in-one arthritic-aiding reversible sun-blocking projector-screening event-sheltering vehicle-awning cupola to act as a privacy shield, as a freestanding device or when mounted to trailer hitch 150
to visually block the view into private areas, such as courtyards, apartment patios, apartment balconies, and back yards
(see FIG. 10A, FIG. 10B, and FIG. 10C);
c) Attaching to a utility port 147 of a pickup truck bed to function as a domed truck-bed cover
to provide greater volume in the height of the truck bed, allowing for additional items to be protected
(see FIG. 9A, FIG. 9C, FIG. 9E, FIG. 10D, and FIG. 10F);
d) Attaching to a utility port 147 of a pickup truck bed to function as a domed truck-side tent, mounted in utility port 147
to provide shelter to persons camping in the truck bed
(see FIG. 9A, FIG. 9C, FIG. 9E, FIG. 10D, and FIG. 10F);
e) Attaching to a utility port 147 of a pickup truck bed to function as a curved projection screen
to view projected-light entertainment thereon, such as a movie, to thereby provide a greater user experience
(see FIG. 8, 10A, 10B, and FIG. 10C);
f) Attaching to a utility port 147 of a pickup truck bed to function as a truck-side awning
to provide protection from the sun's radiation and rain during sports games, picnicking, and camping
(see FIG. 9C, FIG. 9D, FIG. 9E, and FIG. 9F);
g) Attaching to a utility port 147 of a pickup truck bed to function as a tailgate awning
to provide protection from the sun's radiation and rain, for picnic food being served, and a cover for a picnic table
(see FIG. 10F, and FIG. 10G);
h) Attaching to a utility port 147 of a pickup truck bed to function as an awning
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G); and
i) Attaching to a tailgate-slot 152 of a pickup truck to function as an awning
to provide protection from the sun's radiation and rain to persons behind a truck 148, such as those watching sports games, or relaxing in a chair 139, for food coolers, dog kennels, and persons camping in a sleeping bag on the ground
(see FIG. 10D and FIG. 10E).
28) Triangular arch-foot-stabilizing and reversing plate 128 is for:
Providing an area to mount, stabilize, and reverse multi-unit-attachable utility-port-insertable reversible arch foot 126, on multi-unit-attachable utility-port-insertable reversible dual-arch feet 127a and 127b.
29) Arch-foot wing-screws 129 respectively are for:
Attaching and detaching multi-unit-attachable utility-port-insertable reversible arch foot 126 to triangular arch-foot-stabilizing and reversing plate 128.
30) Arch-foot screw holes 130 respectively are for:
Inserting arch-foot wing-screws 129.
31) Dual-arch-feet-attaching wing-nuts 131 respectively are for:
Screwing to tripod-attaching square-head screws 118.
32) Dual-arch-feet-wing-nut square holes 132 respectively are for:
Securing tripod-attaching square-head screws 118 to multi-unit-attachable utility-port-insertable reversible dual-arch feet 127a and 127b.
33) Detachable wheels 133 respectively are for:
a) Allowing arthritic-aiding multi-function multi-unit-attaching cupola-spline system 101 to roll
to provide means to easily reposition the arthritic-hand-aiding reversible sun-blocking pet-protecting dome-shelter awning and truck-bed cupola for storage
(see FIG. 7G, FIG. 7H, FIG. 8, and FIG. 10A); and
b) Easily attaching and detaching detachable wheels 133 to or from arthritic-aiding multi-function multi-unit-attaching cupola-spline system 101 to allow multi-unit-attachable utility-port-insertable reversible arch foot 126 or multi-unit-attachable utility-port-insertable reversible dual-arch feet 127*a* and 127*b* to be inserted into a utility port 147, a tailgate-slot 152, or a hitch 150
(see FIG. 10B, FIG. 10C, FIG. 10D, FIG. 10E, FIG. 10F, and FIG. 10G)

34) Detachable-wheel posts 134 respectively are for:
Detaching and attaching detachable wheels 133 to detachable-wheel-post threaded sockets 135.

35) Detachable-wheel-post threaded sockets 135 respectively are for:
Receiving detachable-wheel posts 134.

36) Detachable-wheel mounting plates 136 respectively are for:
Attaching and detaching detachable wheels 133 to multi-unit-attachable utility-port-insertable reversible dual-arch feet 127*a* and 127*b* and multi-unit-attachable utility-port-insertable reversible arch foot 126, respectively.

Variation

Figure 11A:
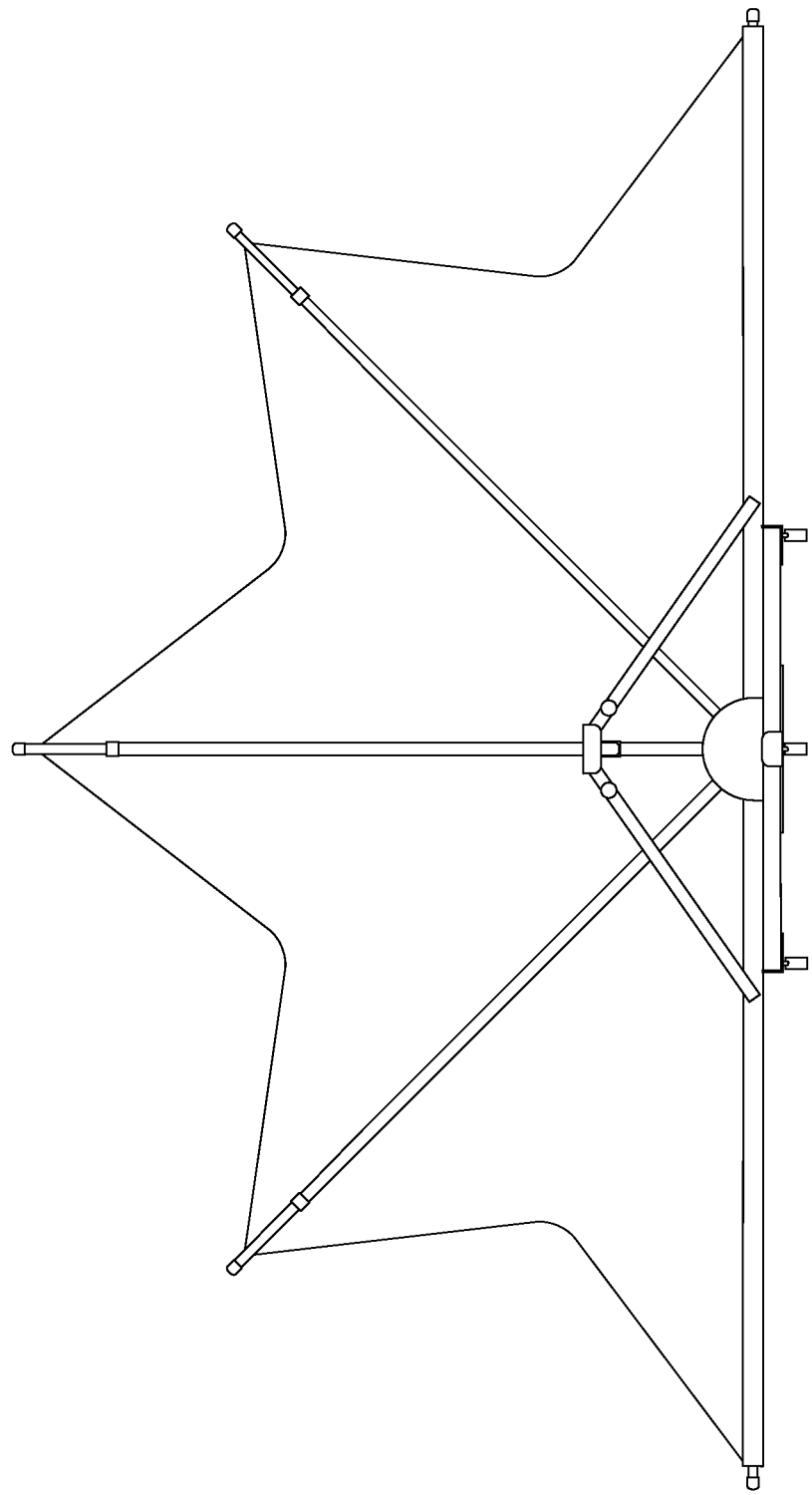
FIG. 11A illustrates a front view of an equivalent variation of the five-device-in-one arthritic-aiding reversible sun-blocking projector-screening event-sheltering vehicle-awning cupola with a star-shaped adjustable-utilitarian-volume double-sided-function dome system.
Figure 11B:
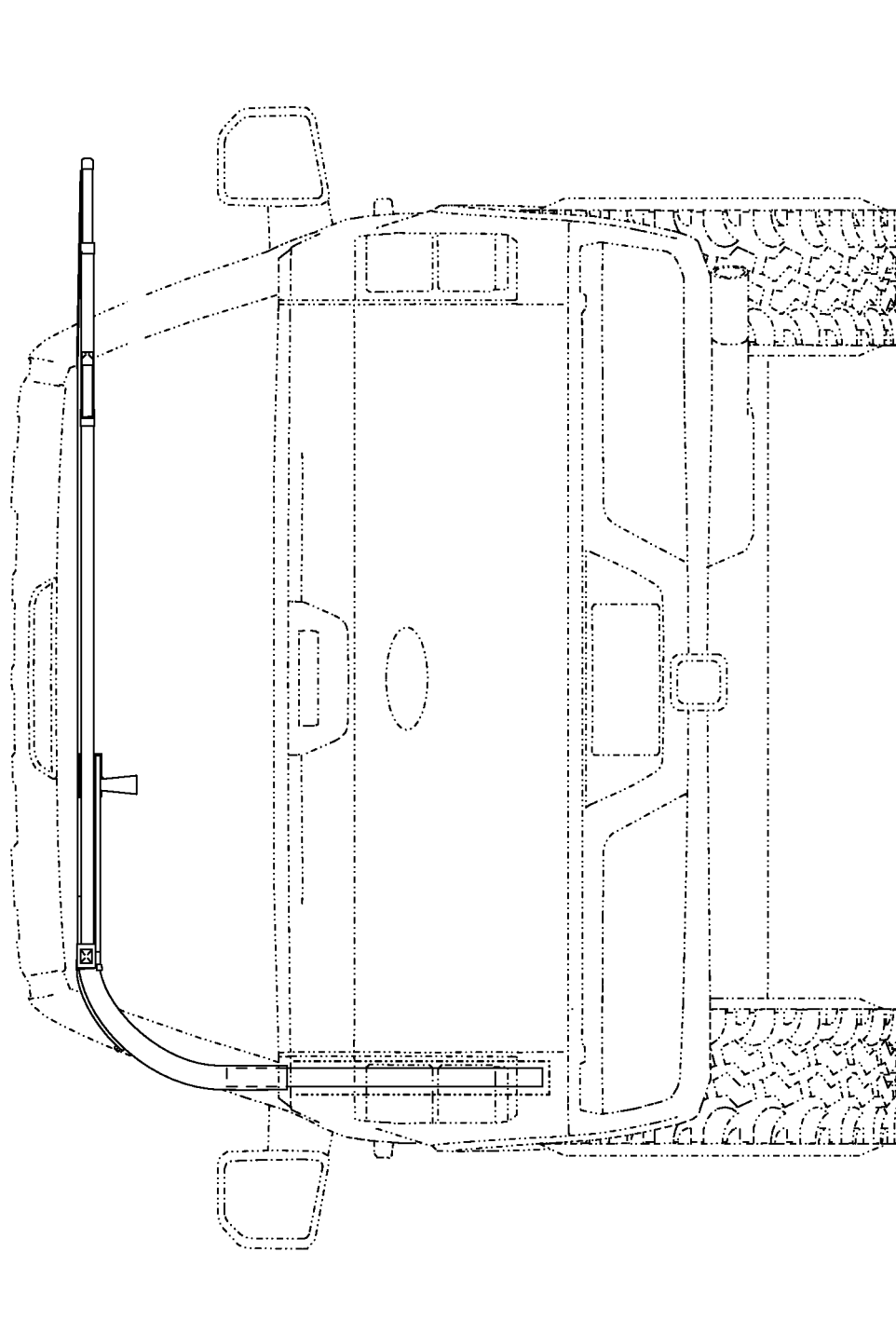
FIG. 11B, FIG. 11C, and FIG. 11D illustrate back views of a truck demonstrating an equivalent variation of the five-device-in-one arthritic-aiding reversible sun-blocking projector-screening event-sheltering vehicle-awning cupola with a star-shaped adjustable-utilitarian-volume double-sided-function dome system inserted into a utility port, by the multi-unit-attachable utility-port-insertable reversible dual-arch foot, and functions as a truck bed cover, and a side awning, and dual side awnings, respectively.
Figure 11C:
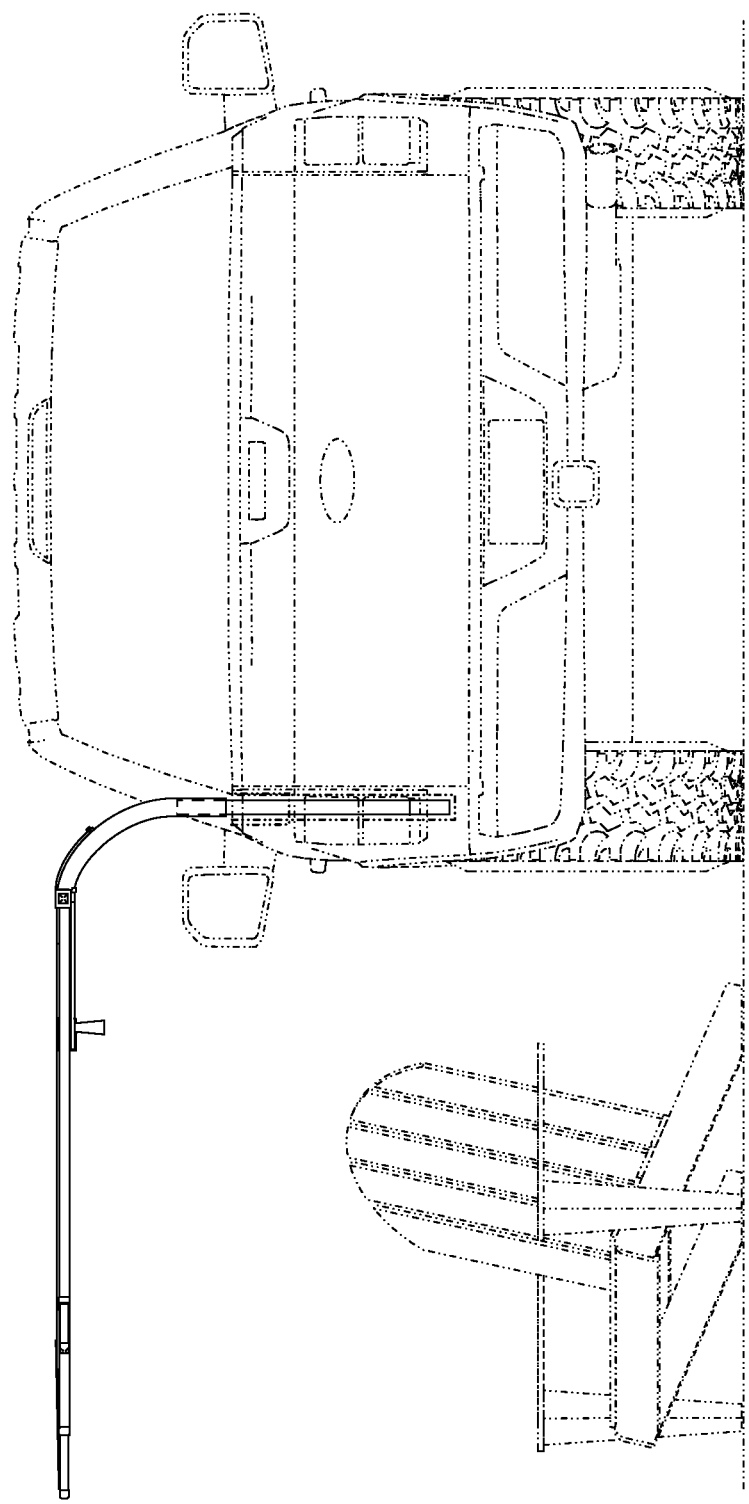
Figure 11D:
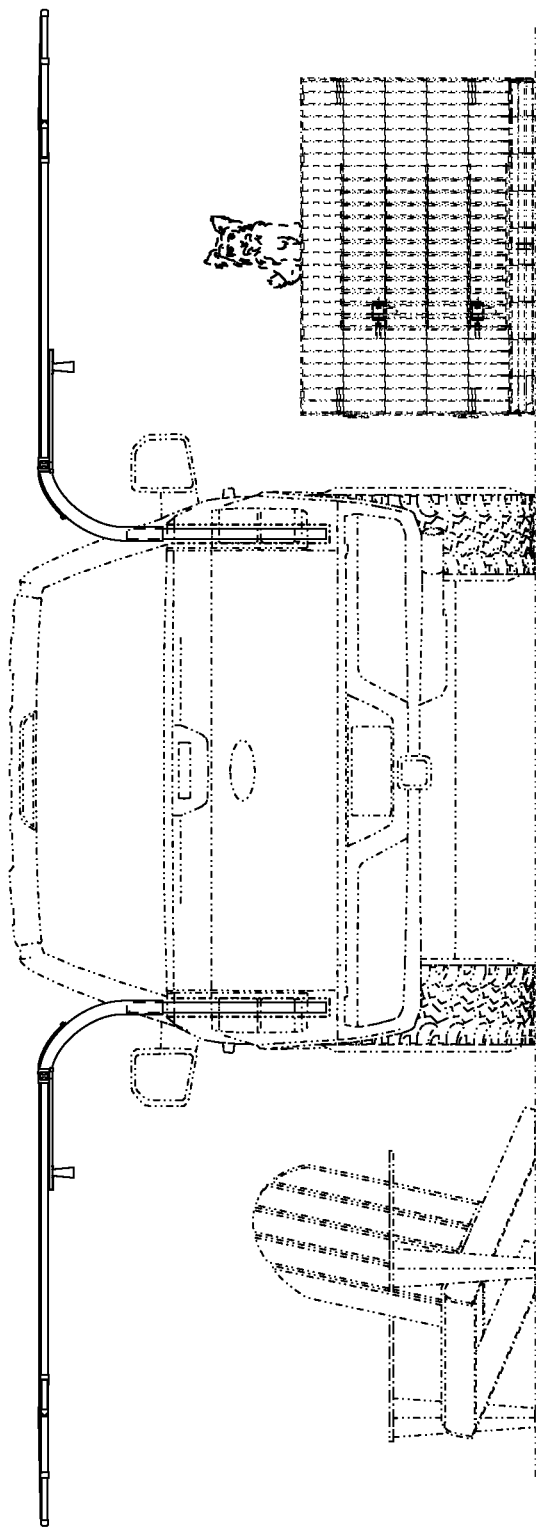
Figure 11E:
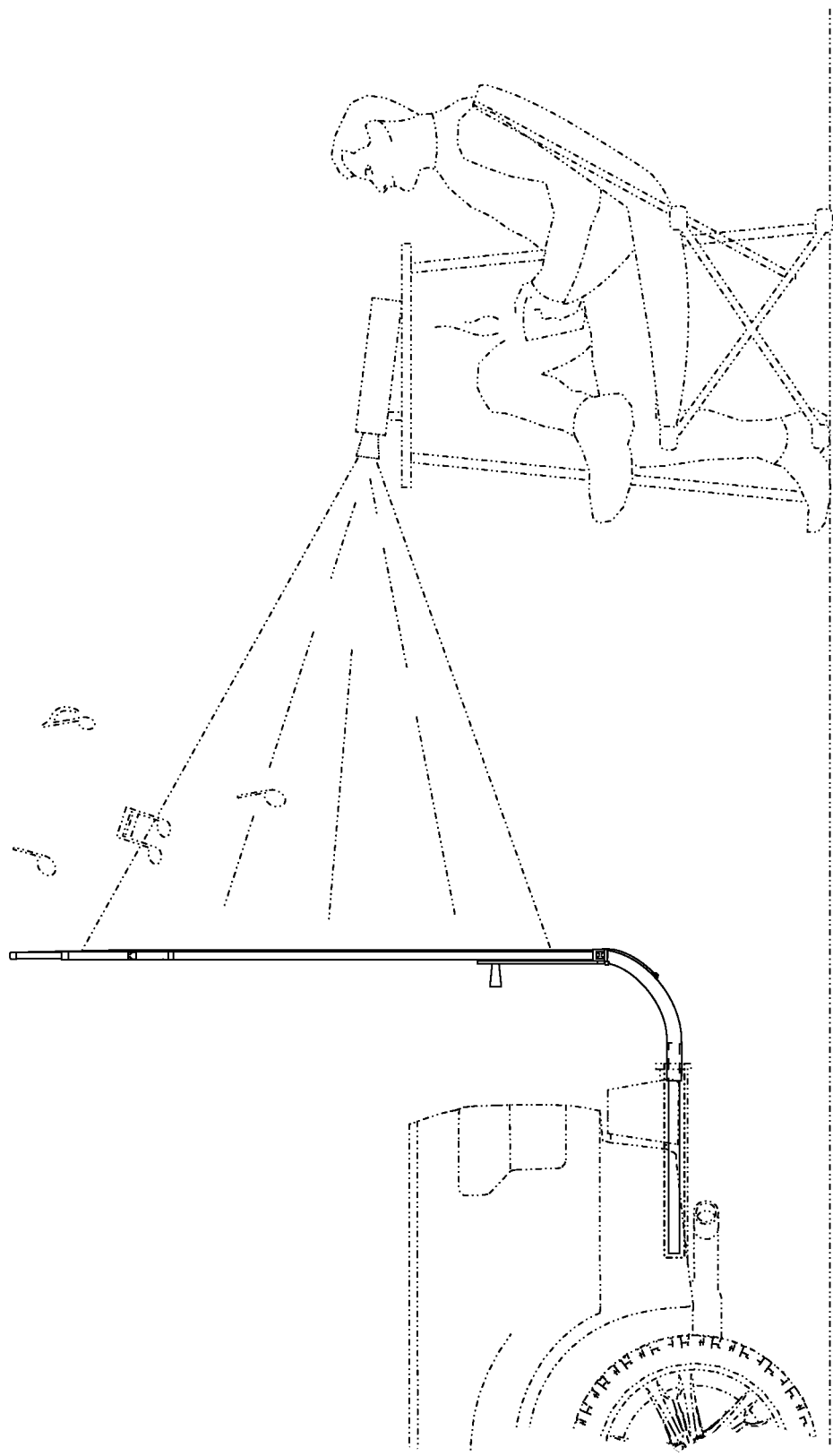
FIG. 11E illustrates a side view of a truck demonstrating an equivalent variation of the five-device-in-one arthritic-aiding reversible sun-blocking projector-screening event-sheltering vehicle-awning cupola with a star-shaped adjustable-utilitarian-volume double-sided-function dome system inserted into a hitch, by the multi-unit-attachable utility-port-insertable reversible dual-arch foot, and functions as a hitch-mount wind screen.
Figure 11G:
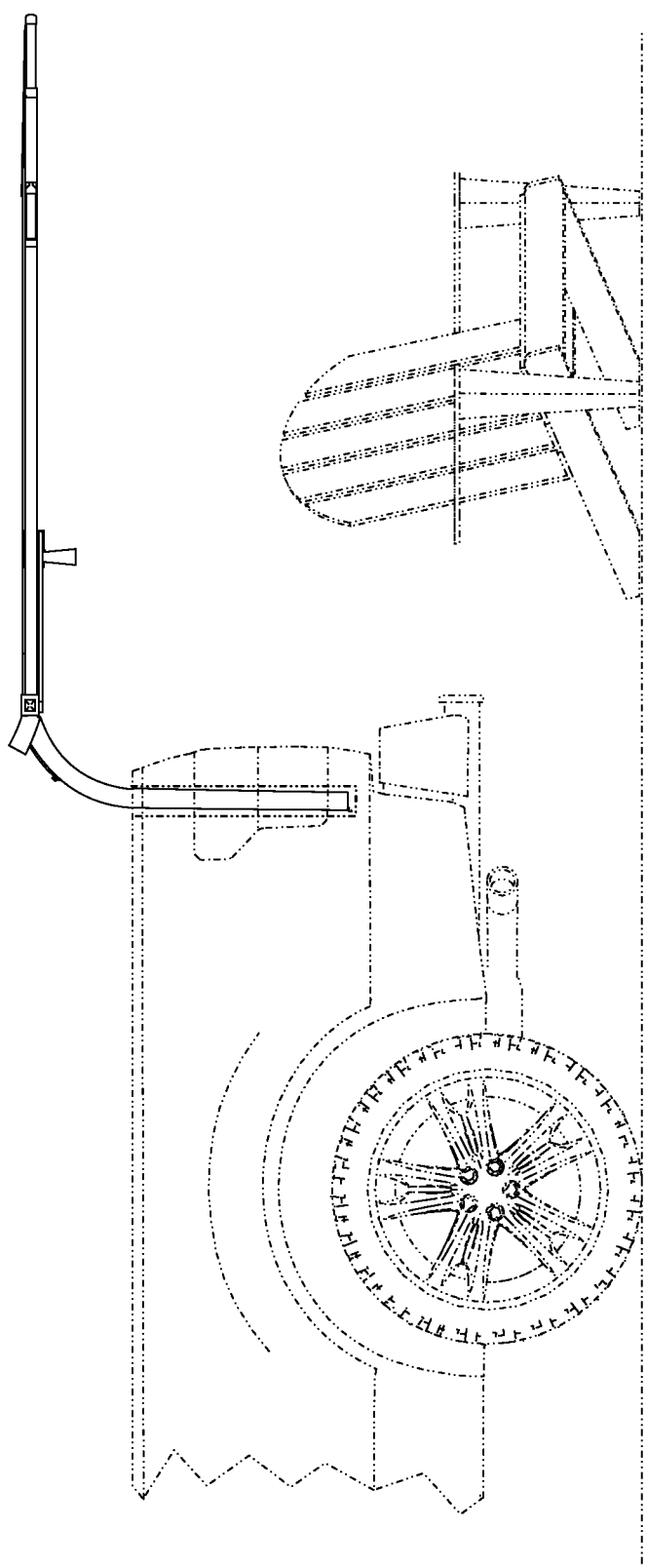
Figure 12:
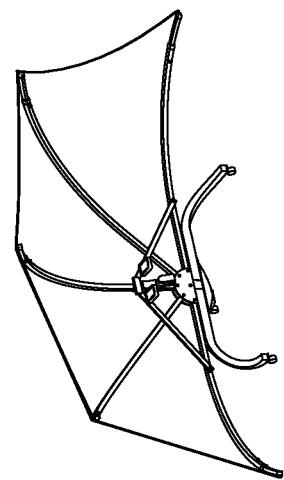
FIG. 12 illustrates a perspective view of an equivalent variation of an arthritic-aiding-elevator-lock lever and arthritic-aiding elevator-boom hand paddles.
Figure 13:
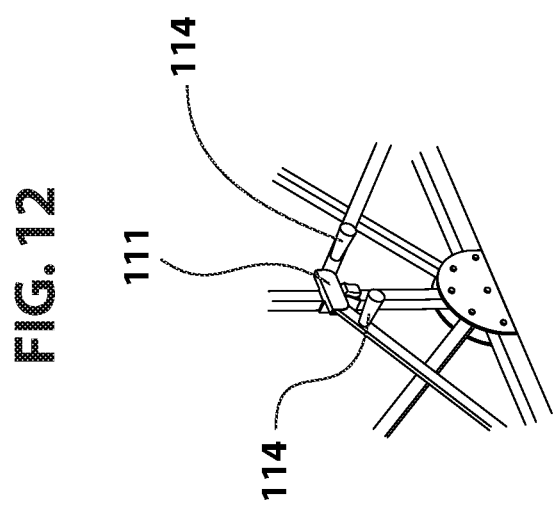
FIG. 13, FIG. 14, FIG. 15, FIG. 16, and FIG. 17 illustrate perspective views of equivalent variations of the five-device-in-one arthritic-aiding reversible sun-blocking projector-screening event-sheltering vehicle-awning cupola.
Figure 14:
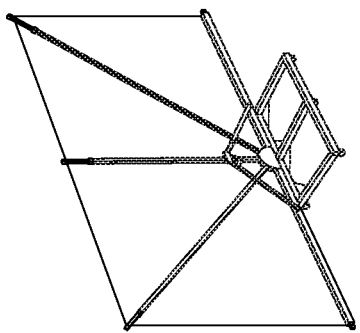
Figure 15:
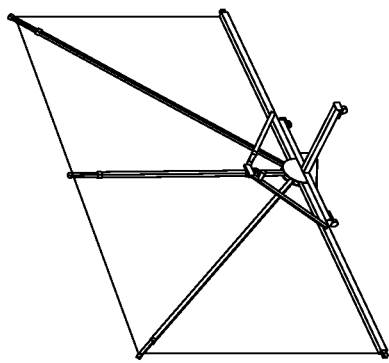
Figure 17:
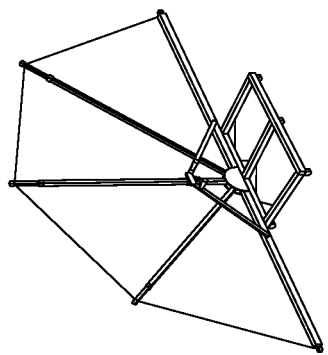
Figure 16:
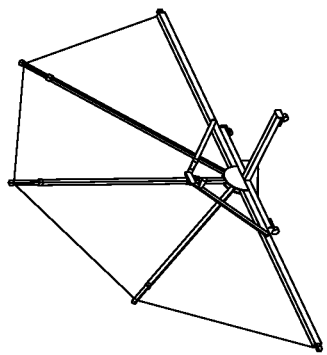

Any component of the five-device-in-one arthritic-aiding reversible sun-blocking projector-screening event-sheltering vehicle-awning cupola can have any shape and size. Any component of the five-device-in-one arthritic-aiding reversible sun-blocking projector-screening event-sheltering vehicle-awning cupola can be made of any material(s). FIG. 11A illustrates a front view of an equivalent adjustable-utilitarian-volume double-sided-function dome 121 having a star shape, and an equivalent multi-unit-attaching utility-port trailer-hitch and tailgate-slot insertable and reversible tripod system 125. FIG. 11B, FIG. 11C, FIG. 11D, FIG. 11E, FIG. 11F, and FIG. 11G illustrate multiple views of an equivalent variation of the adjustable-utilitarian-volume double-sided-function dome 121 having a star shape, and configured functioning as a truck-bed cover, a truck-side awning, a privacy shield, a wind and weather shield, a dual truck-side awning, and a sunshade, and are depicted mounted to a hitch, a utility port, and a tailgate slot, respectively. FIG. 12 illustrates a perspective view of an equivalent variation of an arthritic-aiding-elevator-lock lever 111 and arthritic-aiding elevator-boom hand paddles 114. FIG. 13, FIG. 14, FIG. 15, FIG. 16, and FIG. 17 illustrate perspective views of equivalent variations of the five-device-in-one arthritic-aiding reversible sun-blocking projector-screening event-sheltering vehicle-awning cupola.

Major Advantages of the Invention

The new invention substantially departs from the conventional concepts and designs of the prior art. In doing so, the new invention provides (a or an) five-device-in-one arthritic-aiding reversible sun-blocking projector-screening event-sheltering vehicle-awning cupola, having many unique and significant features, functions, and advantages, which overcome all the disadvantages of the prior art, as follows:

1) It is an object of the new invention to provide (a or an) five-device-in-one arthritic-aiding reversible sun-blocking projector-screening event-sheltering vehicle-awning cupola, having
arched copula splines 108.
Therefore, the five-device-in-one arthritic-aiding reversible sun-blocking projector-screening event-sheltering vehicle-awning cupola is (or are each):
a) Capable of supporting adjustable-utilitarian-volume double-sided-function dome 121;
in the direction (or directions) of arrows 137*a* and 137*b*
(see FIG. 6A, FIG. 6B, and FIG. 6C);
b) Capable of tensioning adjustable-utilitarian-volume double-sided-function dome 121
in the direction (or directions) of arrows 137*a* and 137*b*
(see FIG. 6A and FIG. 6C);
c) Capable of deploying adjustable-utilitarian-volume double-sided-function dome 121
in the direction (or directions) of arrows 137*a* and 137*b*
(see FIG. 6A, FIG. 6B, and FIG. 6C);
d) Capable of retracting adjustable-utilitarian-volume double-sided-function dome 121
in the direction (or directions) of arrows 137*a* and 137*b*
(see FIG. 6A, FIG. 6B, and FIG. 6C); and
e) Capable of connecting and coupling multiple five-device-in-one arthritic-aiding reversible sun-blocking projector-screening event-sheltering vehicle-awning cupolas together
in the direction (or directions) of arrows 137*a*, 137*b*, 137*c*, 137*d*, and 138
(see FIG. 6D, FIG. 6E, FIG. 6F, and FIG. 6G).

2) It is another object of the new invention to provide (a or an) five-device-in-one arthritic-aiding reversible sun-blocking projector-screening event-sheltering vehicle-awning cupola, having
arthritic-aiding automatic-sliding elevator lock 110.
Therefore, the five-device-in-one arthritic-aiding reversible sun-blocking projector-screening event-sheltering vehicle-awning cupola is (or are each):
a) Capable of automatically deploying arthritic-aiding cupola-spline-elevating and tensioning system 109, in conjunction with elevator booms 113, and arched cupola splines 108
in the direction (or directions) of arrows 140, 144*a*, 144*b*, 144*c*, 144*d* and 145
(see FIG. 7A, FIG. 7B, FIG. 7C, FIG. 7D, FIG. 7E, FIG. 7F, FIG. 7G, FIG. 7H, and FIG. 7J);
b) Capable of retracting arthritic-aiding cupola-spline-elevating and tensioning system 109 in conjunction with elevator booms 113 and arched cupola splines 108
in the direction (or directions) of arrows 144*a*, 144*b*, 144*c*, 144*d*, 145, and 146
(see FIG. 7A, FIG. 7B, FIG. 7C, FIG. 7D, FIG. 7E, FIG. 7F, FIG. 7G, FIG. 7H, FIG. 7I, and FIG. 7J);
c) Capable of assisting elevator booms 113
to provide tension to arthritic-aiding cupola-spline-elevating and tensioning system 109
in the direction (or directions) of arrows 144*a*, 144*b*, 144*c*, 144*d*, 145, and 146
(see FIG. 7A, FIG. 7B, FIG. 7D, FIG. 7E, FIG. 7F, FIG. 7G, and FIG. 7J); and
d) Capable of sliding vertically on respective arched cupola splines 108,
(see FIG. 7A, FIG. 7B, FIG. 7C, FIG. 7D, and FIG. 7J).

3) It is still another object of the new invention to provide (a or an) five-device-in-one arthritic-aiding reversible sun-blocking projector-screening event-sheltering vehicle-awning cupola, having
arthritic-aiding-elevator-lock lever 111.

Therefore, the five-device-in-one arthritic-aiding reversible sun-blocking projector-screening event-sheltering vehicle-awning cupola is (or are each):
  a) Capable of engaging arthritic-aiding automatic-sliding elevator lock 110 on arched cupola splines 108 using an arthritic's hand 142
   in the direction (or directions) of arrows 140, 141, 143, 144a, 144b, 144c, 144d, and 145
   (see FIG. 7A, FIG. 7B, FIG. 7C, FIG. 7D, and FIG. 7E);
  b) Capable of assisting arthritic-aiding automatic-sliding elevator lock 110 to lock elevator booms 113 to a predetermined vertical position on respective arched cupola splines 108
   in the direction (or directions) of arrows 144a, 144b, 144c, 144d, 145, and 146
   (see FIG. 7A, FIG. 7B, FIG. 7D, FIG. 7E, FIG. 7F, FIG. 7G, and FIG. 7J);
  c) Capable of quickly and easily repositioning arthritic-aiding automatic-sliding elevator lock 110 on arched cupola splines 108 with an arthritic's hand 142
   in the direction (or directions) of arrows 140, 141, 144a, 144b, 144c, and 144d
   (see FIG. 7B, FIG. 7D, FIG. 7E, FIG. 7F, FIG. 7G, and FIG. 7J); and
  d) Capable of providing large surface area handles
   to aid those arthritic's with limited hand 142 mobility due to an arthritic physical condition
   in the direction (or directions) of arrows 140, 141, 143, 144a, 144b, 144c, 144d and 145
   (see FIG. 7A, FIG. 7B, FIG. 7C, FIG. 7D, and FIG. 7E).
4) It is yet still another object of the new invention to provide (a or an) five-device-in-one arthritic-aiding reversible sun-blocking projector-screening event-sheltering vehicle-awning cupola, having
 arthritic-aiding elevator-boom hand paddles 114.
 Therefore, the five-device-in-one arthritic-aiding reversible sun-blocking projector-screening event-sheltering vehicle-awning cupola is (or are each):
  a) Capable of allowing an arthritic hand
   to securely and effectively grip arthritic-aiding cupola-spline-elevating and tensioning system 109
    in the direction (or directions) of arrow 146
    (see FIG. 7I and FIG. 7J);
  b) Capable of allowing persons with arthritic hands to deploy the arthritic-aiding cupola-spline-elevating and tensioning system 109 easier, by sliding the arthritic-aiding automatic-sliding elevator lock 110 upwards and downwards on respective arched cupola splines 108
   in the direction (or directions) of arrow 146
   (see FIG. 7I and FIG. 7J);
  c) Capable of allowing persons with arthritic hands to slide the arthritic-aiding automatic-sliding elevator lock 110 upwards and downwards on respective arched cupola splines 108
   in the direction (or directions) of arrows 144a, 144b, and 146
   (see FIG. 7F, FIG. 7I, and FIG. 7J);
  d) Capable of accommodating arthritic hands
   to grip arthritic-aiding cupola-spline-elevating and tensioning system 109 in two points of contact, to the left and right sides of center of arthritic-aiding automatic-sliding elevator lock 110 thereby equalizing side-to-side pressure while pushing upwards and downwards
   in the direction (or directions) of arrows 144a, 144b, and 146
   (see FIG. 7F, FIG. 7I, and FIG. 7J);
  e) Capable of reducing effort for a person with arthritic hands by providing two, rather than one, arthritic-aiding elevator-boom hand paddles 114
   to assist while operating arthritic-aiding automatic-sliding elevator lock 110
    in the direction (or directions) of arrows 144a, 144b, and 146
    (see FIG. 7F, FIG. 7I, and FIG. 7J);
  f) Capable of reducing pain for those with arthritic-hand conditions by providing large paddle surface areas
   to distribute the pressure or their hands over the broad flat surfaces of arthritic-aiding elevator-boom hand paddles 114, thereby minimizing pressure to concentrated areas of their hands
    in the direction (or directions) of arrows 144a, 144b, and 146
    (see FIG. 7F, FIG. 7I, and FIG. 7J);
  g) Capable of aiding those with arthritic-hand conditions by providing ridges at the front and back of arthritic-aiding elevator-boom hand paddles 114
   to aid by helping to easily position and maintain their hands in the center of arthritic-aiding elevator-boom hand paddles 114, without slipping off, as prior art would naturally promote
    in the direction (or directions) of arrows 144a, 144b, and 146
    (see FIG. 7F, FIG. 7I, and FIG. 7J); and
  h) Capable of aiding those with arthritic-hand conditions by providing ridges at the top and bottom of arthritic-aiding elevator-boom hand paddles 114
   to aid those with arthritic hand conditions by helping them easily position and maintain their hands in the center of arthritic-aiding elevator-boom hand paddles 114, while pushing upwards or downwards
    in the direction (or directions) of arrows 144a, 144b, and 146
    (see FIG. 7F, FIG. 7I, and FIG. 7J).
5) It is a further object of the new invention to provide (a or an) five-device-in-one arthritic-aiding reversible sun-blocking projector-screening event-sheltering vehicle-awning cupola, having
 adjustable-utilitarian-volume double-sided-function dome 121.
 Therefore, the five-device-in-one arthritic-aiding reversible sun-blocking projector-screening event-sheltering vehicle-awning cupola is (or are each):
  a) Capable of functioning as a weather shield
   to deflect the wind or to block radiation from the sun
   (see FIG. 9A, FIG. 9C, FIG. 9E, FIG. 10D, and FIG. 10F);
  b) Capable of functioning as a freestanding privacy shield when mounted to a trailer hitch 150
   to visually block the view into private areas, such as courtyards, apartment patios, apartment balconies, and back yards
   (see FIG. 10A, FIG. 10B, and FIG. 10C);
  c) Capable of functioning as a domed truck-bed cover when mounted in a utility port 147 to provide greater volume in the height of the truck bed, allowing for additional items to be protected
(see FIG. 9A, FIG. 9C, FIG. 9E, FIG. 10D, and FIG. 10F);
d) Capable of functioning as a domed truck-side tent when mounted in a utility port 147
to provide shelter to persons camping in the truck bed
(see FIG. 6F and FIG. 6G);
e) Capable of functioning as a curved projection screen
to view projected-light entertainment thereon, such as a movie, to thereby provide a greater user experience
(see FIG. 8, 10A, 10B, and FIG. 10C);
f) Capable of functioning as a truck-side awning when mounted to a utility port 147
to provide protection from the sun's radiation and rain during sports games, picnicking, and camping
(see FIG. 9C, FIG. 9D, FIG. 9E, and FIG. 9F);
g) Capable of functioning as a tailgate awning when mounted to a utility port 147
to provide protection from the sun's radiation and rain, for picnic food being served, and a cover for a picnic table
(see FIG. 10F, and FIG. 10G);
h) Capable of functioning as an awning when mounted to a back of a truck
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G);
i) Capable of functioning as an awning when mounted to a tailgate-slot 152
to provide protection from the sun's radiation and rain to persons behind the truck, such as those watching sports games, or relaxing in a chair 139
(see FIG. 10D and FIG. 10E);
j) Capable of functioning as an awning when mounted to a trailer hitch 150
to provide protection from the sun's radiation behind the truck, such as for food coolers, dog kennels, and persons sleeping in a sleeping bag on the ground
(see FIG. 10B and FIG. 10C);
k) Capable of attaching to tension-dome sleeves 124, respectively, and screwing to arched cupola-spline-extension prongs 103, respectively,
l) Capable of providing a flexible, limited-stretch medium
to allow arthritic-aiding multi-function multi-unit-attaching cupola-spline system 101 to thereby deploy and retract
in the direction (or directions) of arrows 136*a* and 136*b*
(see FIG. 1B, FIG. 1C, FIG. 6A, FIG. 6B, FIG. 7F, and FIG. 8); and
m) Capable of providing a flexible, limited-stretch medium
to become a tight and tensioned medium when arthritic-aiding cupola-spline-elevating and tensioning system 109 is deployed
in the direction (or directions) of arrows 136*a* and 136*b*
(see FIG. 1B, FIG. 6A, FIG. 6B, FIG. 7F, and FIG. 8E).

6) It is an even further object of the new invention to provide (a or an) five-device-in-one arthritic-aiding reversible sun-blocking projector-screening event-sheltering vehicle-awning cupola, having
multi-unit-attachable utility-port-insertable reversible arch foot 126.
Therefore, the five-device-in-one arthritic-aiding reversible sun-blocking projector-screening event-sheltering vehicle-awning cupola is (or are each):
a) Capable of attaching to utility port 147 of a pickup truck bed to function as a weather shield
to deflect the wind or to block radiation from the sun
(see FIG. 9A, FIG. 9C, FIG. 9E, FIG. 10D, and FIG. 10F);
b) Capable of attaching to a utility port 147 of a pickup truck bed to function as a privacy shield
to visually block the view into private areas, such as courtyards, apartment patios, apartment balconies, and back yards
(see FIG. 10A, FIG. 10B, and FIG. 10C);
c) Capable of attaching to a utility port 147 of a pickup truck bed to function as a domed truck-bed cover
to provide greater volume in the height of the truck bed, allowing for additional items to be protected
(see FIG. 9A, FIG. 9C, FIG. 9E, FIG. 10D, and FIG. 10F);
d) Capable of attaching to a utility port 147 of a pickup truck bed to function as a domed truck-side tent, mounted in utility port 147
to provide shelter to persons camping in the truck bed
(see FIG. 9A, FIG. 9C, FIG. 9E, FIG. 10D, and FIG. 10F);
e) Capable of attaching to a utility port 147 of a pickup truck bed to function as a curved projection screen
to view projected-light entertainment thereon, such as a movie, to thereby provide a greater user experience
(see FIG. 8, 10A, 10B, and FIG. 10C);
f) Capable of attaching to a utility port 147 of a pickup truck bed to function as a truck-side awning
to provide protection from the sun's radiation and rain during sports games, picnicking, and camping
(see FIG. 9C, FIG. 9D, FIG. 9E, and FIG. 9F);
g) Capable of attaching to a utility port 147 of a pickup truck bed to function as a tailgate awning
to provide protection from the sun's radiation and rain, for picnic food being served, and a cover for a picnic table
(see FIG. 10F, and FIG. 10G);
h) Capable of attaching to a utility port 147 of a pickup truck bed to function as an awning
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G);
i) Capable of attaching to a tailgate-slot 152 of a pickup truck to function as an awning
to provide protection from the sun's radiation and rain to persons behind the truck, such as those watching sports games, or relaxing in a chair 139
(see FIG. 10D and FIG. 10E); and
j) Capable of attaching to a trailer hitch 150 of a pickup truck to function as an awning to provide protection from the sun's radiation behind the truck, such as for food coolers, dog kennels, and persons sleeping in a sleeping bag on the ground
(see FIG. 10B and FIG. 10C);
k) Capable of attaching to, detaching from, or reversing onto multi-unit-attaching utility-port trailer-hitch and tailgate-slot insertable and reversible tripod system 125;
l) Capable of supporting arthritic-aiding multi-function multi-unit-attaching cupola-spline system 101.
7) It is still an even further object of the new invention to provide (a or an) five-device-in-one arthritic-aiding reversible sun-blocking projector-screening event-sheltering vehicle-awning cupola, having
multi-unit-attachable utility-port-insertable reversible dual-arch feet 127a and 127b Therefore, the five-device-in-one arthritic-aiding reversible sun-blocking projector-screening event-sheltering vehicle-awning cupola is (or are each):
a) Capable of attaching to a utility port 147 of a pickup truck bed to function as
a weather
shield
to deflect the wind or to block radiation from the sun
(see FIG. 9A, FIG. 9C, FIG. 9E, FIG. 10D, and FIG. 10F);
b) Capable of allowing the five-device-in-one arthritic-aiding reversible sun-blocking projector-screening event-sheltering vehicle-awning cupola to act as a privacy shield, as a freestanding device or when mounted to trailer hitch 150
to visually block the view into private areas, such as courtyards, apartment patios, apartment balconies, and back yards
(see FIG. 10A, FIG. 10B, and FIG. 10C);
c) Capable of attaching to a utility port 147 of a pickup truck bed to function as a domed truck-bed cover
to provide greater volume in the height of the truck bed, allowing for additional items to be protected
(see FIG. 9A, FIG. 9C, FIG. 9E, FIG. 10D, and FIG. 10F);
d) Capable of attaching to a utility port 147 of a pickup truck bed to function as a domed truck-side tent, mounted in utility port 147
to provide shelter to persons camping in the truck bed
(see FIG. 9A, FIG. 9C, FIG. 9E, FIG. 10D, and FIG. 10F);
e) Capable of attaching to a utility port 147 of a pickup truck bed to function as a curved projection screen
to view projected-light entertainment thereon, such as a movie, to thereby provide a greater user experience
(see FIG. 8, 10A, 10B, and FIG. 10C);
f) Capable of attaching to a utility port 147 of a pickup truck bed to function as a truck-side awning
to provide protection from the sun's radiation and rain during sports games, picnicking, and camping
(see FIG. 9C, FIG. 9D, FIG. 9E, and FIG. 9F);
g) Capable of attaching to a utility port 147 of a pickup truck bed to function as a tailgate awning
to provide protection from the sun's radiation and rain, for picnic food being served, and a cover for a picnic table
(see FIG. 10F, and FIG. 10G);

h) Capable of attaching to a utility port 147 of a pickup truck bed to function as an awning
to provide protection from the sun's radiation and rain to persons, such as those watching sports games, or relaxing in a chair 139
(see FIG. 10B, FIG. 10C, FIG. 10D, FIG. 10E, FIG. 10F, and FIG. 10G); and
i) Capable of attaching to a tailgate-slot 152 of a pickup truck to function as an awning
to provide protection from the sun's radiation and rain to persons behind a truck 148, such as those watching sports games, or relaxing in a chair 139, for food coolers, dog kennels, and persons camping in a sleeping bag on the ground
(see FIG. 10D and FIG. 10E).
8) It is yet still an even further object of the new invention to provide (a or an) five-device-in-one arthritic-aiding reversible sun-blocking projector-screening event-sheltering vehicle-awning cupola, having
detachable wheels 133.
Therefore, the five-device-in-one arthritic-aiding reversible sun-blocking projector-screening event-sheltering vehicle-awning cupola is (or are each):
a) Capable of allowing arthritic-aiding multi-function multi-unit-attaching cupola-spline system 101 to roll
to provide means to easily reposition the arthritic-hand-aiding reversible sun-blocking pet-protecting dome-shelter awning and truck-bed cupola for storage
(see FIG. 7G, FIG. 7H, FIG. 8, and FIG. 10A); and
b) Capable of easily attaching and detaching detachable wheels 133 to or from arthritic-aiding multi-function multi-unit-attaching cupola-spline system 101
to allow multi-unit-attachable utility-port-insertable reversible arch foot 126 or multi-unit-attachable utility-port-insertable reversible dual-arch feet 127a and 127b to be inserted into a utility port 147, a tailgate-slot 152, or a hitch 150
(see FIG. 10B, FIG. 10C, FIG. 10D, FIG. 10E, FIG. 10F, and FIG. 10G).

What is claimed is:

1. A five-device-in-one arthritic-aiding reversible sun-blocking projector-screening event-sheltering vehicle-awning cupola comprising:
a plurality of rubber end caps;
a plurality of arched cupola-spline-extension prongs;
a plurality of threaded cupola-attachment-screw holes;
a plurality of arthritic-aiding spline-extension spring-loaded buttons;
a plurality of spline-extension locking holes;
a plurality of spline step-down spacers;
a plurality of arched cupola splines;
an arthritic-aiding automatic-sliding elevator lock;
an arthritic-aiding-elevator-lock lever
having a handle surface area;
a plurality of elevator-slide-lock cross-pins and cross-pin holes;
a plurality of elevator booms;
a plurality of arthritic-aiding elevator-boom hand paddles
having a paddle surface area, front paddle ridges, back paddle ridges, top paddle ridges, and bottom paddle ridges;
a plurality of elevator-boom bottom screws and screw holes;
a cupola-spline base rotational and retraction hub;
a plurality of cupola-spline base-rotational-hub screws and holes;

a plurality of tripod-attaching square-head screws;
a plurality of tripod-attaching square holes;
an adjustable-utilitarian-volume double-sided-function dome;
a shield-tensioning mounting grommet;
a plurality of shield-tensioning-mounting-grommet screws;
a plurality of tension-dome sleeves;
a multi-unit-attachable utility-port-insertable reversible arch foot;
a plurality of multi-unit-attachable utility-port-insertable reversible dual-arch feet;
a triangular arch-foot-stabilizing and reversing plate;
a plurality of arch-foot wing-screws;
a plurality of arch-foot screw holes;
a plurality of dual-arch-feet-attaching wing-nuts; and
a plurality of dual-arch-feet-wing-nut square holes,
wherein:
said rubber end caps
respectively are friction fit to said arched cupola-spline-extension prongs,
said arched cupola-spline-extension prongs
respectively and slidably are inserted into said arched cupola splines,
said threaded cupola-attachment-screw holes
respectively are drilled into said arched cupola-spline-extension prongs,
said arthritic-aiding spline-extension spring-loaded buttons
respectively are secured to said arched cupola splines, and are springably and detachably inserted into said spline-extension locking holes,
said spline-extension locking holes
respectively are drilled into said arched cupola splines,
said spline step-down spacers
respectively are friction fit to said arched cupola splines,
said arched cupola splines
respectively and swingably are screwed to said cupola-spline base rotational and retraction hub
for supporting said adjustable-utilitarian-volume double-sided-function dome,
for tensioning said adjustable-utilitarian-volume double-sided-function dome,
for deploying said adjustable-utilitarian-volume double-sided-function dome,
for retracting said adjustable-utilitarian-volume double-sided-function dome, and
for connecting and coupling multiple said five-device-in-one arthritic-aiding reversible sun-blocking projector-screening event-sheltering vehicle-awning cupolas together,
said arthritic-aiding automatic-sliding elevator lock
is slidably attached to said arched cupola spline
for automatically deploying said five-device-in-one arthritic-aiding reversible sun-blocking projector-screening event-sheltering vehicle-awning cupola, in conjunction with said elevator booms, and said arched cupola splines,
for retracting said five-device-in-one arthritic-aiding reversible sun-blocking projector-screening event-sheltering vehicle-awning cupola in conjunction with said elevator booms and said arched cupola splines, for assisting said elevator booms
to provide tension to said five-device-in-one arthritic-aiding reversible sun-blocking projector-screening event-sheltering vehicle-awning cupola, and
for sliding vertically on respective said arched cupola splines,
said arthritic-aiding-elevator-lock lever
is swingably attached to said arthritic-aiding automatic-sliding elevator lock
for engaging arthritic-aiding automatic-sliding elevator lock on arched cupola splines using an arthritic's hand,
for assisting said arthritic-aiding automatic-sliding elevator lock
to lock said elevator booms to a predetermined vertical position on respective said arched cupola splines,
for quickly and easily repositioning said arthritic-aiding automatic-sliding elevator lock on said arched cupola splines with a hand, and
for providing large said handle surface area
to aid those arthritics with limited hand mobility due to an arthritic physical condition,
said elevator-slide-lock cross-pins cross-pin holes
respectively and screwedly are inserted through, and drilled into said arthritic-aiding automatic-sliding elevator lock,
said elevator booms
respectively and rotatably are screwed to said arched cupola splines and said arthritic-aiding automatic-sliding elevator lock,
said arthritic-aiding elevator-boom hand paddles
respectively and rotatably are attached to said elevator booms
for allowing an arthritic hand
to securely and effectively grip said arthritic-aiding elevator-boom hand paddles,
for allowing persons with arthritic hands to deploy said five-device-in-one arthritic-aiding reversible sun-blocking projector-screening event-sheltering vehicle-awning cupola easier, by sliding said arthritic-aiding automatic-sliding elevator lock upward and downward on said arched cupola splines,
for allowing persons with arthritic hands to slide said arthritic-aiding automatic-sliding elevator lock upward and downward on said arched cupola splines,
for accommodating arthritic hands
to grip said arthritic-aiding elevator-boom hand paddles in two points of contact, to the left and right sides of center of said arthritic-aiding automatic-sliding elevator lock thereby equalizing side-to-side pressure while pushing upward and downward,
for reducing effort for a person with arthritic hands by providing two, rather than one, said arthritic-aiding elevator-boom hand paddles
to assist while operating said arthritic-aiding automatic-sliding elevator lock,
for reducing pain for those with arthritic hand conditions by providing large said paddle surface areas
to distribute the pressure or their hands over the broad flat surfaces of said arthritic-aiding elevator-boom hand paddles, thereby minimizing pressure to concentrated areas of their hands, for aiding those with arthritic hand conditions by providing said front paddle ridges and said back paddle ridges of said arthritic-aiding elevator-boom hand paddles
to aid by helping to easily position and maintain their hands in the center of said arthritic-aiding elevator-boom hand paddles, without slipping off, as prior art would naturally promote, and
for aiding those with arthritic hand conditions by providing said top paddle ridges and said bottom paddle ridges of said arthritic-aiding elevator-boom hand paddles
to aid those with arthritic hand conditions by helping them easily position and maintain their hands in the center of said arthritic-aiding elevator-boom hand paddles, while pushing upwards or downwards,
said elevator-boom bottom screws
respectively are inserted through said elevator-boom bottom screw holes,
said elevator-boom bottom screw holes
respectively are drilled into said elevator booms,
said cupola-spline base rotational and retraction hub
is screwedly attached to said multi-unit-attachable utility-port-insertable reversible dual-arch feet,
said cupola-spline base-rotational-hub screws and holes
respectively are inserted through and drilled into said cupola-spline base rotational and retraction hub,
said tripod-attaching square-head screws
respectively are inserted through said tripod-attaching square holes and said dual-arch-feet-wing-nut square holes,
said tripod-attaching square holes
respectively are punched through the bottom of said cupola-spline base rotational and retraction hub, respectively,
said adjustable-utilitarian-volume double-sided-function dome
is attached to respective said tension-dome sleeves and screwed to said arched cupola-spline-extension prongs
for functioning as a weather shield
to deflect the wind or to block radiation from the sun,
for functioning as a freestanding privacy shield when mounted to a trailer hitch
to visually block the view into private areas, such as courtyards, apartment patios, apartment balconies, and back yards,
for functioning as a domed truck-bed cover when mounted into a utility port
to provide greater volume in the height of the truck bed, allowing for additional items to be protected,
for functioning as a domed truck-side tent when mounted into a utility port
to provide shelter to persons camping in the truck bed,
for functioning as a curved projection screen
to view projected-light entertainment thereon, such as a movie, to thereby provide a greater user experience,
for functioning as a truck-side awning when mounted into a utility port
to provide protection from the sun's radiation and rain during sports games, picnicking, and camping,
for functioning as a tailgate awning when mounted into a utility port
to provide protection from the sun's radiation and rain, for picnic food being served, and a cover for a picnic table,
for functioning as an awning when mounted to a back of a truck
to provide protection from the sun's radiation and rain to persons, such as those watching sports games, or relaxing in a chair,
for functioning as an awning when mounted to a tailgate-slot
to provide protection from the sun's radiation and rain to persons behind the truck, such as those watching sports games, or relaxing in a chair,
for functioning as an awning when mounted to a trailer hitch
to provide protection from the sun's radiation behind the truck, such as for food coolers, dog kennels, and persons sleeping in a sleeping bag on the ground,
for attaching to said tension-dome sleeves, respectively, and screwing to said arched cupola-spline-extension prongs, respectively,
for providing a flexible, limited-stretch medium
to allow said five-device-in-one arthritic-aiding reversible sun-blocking projector-screening event-sheltering vehicle-awning cupola to thereby deploy and retract, and
for providing a flexible, limited-stretch medium
to become a tight and tensioned medium when said five-device-in-one arthritic-aiding reversible sun-blocking projector-screening event-sheltering vehicle-awning cupola is deployed,
said shield-tensioning mounting grommets
respectively are sewn to said adjustable-utilitarian-volume double-sided-function dome,
said shield-tensioning-mounting-grommet screws
respectively are inserted through said shield-tensioning mounting grommets and to said threaded cupola-attachment-screw holes, respectively,
said tension-dome sleeves
respectively are slide over said arched cupola splines,
said multi-unit-attachable utility-port-insertable reversible arch foot
is detachably screwed to said triangular arch-foot-stabilizing and reversing plate
for attaching to a utility port of a pickup truck bed to function as a weather shield
to deflect the wind or to block radiation from the sun,
for attaching to a utility port of a pickup truck bed to function as a privacy shield
to visually block the view into private areas, such as courtyards, apartment patios, apartment balconies, and back yards,
for attaching to a utility port of a pickup truck bed to function as a domed truck-bed cover
to provide greater volume in the height of the truck bed, allowing for additional items to be protected,
for attaching to a utility port of a pickup truck bed to function as a domed truck-side tent, mounted in utility port
to provide shelter to persons camping in the truck bed, for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table,
for attaching to a utility port of a pickup truck bed to
function as an awning
to provide protection from the sun's radiation and
rain to persons, such as those watching sports
games, or relaxing in a chair,
for attaching to a tailgate-slot of a pickup truck to
function as an awning
to provide protection from the sun's radiation and
rain to persons behind the truck, such as those
watching sports games, or relaxing in a chair,
for attaching to a trailer hitch of a pickup truck to
function as an awning
to provide protection from the sun's radiation
behind the truck, such as for food coolers, dog
kennels, and persons sleeping in a sleeping bag
on the ground,
for attaching to, detaching from, or reversing onto
said five-device-in-one arthritic-aiding reversible
sun-blocking projector-screening event-sheltering
vehicle-awning cupola, and
for supporting said five-device-in-one arthritic-aiding reversible sun-blocking projector-screening
event-sheltering vehicle-awning cupola,
said multi-unit-attachable utility-port-insertable reversible dual-arch feet
respectively are detachably screwed to said cupola-spline base rotational and retraction hub
for attaching to a utility port of a pickup truck bed to
function as a weather shield
to deflect the wind or to block radiation from the
sun,
for allowing said five-device-in-one arthritic-aiding
reversible sun-blocking projector-screening
event-sheltering vehicle-awning cupola to act as a
privacy shield, as a freestanding device or when
mounted to trailer hitch
to visually block the view into private areas, such
as courtyards,
apartment patios, apartment balconies, and back
yards,
for attaching to a utility port of a pickup truck bed to
function as a domed truck-bed cover
to provide greater volume in the height of the
truck bed, allowing for additional items to be
protected,
for attaching to a utility port of a pickup truck bed to
function as a domed truck-side tent,
to provide shelter to persons camping in the truck
bed,
for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table,
for attaching to a utility port of a pickup truck bed to
function as an awning
to provide protection from the sun's radiation and
rain to persons, such as those watching sports
games, or relaxing in a chair, and
for attaching to a tailgate-slot of a pickup truck to
function as an awning
to provide protection from the sun's radiation and
rain to persons behind a truck, such as those
watching sports games, or relaxing in a chair,
for food coolers, dog kennels, and persons
camping in a sleeping bag on the ground,
said triangular arch-foot-stabilizing and reversing plate
is detachably screwed to said multi-unit-attachable
utility-port-insertable reversible dual-arch feet and
said multi-unit-attachable utility-port-insertable
reversible arch foot,
said arch-foot wing-screws
respectively are screwed into said multi-unit-attachable
utility-port-insertable reversible arch foot,
said arch-foot screw holes
respectively are drilled into said multi-unit-attachable
utility-port-insertable reversible arch foot,
said dual-arch-feet-attaching wing-nuts
respectively are screwed onto said cupola-spline base-rotational-hub screws,
said dual-arch-feet-wing-nut square holes
respectively are punched into said multi-unit-attachable
utility-port-insertable reversible dual-arch feet.

2. The five-device-in-one arthritic-aiding reversible sun-blocking projector-screening event-sheltering vehicle-awning cupola of claim 1,
further comprising:
a plurality of detachable wheels; and
a plurality of detachable-wheel posts,
wherein:
said detachable wheels
respectively are attached to said detachable-wheel
posts
for allowing said arthritic-hand-aiding reversible
sun-blocking pet-protecting dome-shelter
awning and truck-bed cupola to roll
to provide means to easily reposition said
arthritic-hand-aiding reversible sun-blocking
pet-protecting dome-shelter awning and truck-bed cupola for storage, and
for easily attaching and detaching said detachable
wheels to or from said arthritic-hand-aiding
reversible sun-blocking pet-protecting dome-shelter awning and truck-bed cupola
to allow said multi-unit-attachable utility-port-insertable reversible arch foot or said multi-unit-attachable utility-port-insertable reversible dual-arch feet to be inserted into a utility port or a tailgate-slot or a hitch, said detachable-wheel posts
respectively and detachably are screwed into said multi-unit-attachable utility-port-insertable reversible arch foot and said multi-unit-attachable utility-port-insertable reversible dual-arch feet
for detaching and attaching said detachable wheels to said multi-unit-attachable utility-port-insertable reversible arch foot and said multi-unit-attachable utility-port-insertable reversible dual-arch feet.

3. The five-device-in-one arthritic-aiding reversible sun-blocking projector-screening event-sheltering vehicle-awning cupola of claim 1,
wherein
said arthritic-aiding-elevator-lock lever
is made of plastic material.

4. The five-device-in-one arthritic-aiding reversible sun-blocking projector-screening event-sheltering vehicle-awning cupola of claim 1,
wherein
said multi-unit-attachable utility-port-insertable reversible arch foot
has a curved rectangular-tube shape.

5. The five-device-in-one arthritic-aiding reversible sun-blocking projector-screening event-sheltering vehicle-awning cupola of claim 1,
wherein
said multi-unit-attachable utility-port-insertable reversible dual-arch feet
each have a curved rectangular-tube shape.

6. The five-device-in-one arthritic-aiding reversible sun-blocking projector-screening event-sheltering vehicle-awning cupola of claim 1,
wherein
said arched cupola splines
each have a curved tube shape.

7. The five-device-in-one arthritic-aiding reversible sun-blocking projector-screening event-sheltering vehicle-awning cupola of claim 1,
wherein
said arched cupola splines
each are made of metallic material.

8. The five-device-in-one arthritic-aiding reversible sun-blocking projector-screening event-sheltering vehicle-awning cupola of claim 1,
wherein
said adjustable-utilitarian-volume double-sided-function dome
has a concaved crown shape.

9. The five-device-in-one arthritic-aiding reversible sun-blocking projector-screening event-sheltering vehicle-awning cupola of claim 1,
wherein
said adjustable-utilitarian-volume double-sided-function dome
is made of nylon fabric, the like, or the equivalent material.

10. A five-device-in-one arthritic-aiding reversible sun-blocking vehicle-awning cupola comprising:
a plurality of rubber end caps;
a plurality of arched spline-extension prongs;
a plurality of threaded attachment-screw holes;
a plurality of spline-extension spring-loaded buttons;
a plurality of spline-extension locking holes;
a plurality of spline step-down spacers;
a plurality of arched splines;
an automatic-sliding elevator lock;
an elevator-lock lever
having a handle surface area;
a plurality of elevator-slide-lock cross-pins and cross-pin holes;
a plurality of elevator booms;
a plurality of elevator-boom hand paddles
having a paddle surface area, front paddle ridges, back paddle ridges, top paddle ridges, and bottom paddle ridges;
a plurality of elevator-boom bottom screws and screw holes;
a spline base rotational and retraction hub;
a plurality of spline base-rotational-hub screws and holes;
a plurality of tripod-attaching screws;
a plurality of tripod-attaching square holes;
an adjustable dome;
a shield-tensioning mounting grommet;
a plurality of shield-tensioning-mounting-grommet screws;
a plurality of tension-dome sleeves;
an attachable insertable reversible arch foot;
a plurality of attachable insertable reversible dual-arch feet;
an arch-foot-stabilizing and reversing plate;
a plurality of foot wing-screws;
a plurality of foot screw holes;
a plurality of feet-attaching wing-nuts; and
a plurality of feet-wing-nut square holes,
wherein:
said rubber end caps
respectively are friction fit to said arched spline-extension prongs,
said arched spline-extension prongs
respectively and slidably are inserted into said arched splines,
said threaded attachment-screw holes
respectively are drilled into said arched spline-extension prongs,
said spline-extension spring-loaded buttons
respectively are secured to said arched splines, and are springably and detachably inserted into said spline-extension locking holes,
said spline-extension locking holes
respectively are drilled into said arched splines,
said spline step-down spacers
respectively are friction fit to said arched splines,
said arched splines
respectively and swingably are screwed to said spline base rotational and retraction hub
for supporting said adjustable dome,
for tensioning said adjustable dome,
for deploying said adjustable dome,
for retracting said adjustable dome, and
for connecting and coupling multiple said five-device-in-one arthritic-aiding reversible sun-blocking projector-screening event-sheltering vehicle-awning cupolas together,
said automatic-sliding elevator lock
is slidably attached to said arched splines
for automatically deploying said five-device-in-one arthritic-aiding reversible sun-blocking projector-screening event-sheltering vehicle-awning cupola, in conjunction with said elevator booms, and said arched splines,
for retracting said five-device-in-one arthritic-aiding reversible sun-blocking projector-screening event-sheltering vehicle-awning cupola in conjunction with said elevator booms and said arched splines,
for assisting said elevator booms
to provide tension to said five-device-in-one arthritic-aiding reversible sun-blocking projector-screening event-sheltering vehicle-awning cupola, and
for sliding vertically on respective said arched spline,
said elevator-lock lever
is swingably attached to said automatic-sliding elevator lock
for engaging automatic-sliding elevator lock on arched splines using an arthritic's hand,
for assisting said automatic-sliding elevator lock
to lock said elevator booms to a predetermined vertical position on respective said arched splines,
for quickly and easily repositioning said automatic-sliding elevator lock on said arched splines with a hand, and
for providing large said handle surface area
to aid those arthritics with limited hand mobility due to an arthritic physical condition,
said elevator-slide-lock cross-pins cross-pin holes
respectively and screwedly are inserted through, and drilled into said automatic-sliding elevator lock,
said elevator booms
respectively and rotatably are screwed to said arched splines and said automatic-sliding elevator lock,
said elevator-boom hand paddles
respectively and rotatably are attached to said elevator booms
for allowing an arthritic hand
to securely and effectively grip said elevator-boom hand paddles,
for allowing persons with arthritic hands to deploy said five-device-in-one arthritic-aiding reversible sun-blocking projector-screening event-sheltering vehicle-awning cupola easier, by sliding said automatic-sliding elevator lock upward and downward on said arched splines,
for allowing persons with arthritic hands to slide said automatic-sliding elevator lock upward and downward on said arched splines,
for accommodating arthritic hands
to grip said elevator-boom hand paddles in two points of contact, to the left and right sides of center of said automatic-sliding elevator lock thereby equalizing side-to-side pressure while pushing upward and downward,
for reducing effort for a person with arthritic hands by providing two, rather than one, said elevator-boom hand paddles
to assist while operating said automatic-sliding elevator lock,
for reducing pain for those with arthritic hand conditions by providing large said paddle surface areas
to distribute the pressure or their hands over the broad flat surfaces of said elevator-boom hand paddles, thereby minimizing pressure to concentrated areas of their hands,
for aiding those with arthritic hand conditions by providing said front paddle ridges and said back paddle ridges of said elevator-boom hand paddles
to aid by helping to easily position and maintain their hands in the center of said elevator-boom hand paddles, without slipping off, as prior art would naturally promote, and
for aiding those with arthritic hand conditions by providing said top paddle ridges and said bottom paddle ridges of said elevator-boom hand paddles
to aid those with arthritic hand conditions by helping them easily position and maintain their hands in the center of said elevator-boom hand paddles, while pushing upwards or downwards,
said elevator-boom bottom screws
respectively are inserted through said elevator-boom bottom screw holes,
said elevator-boom bottom screw holes
respectively are drilled into said elevator booms,
said spline base rotational and retraction hub
is screwedly attached to said attachable insertable reversible dual-arch feet,
said spline base-rotational-hub screws and holes
respectively are inserted through and drilled into said spline base rotational and retraction hub,
said tripod-attaching screws
respectively are inserted through said tripod-attaching square holes and said feet-wing-nut square holes,
said tripod-attaching square holes
respectively are punched through the bottom of said spline base rotational and retraction hub, respectively,
said adjustable dome
is attached to respective said tension-dome sleeves and screwed to said arched spline-extension prongs
for functioning as a weather shield
to deflect the wind or to block radiation from the sun,
for functioning as a freestanding privacy shield when mounted to a trailer hitch
to visually block the view into private areas, such as courtyards, apartment patios, apartment balconies, and back yards,
for functioning as a domed truck-bed cover when mounted into a utility port
to provide greater volume in the height of the truck bed, allowing for additional items to be protected,
for functioning as a domed truck-side tent when mounted into a utility port
to provide shelter to persons camping in the truck bed,
for functioning as a curved projection screen
to view projected-light entertainment thereon, such as a movie, to thereby provide a greater user experience,
for functioning as a truck-side awning when mounted into a utility port
to provide protection from the sun's radiation and rain during sports games, picnicking, and camping,
for functioning as a tailgate awning when mounted into a utility port
to provide protection from the sun's radiation and rain, for picnic food being served, and a cover for a picnic table,
for functioning as an awning when mounted to a back of a truck to provide protection from the sun's radiation and
rain to persons, such as those watching sports
games, or relaxing in a chair,
for functioning as an awning when mounted to a
tailgate-slot
to provide protection from the sun's radiation and
rain to persons behind the truck, such as those
watching sports games, or relaxing in a chair,
for functioning as an awning when mounted to a
trailer hitch
to provide protection from the sun's radiation
behind the truck, such as for food coolers, dog
kennels, and persons sleeping in a sleeping bag
on the ground,
for attaching to said tension-dome sleeves, respectively, and screwing to said arched spline-extension prongs, respectively,
for providing a flexible, limited-stretch medium
to allow said five-device-in-one arthritic-aiding
reversible sun-blocking projector-screening
event-sheltering vehicle-awning cupola to
thereby deploy and retract, and
for providing a flexible, limited-stretch medium
to become a tight and tensioned medium when
said five-device-in-one arthritic-aiding reversible sun-blocking projector-screening event-sheltering vehicle-awning cupola is deployed,
said shield-tensioning mounting grommets
respectively are sewn to said adjustable dome,
said shield-tensioning-mounting-grommet screws
respectively are inserted through said shield-tensioning
mounting grommets and to said threaded attachment-screw holes, respectively,
said tension-dome sleeves
respectively are slide over said arched splines,
said attachable insertable reversible arch foot
is detachably screwed to said arch-foot-stabilizing and
reversing plate
for attaching to a utility port of a pickup truck bed to
function as a weather shield
to deflect the wind or to block radiation from the
sun,
for attaching to a utility port of a pickup truck bed to
function as a privacy shield
to visually block the view into private areas, such
as courtyards, apartment patios, apartment balconies, and back yards,
for attaching to a utility port of a pickup truck bed to
function as a domed truck-bed cover
to provide greater volume in the height of the
truck bed, allowing for additional items to be
protected,
for attaching to a utility port of a pickup truck bed to
function as a domed truck-side tent, mounted in
utility port
to provide shelter to persons camping in the truck
bed,
for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table,
for attaching to a utility port of a pickup truck bed to
function as an awning
to provide protection from the sun's radiation and
rain to persons, such as those watching sports
games, or relaxing in a chair,
for attaching to a tailgate-slot of a pickup truck to
function as an awning
to provide protection from the sun's radiation and
rain to persons behind the truck, such as those
watching sports games, or relaxing in a chair,
for attaching to a trailer hitch of a pickup truck to
function as an awning
to provide protection from the sun's radiation
behind the truck, such as for food coolers, dog
kennels, and persons sleeping in a sleeping bag
on the ground,
for attaching to, detaching from, or reversing onto
said five-device-in-one arthritic-aiding reversible
sun-blocking projector-screening event-sheltering
vehicle-awning cupola, and
for supporting said five-device-in-one arthritic-aiding reversible sun-blocking projector-screening
event-sheltering vehicle-awning cupola,
said attachable insertable reversible dual-arch feet
respectively are detachably screwed to said spline base
rotational and retraction hub
for attaching to a utility port of a pickup truck bed to
function as a weather shield
to deflect the wind or to block radiation from the
sun,
for allowing said five-device-in-one arthritic-aiding
reversible sun-blocking projector-screening
event-sheltering vehicle-awning cupola to act as a
privacy shield, as a freestanding device or when
mounted to trailer hitch
to visually block the view into private areas, such
as courtyards, apartment patios, apartment balconies, and back yards,
for attaching to a utility port of a pickup truck bed to
function as a domed truck-bed cover
to provide greater volume in the height of the
truck bed, allowing for additional items to be
protected,
for attaching to a utility port of a pickup truck bed to
function as a domed truck-side tent,
to provide shelter to persons camping in the truck
bed,
for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table, for attaching to a utility port of a pickup truck bed to
function as an awning
to provide protection from the sun's radiation and
rain to persons, such as those watching sports
games, or relaxing in a chair, and
for attaching to a tailgate-slot of a pickup truck to
function as an awning
to provide protection from the sun's radiation and rain
to persons behind a truck, such as those watching
sports games, or relaxing in a chair, for food coolers,
dog kennels, and persons camping in a sleeping bag
on the ground,
said arch-foot-stabilizing and reversing plate
is detachably screwed to said attachable insertable
reversible dual-arch feet and said attachable insertable reversible arch foot,
said foot wing-screws
respectively are screwed into said attachable insertable
reversible arch foot,
said foot screw holes
respectively are drilled into said attachable insertable
reversible arch foot,
said feet-attaching wing-nuts
respectively are screwed onto said spline base-rotational-hub screws,
said feet-wing-nut square holes
respectively are punched into said attachable insertable
reversible dual-arch feet.

11. The five-device-in-one arthritic-aiding reversible sun-blocking vehicle-awning cupola of claim 10,
further comprising:
a plurality of detachable wheels; and
a plurality of detachable-wheel posts,
wherein:
said detachable wheels
respectively are attached to said attachable insertable
reversible dual-arch feet and said attachable
insertable reversible arch foot
for allowing said arthritic-hand-aiding reversible
sun-blocking pet-protecting dome-shelter
awning and truck-bed cupola to roll
to provide means to easily reposition said
arthritic-hand-aiding reversible sun-blocking
pet-protecting dome-shelter awning and truck-bed cupola for storage, and
for easily attaching and detaching said detachable
wheels to or from said arthritic-hand-aiding
reversible sun-blocking pet-protecting dome-shelter awning and truck-bed cupola
to allow said attachable insertable reversible
arch foot or said attachable insertable reversible
dual-arch feet to be inserted into a utility port or
a tailgate-slot or a hitch,
said detachable-wheel posts
respectively and detachably are screwed into said
detachable-wheel-post threaded sockets
for detaching and attaching said detachable
wheels to said attachable insertable reversible
arch foot and said attachable insertable reversible dual-arch feet.

12. The five-device-in-one arthritic-aiding reversible sun-blocking vehicle-awning cupola of claim 10,
wherein
said elevator-lock lever
is made of plastic material.

13. The five-device-in-one arthritic-aiding reversible sun-blocking vehicle-awning cupola of claim 10,
wherein
said attachable insertable reversible arch foot
has a curved rectangular-tube shape.

14. The five-device-in-one arthritic-aiding reversible sun-blocking vehicle-awning cupola of claim 10,
wherein
said attachable insertable reversible dual-arch feet
each have a curved rectangular-tube shape.

15. The five-device-in-one arthritic-aiding reversible sun-blocking vehicle-awning cupola of claim 10,
wherein
said arched splines
each have a curved tube shape.

16. The five-device-in-one arthritic-aiding reversible sun-blocking vehicle-awning cupola of claim 10,
wherein
said arched splines
each are made of metallic material.

17. The five-device-in-one arthritic-aiding reversible sun-blocking vehicle-awning cupola of claim 10,
wherein
said adjustable dome
has a concaved crown shape.

18. The five-device-in-one arthritic-aiding reversible sun-blocking vehicle-awning cupola of claim 10,
wherein
said adjustable dome
is made of nylon fabric, the like, or the equivalent
material.

19. A five-device-in-one arthritic-aiding reversible cupola
comprising:
a plurality of arched spline-extension prongs;
a plurality of arched splines;
an automatic-sliding elevator lock;
an elevator-lock lever
having a handle surface area;
a plurality of elevator booms;
a plurality of elevator-boom hand paddles
having a paddle surface area, front paddle ridges, back
paddle ridges, top paddle ridges, and bottom paddle
ridges;
a spline hub;
an adjustable dome;
a plurality of dome sleeves;
an attachable insertable reversible arch foot;
a plurality of attachable insertable reversible dual-arch
feet; and
a foot-stabilizing and reversing plate,
wherein:
said arched spline-extension prongs
respectively and slidably are inserted into said arched
splines,
said arched splines
respectively and swingably are screwed to said spline
hub
for connecting and coupling multiple said five-device-in-one arthritic-aiding reversible cupolas
together,
said automatic-sliding elevator lock
is slidably attached to said arched splines,
said elevator-lock lever
is swingably attached to said automatic-sliding elevator
lock
for engaging automatic-sliding elevator lock on
arched splines using an arthritic's hand,
for assisting said automatic-sliding elevator lock to lock said elevator booms to a predetermined vertical position on respective said arched splines,
for quickly and easily repositioning said automatic-sliding elevator lock on said arched splines with a hand, and
for providing large said handle surface area
to aid those arthritics with limited hand mobility due to an arthritic physical condition,
said elevator booms
respectively and rotatably are screwed to said arched splines and said automatic-sliding elevator lock,
said elevator-boom hand paddles
respectively and rotatably are attached to said elevator booms
for allowing an arthritic hand
to securely and effectively grip said elevator-boom hand paddles, for allowing persons with arthritic hands to deploy said five-device-in-one arthritic-aiding reversible sun-blocking projector-screening event-sheltering vehicle-awning cupola easier, by sliding said automatic-sliding elevator lock upward and downward on said arched splines,
for allowing persons with arthritic hands to slide said automatic-sliding elevator lock upward and downward on said arched splines,
for accommodating arthritic hands
to grip said elevator-boom hand paddles in two points of contact, to the left and right sides of center of said automatic-sliding elevator lock thereby equalizing side-to-side pressure while pushing upward and downward,
for reducing effort for a person with arthritic hands by providing two, rather than one, said elevator-boom hand paddles
to assist while operating said automatic-sliding elevator lock, for reducing pain for those with arthritic hand conditions by providing large said paddle surface areas
to distribute the pressure or their hands over the broad flat surfaces of said elevator-boom hand paddles, thereby minimizing pressure to concentrated areas of their hands,
for aiding those with arthritic hand conditions by providing said front paddle ridges and said back paddle ridges of said elevator-boom hand paddles
to aid by helping to easily position and maintain their hands in the center of said elevator-boom hand paddles, without slipping off, as prior art would naturally promote, and
for aiding those with arthritic hand conditions by providing said top paddle ridges and said bottom paddle ridges of said elevator-boom hand paddles
to aid those with arthritic hand conditions by helping them easily position and maintain their hands in the center of said elevator-boom hand paddles, while pushing upwards or downwards,
said spline hub
is screwedly attached to said attachable insertable reversible dual-arch feet,
said adjustable dome
is attached to respective said dome sleeves and screwed to said arched spline-extension prongs
for functioning as a weather shield
to deflect the wind or to block radiation from the sun,
for functioning as a freestanding privacy shield when mounted to a trailer hitch
to visually block the view into private areas, such as courtyards, apartment patios, apartment balconies, and back yards,
for functioning as a domed truck-bed cover when mounted into a utility port
to provide greater volume in the height of the truck bed, allowing for additional items to be protected,
for functioning as a domed truck-side tent when mounted into a utility port
to provide shelter to persons camping in the truck bed,
for functioning as a curved projection screen to view projected-light entertainment thereon, such as a movie, to thereby provide a greater user experience,
for functioning as a truck-side awning when mounted into a utility port
to provide protection from the sun's radiation and rain during sports games, picnicking, and camping,
for functioning as a tailgate awning when mounted into a utility port
to provide protection from the sun's radiation and rain, for picnic food being served, and a cover for a picnic table,
for functioning as an awning when mounted to a back of a truck
to provide protection from the sun's radiation and rain to persons, such as those watching sports games, or relaxing in a chair,
for functioning as an awning when mounted to a tailgate-slot
to provide protection from the sun's radiation and rain to persons behind the truck, such as those watching sports games, or relaxing in a chair, and
for functioning as an awning when mounted to a trailer hitch
to provide protection from the sun's radiation behind the truck, such as for food coolers, dog kennels, and persons sleeping in a sleeping bag on the ground,
said attachable insertable reversible arch foot
is detachably screwed to said foot-stabilizing and reversing plate
for attaching to a utility port of a pickup truck bed to function as a weather shield
to deflect the wind or to block radiation from the sun,
for attaching to a utility port of a pickup truck bed to function as a privacy shield
to visually block the view into private areas, such as courtyards, apartment patios, apartment balconies, and back yards,
for attaching to a utility port of a pickup truck bed to function as a domed truck-bed cover
to provide greater volume in the height of the truck bed, allowing for additional items to be protected,
for attaching to a utility port of a pickup truck bed to function as a domed truck-side tent, mounted in utility port
to provide shelter to persons camping in the truck bed, for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table,
for attaching to a utility port of a pickup truck bed to
function as an awning
to provide protection from the sun's radiation and
rain to persons, such as those watching sports
games, or relaxing in a chair,
for attaching to a tailgate-slot of a pickup truck to
function as an awning
to provide protection from the sun's radiation and
rain to persons behind the truck, such as those
watching sports games, or relaxing in a chair,
for attaching to a trailer hitch of a pickup truck to
function as an awning
to provide protection from the sun's radiation
behind the truck, such as for food coolers, dog
kennels, and persons sleeping in a sleeping bag
on the ground, and
for attaching to, detaching from, or reversing onto
said five-device-in-one arthritic-aiding reversible
sun-blocking projector-screening event-sheltering
vehicle-awning cupola,
said attachable insertable reversible dual-arch feet
respectively are detachably screwed to said spline hub
for attaching to a utility port of a pickup truck bed to
function as a weather shield
to deflect the wind or to block radiation from the
sun,
for allowing said five-device-in-one arthritic-aiding
reversible sun-blocking projector-screening
event-sheltering vehicle-awning cupola to act as a
privacy shield, as a freestanding device or when
mounted to trailer hitch
to visually block the view into private areas, such
as courtyards, apartment patios, apartment balconies, and back yards,
for attaching to a utility port of a pickup truck bed to
function as a domed truck-bed cover
to provide greater volume in the height of the
truck bed, allowing for additional items to be
protected,
for attaching to a utility port of a pickup truck bed to
function as a domed truck-side tent,
to provide shelter to persons camping in the truck
bed,
for attaching to a utility port of a pickup truck bed to
function as a curved projection screen
to view projected-light entertainment thereon,
such as a movie, to thereby provide a greater
user experience,
for attaching to a utility port of a pickup truck bed to
function as a truck-side awning
to provide protection from the sun's radiation and
rain during sports games, picnicking, and camping,
for attaching to a utility port of a pickup truck bed to
function as a tailgate awning
to provide protection from the sun's radiation and
rain, for picnic food being served, and a cover
for a picnic table,
for attaching to a utility port of a pickup truck bed to
function as an awning
to provide protection from the sun's radiation and
rain to persons, such as those watching sports
games, or relaxing in a chair, and
for attaching to a tailgate-slot of a pickup truck to
function as an awning
to provide protection from the sun's radiation and
rain to persons behind a truck, such as those
watching sports games, or relaxing in a chair,
for food coolers, dog kennels, and persons
camping in a sleeping bag on the ground,
said foot-stabilizing and reversing plate
is detachably screwed to said attachable insertable reversible dual-arch feet and said attachable insertable reversible arch foot.
20. The five-device-in-one arthritic-aiding reversible
cupola of claim 19, further comprising:
a plurality of detachable wheels; and
a plurality of detachable-wheel posts,
wherein:
said detachable wheels
respectively are attached to said attachable insertable
reversible dual-arch feet and said attachable insertable reversible arch foot
for allowing said arthritic-hand-aiding reversible
sun-blocking pet-protecting dome-shelter awning
and truck-bed cupola to roll
to provide means to easily reposition said arthritic-hand-aiding reversible sun-blocking pet-protecting dome-shelter awning and truck-bed
cupola for storage, and
for easily attaching and detaching said detachable
wheels to or from said arthritic-hand-aiding
reversible sun-blocking pet-protecting dome-shelter awning and truck-bed cupola
to allow said attachable insertable reversible arch
foot or said attachable insertable reversible
dual-arch feet to be inserted into a utility port or
a tailgate-slot or a hitch,
said detachable-wheel posts
respectively and detachably are screwed into said
detachable-wheel-post threaded sockets
for detaching and attaching said detachable wheels to
said attachable insertable reversible arch foot and
said attachable insertable reversible dual-arch
feet.

* * * * *